US012568206B2

(12) United States Patent
Ko et al.

(10) Patent No.: US 12,568,206 B2
(45) Date of Patent: *Mar. 3, 2026

(54) VIDEO SIGNAL PROCESSING METHOD AND DEVICE USING CURRENT PICTURE REFERENCE

(71) Applicant: VIDAXIO LLC, Wilmington, DE (US)

(72) Inventors: Geonjung Ko, Seoul (KR); Dongcheol Kim, Suwon-Si (KR); Juhyung Son, Uiwang-Si (KR); Jaehong Jung, Seoul (KR); Jinsam Kwak, Anyang-Si (KR)

(73) Assignee: VIDAXIO LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,298

(22) Filed: Apr. 24, 2024

(65) Prior Publication Data

US 2024/0275953 A1      Aug. 15, 2024

Related U.S. Application Data

(63) Continuation of application No. 17/343,258, filed on Jun. 9, 2021, now Pat. No. 12,003,699, which is a
(Continued)

(30) Foreign Application Priority Data

Dec. 12, 2018      (KR) ........................ 10-2018-0160432
Feb. 19, 2019      (KR) ........................ 10-2019-0019512
Apr. 24, 2019      (KR) ........................ 10-2019-0048097

(51) Int. Cl.
    *H04N 19/105*          (2014.01)
    *H04N 19/174*          (2014.01)
    (Continued)

(52) U.S. Cl.
    CPC ......... *H04N 19/105* (2014.11); *H04N 19/174* (2014.11); *H04N 19/176* (2014.11);
    (Continued)

(58) Field of Classification Search
    CPC .. H04N 19/105; H04N 19/174; H04N 19/176; H04N 19/186; H04N 19/593;
    (Continued)

(56) References Cited

U.S. PATENT DOCUMENTS 10,448,025 B1 * 10/2019  Xu ........................ H04N 19/186
10,958,904 B2    3/2021  Xu et al.
                         (Continued)

FOREIGN PATENT DOCUMENTS

CN          105409218 A      3/2016
CN          106416243 A      2/2017
                   (Continued)

OTHER PUBLICATIONS

Bross et al. (Versatile Video Coding (Draft 3), JVET-L1001-v9, Oct. 12, 2018). (Year: 2018).*
(Continued)

*Primary Examiner* — Matthew K Kwan
(74) *Attorney, Agent, or Firm* — Merchant & Gould P.C.

(57) ABSTRACT

A video signal processing method comprises: determining a prediction mode of a current block; when the prediction mode of the current block is a Block Copy (BC) prediction mode referring to a current picture, decoding the current block, based on the BC prediction mode; and when the prediction mode of the current block is an inter prediction mode referring to at least one picture, decoding the current block, based on the inter prediction mode.

21 Claims, 21 Drawing Sheets

Related U.S. Application Data continuation of application No. PCT/KR2019/017639, filed on Dec. 12, 2019.

(51) Int. Cl.

| | |
|---|---|
| *H04N 19/176* | (2014.01) |
| *H04N 19/186* | (2014.01) |
| *H04N 19/593* | (2014.01) |
| *H04N 19/96* | (2014.01) |

(52) U.S. Cl.
CPC ......... *H04N 19/186* (2014.11); *H04N 19/593* (2014.11); *H04N 19/96* (2014.11)

(58) Field of Classification Search
CPC ...... H04N 19/96; H04N 19/70; H04N 19/159; H04N 19/51; H04N 19/119; H04N 19/132; H04N 19/136; H04N 19/423; H04N 19/50
USPC ..................................................... 375/240.12
See application file for complete search history.

(56) References Cited

U.S. PATENT DOCUMENTS

| | | | |
|---|---|---|---|
| 11,272,174 B2 | 3/2022 | Lee et al. | |
| 2014/0092970 A1* | 4/2014 | Misra ..................... | H04N 19/52 |
| | | | 375/240.16 |
| 2014/0314142 A1 | 10/2014 | Oh et al. | |
| 2014/0362917 A1 | 12/2014 | Joshi et al. | |
| 2015/0195559 A1 | 7/2015 | Chen et al. | |
| 2015/0271515 A1* | 9/2015 | Pang ..................... | H04N 19/70 |
| | | | 375/240.16 |
| 2016/0057420 A1 | 2/2016 | Pang et al. | |
| 2016/0105682 A1* | 4/2016 | Rapaka .................. | H04N 19/50 |
| | | | 375/240.12 |
| 2016/0309179 A1 | 10/2016 | Schwarz et al. | |
| 2017/0142418 A1* | 5/2017 | Li .......................... | H04N 19/58 |
| 2017/0374367 A1 | 12/2017 | Sasai et al. | |
| 2018/0255295 A1 | 9/2018 | Lee et al. | |
| 2018/0332283 A1 | 11/2018 | Liu et al. | |
| 2018/0352224 A1 | 12/2018 | Nakamura et al. | |
| 2020/0045322 A1 | 2/2020 | Ye et al. | |
| 2021/0092405 A1 | 3/2021 | Biatek et al. | |
| 2021/0112263 A1 | 4/2021 | Choi | |
| 2021/0352273 A1 | 11/2021 | Lim et al. | |

FOREIGN PATENT DOCUMENTS

| | | |
|---|---|---|
| CN | 106797476 A | 5/2017 |
| CN | 107079161 A | 8/2017 |
| CN | 108712650 A | 10/2018 |
| CN | 109314789 A | 2/2019 |
| JP | 2017528984 A | 9/2017 |
| JP | 2018088715 A | 6/2018 |
| JP | 2020028066 A | 2/2020 |
| JP | 2021-518091 A | 7/2021 |
| KR | 10-2014-0016823 A | 2/2014 |
| KR | 1020160072181 A | 6/2016 |
| KR | 1020160129075 A | 11/2016 |
| KR | 2017/0021302 A | 2/2017 |
| KR | 10-2017-0128390 A | 11/2017 |
| WO | 2012/121535 A2 | 9/2012 |
| WO | 2015070801 A1 | 5/2015 |
| WO | 2015142556 A2 | 9/2015 |
| WO | 2015192353 A1 | 12/2015 |
| WO | 2016048834 A1 | 3/2016 |
| WO | 2017179835 A1 | 10/2017 |
| WO | 2018012886 A1 | 1/2018 |
| WO | 2018/051811 A1 | 3/2018 |
| WO | 2018/062950 A1 | 4/2018 |
| WO | 2018/064948 A1 | 4/2018 |
| WO | 2018/116925 A1 | 6/2018 |
| WO | 2018129322 A1 | 7/2018 |
| WO | 2019217189 A1 | 11/2019 |
| WO | 2020098782 A1 | 5/2020 |
| WO | 2020171681 A1 | 8/2020 |
| WO | 2020177756 A1 | 9/2020 |
| WO | 2020192629 A1 | 10/2020 |

OTHER PUBLICATIONS

Li et al. ("Description of SDR video coding technology proposal by Tencent", JVET-J0029-v1, Apr. 10-20, 2018). (Year: 2018).*

Xu (Mediatek) X et al: "On unification of intra block copy and inter-picture motion compensation", 17. JCT-VC Meeting; Mar. 27, 2014-Apr. 4, 2014; Valencia; (Joint Collaborative Team on Video Coding of ISO/IEC JTC1/SC29/WG11 and ITU-T SG. 16), No. JCTVC-Q0132 Apr. 3, 2014 (Apr. 3, 2014), XP030239862, Retrieved from the Internet: URL:http://phenix.int-evry.fr/jct/doc_end_user/documents/17_Valencia/wg11/JCTVC-Q0132-v5.zipJCTVC-Q0132_v5.doc [retrieved on Apr. 3, 2014].

Xu (Mediatek) X et al: "On chroma motion vector derivation for intra block copy", 21. JCT-VC Meeting; Jun. 19, 2015-Jun. 26, 2015; Warsaw; (Joint Collaborative Team on Video Coding of ISO/IEC JTC1/SC29/WG11 and ITU-TSG.16), No. JCTVC-U0077 Jun. 19, 2015 (Jun. 19, 2015), XP030241618, Retrieved from the Internet: URL:http://phenix.int-evry.fr/jct/doc_end_user/documents/21_Warsaw/wg11/JCTVC-U0077-v3.zip JCTVC-U0077_r2.doc [retrieved on Jun. 19, 2015].

The extended European search report for Application No. Patent No. 19895005.7-1208 3896969 PCT/KR2019017639. Dated Aug. 11, 2022.

OA from European Patent Office in Apr. 21, 2023, Application No. 19 895 005.7-1208.

Xu (Tencent) X et al: CE8: CPR mode with local search ranges (Test CE8.3.1 and CE8.3.2)U, 12. JVET Meeting; Oct. 3, 2018-Oct. 12, 2018; Macao; (The Joint Video Exploration Team of ISO/IEC JTC1/SC29/WG11 and ITU-T SG. 16 ),,No. JVET-L0293 Oct. 10, 2018 (Oct. 10, 2018), P030195342, Retrieved from the Internet: URL:http://phenix.int-evry.fr/jvet/doc_end_user/documents/12_Macao/wg11/JVET-L0293-v5.zip JVET-L0293-CE8.3.1b-spec_r2.docx [retrieved on Oct. 10, 2018].

Bross B et al: "Versatile Video Coding (Draft 4)" , 13. JVET Meeting; Jan. 9, 2019-Jan. 18, 2019; Marrakech; (The Joint Video Exploration Team of ISO/IEC JTC1/SC29/WG11 and ITU-T SG. 16),,No. JVET-M1001 Feb. 19, 2019 (Feb. 19, 2019), XP030202591, Retrieved from the Internet: URL:http://phenix.int-evry.fr/jvet/doc_end_user/documents/13_Marrakech/wg11 /JVET-M1001 -v3.zip JVET-M1001 -v3.docx [retrieved on Feb. 19, 2019].

OA from Japanese Patent Office in May 2, 2023, Application No. 2021-549112.

Van, Luong Pham et al., Non-CE8: Intra Prediction Mode Derivation for DMChroma Block with Corresponding IBC/PCM Luma and JVET-O0651 (version 3), ITU, Jul. 5, 2019, pp. 1, 2, JVET-O0651.docx.

OA from Japanese Patent Office in May 12, 2023, Application No. 2021-534131.

Pang, Chao et al., Non-CE2: Block vectorprediction method for intrablock copy and Joint Collaborative Team onVideo Coding (JCT-VC) of ITU-TSG 16 WP 3 and ISO/IEC JTC 1/SC 29/WG 11 20th Meeting: Geneva, CH, and Feb. 10-18, 2015, [JCTVC-T0097-r1] and JCTVC-T0097 (version 2), ITU-T, Feb. 11, 2015, and <URL:http://phenix.it-sudparis.eu/jct/doc_end_user/documents/20_Geneva/wg11/JCTVC-T00 97-v2.zip> : JCTVC-T0097-r1.doc: pp. 1-4.

Pang, Chao etal., SCCE1: Test 3.1—Block vector prediction method for I ntra block copy and Joint Collaborative Team onVideo Coding (JCT-VC) of ITU-TSG 16 WP 3 and ISO/IEC JTC 1/SC 29/WG 11 18th Meeting: Sapporo, JP, and Jun. 30-Jul. 9, 2014, [JCTVC-R0185] and JCTVC-R0185 (version 2), ITU-T, Jul. 2, 2014, and <URL:http://phenix.it-sudparis.eu/jct/doc_end_user/documents/18_Sapporo/wg11/JCTVC-R0 185-v2.zip> : JCTVC-R0185_r1.doc: pp. 1-8.

Xu, Xiaozhong et al., CE8: CPR mode with local searchranges (Test CE8.3.1 and CE8.3.2), Joint Video Experts Team (JVET) of ITU-

(56)         References Cited

OTHER PUBLICATIONS

TSG16 WP 3 and ISO/IEC JTC 1/ SC 29/WG 11 12th Meeting: Macao, CN, Oct. 3-12, 2018, [JVET-L0293], and JVET-L0293 (version 5), ITU-T, Oct. 10, 2018, and <URL:https://jvet-experts. org/doc_end_user/documents/12_Macao/wg11/JVET-L0293-v5. zip> : JVET-L0293-CE8.3.1 and CE8.3.2_v2.docx: pp. 1-5, JVET-L0293-CE8.3.1b-spec_r2.docx: pp. 1-9.
Non-Final Rejection from USPTO issued in Jul. 21, 2023 for U.S. Appl. No. 17/401,849.
Title: CE8-related : The corner case handling regarding mv derivation for Chroma IBC in dual tree structure; Joint Video Experts Team (JVET) of ITU-T SG 16 WP 3 and ISO/IEC JTC 1/SC 29/WG 11 14th Meeting: Geneva, CH, Mar. 19-27, 2019; Document No. JVET-N0466.
Office Action from the Intellectual Property Office of Vietnam for Application No. 1-2021-05800. Dated Aug. 14, 2023.
Notice of Allowance from Japanese Intellectual Property Office for Japanese Patent Application No. 2021-549112 Dated Oct. 31, 2023. Title: n the intra prediction based on a video signal processing method and apparatus.
Decision of Rejection from Japanese Intellectual Property Office for Japanese Patent Application No. 2021-534131 Dated Nov. 20, 2023. Title: Video Signal Processing Method and Device Using Current Picture Reference.
Decision to Reject the Amendments from Japanese Intellectual Property Office for Japanese Patent Application No. 2021-534131 Dated Nov. 20, 2023. Title: Video Signal Processing Method and Device Using Current Picture Reference.
Flynn, David et al. , High Efficiency Video Coding (HEVC) Range Extensions text specification: Draft 6 , Joint Collaborative Team on Video Coding (JCT-VC) of ITU-T SG 16 WP 3 and ISO/IEC JTC 1/SC 29/WG 11 16th Meeting: San Jose, US, Jan. 9-17, 2014, [JCTVC-P1005_v4] , JCTVC-P1005 (version 4). ITU-T , Apr. 3, 2014 , < URL: http://phenix.it-sudparis.eu/jct/doc_end_user/documents/ 16_San Jose/wg11/JCTVC-P1005-v4.zip > : JCTVC-P1005_v4. doc: pp. 94-96.
Notice of Allowance from European Patent Office for Patent Application No. 19895005.7-1208 Dated Nov. 13, 2023.
OA from China National Intellectual Property Administration for Patent Application No. 202080015505.9 Dated Dec. 5, 2023. Title: Intra Prediction-Based Video Signal Processing Method and Device.
OA from China National Intellectual Property Administration for Patent Application No. 201980082678.X Dated Dec. 7, 2023. Title: Video Signal Processing Method and Device Using Current Picture Reference.
Joint Video Experts Team (JVET) of ITU-T SG 16 WP 3 and ISO/IEC JTC 1/SC 29/WG 11 12th Meeting: Macao, CN, Oct. 3-12, 2018 , JVET-L0293-v5 Xiaozhong Xu,CE8: CPR mode with local search ranges (Test CE8.3.1 and CE8.3.2).
OA from USPTO for U.S. Appl. No. 17/401,849 dated Dec. 28, 2023.
CE8-related : The corner case handling regarding mv derivation for Chroma IBC in dual tree structure. Joint Video Experts Team (JVET) of ITU-T SG 16 WP 3 and ISO/IEC JTC 1/SC 29/WG 11 14th Meeting: Geneva, CH, Mar. 19-27, 2019 (Jang).
Office Action—Hearing Notice in Reference to Application No. 202127024933—from Indian Patent Office issued on Jan. 10, 2024.
International Search Report of International application No. PCT/KR2019/017639. Mar. 20, 2020.
Zhang, Zhengdong et al. Rotate Intra Block Copy. Joint Video Experts Team (JVET) of ITU-T SG 16 WP 3 and ISO/IEC JTC 1/SC 29/WG 11. JVET-L0041-v1. 12th Meeting. Macao, CN pp. 1-7. Oct. 12, 2018. Retrieved on [Mar. 16, 2020]. Retrieved from [http:// phenix.int-evry.fr/jvet/] See pp. 1-6.
Bross. Benjami et al. Versatile Video Coding (Draft 3). Joint Video Expert Team (JVET) of JTU-T SG 16 WP 3 and ISO/IEC ITC 1/SC 29/WG II. JVET-L1001-v9. 12th Meeting. Macao, CN. pp. 1-225, Oct. 12, 2018, Retrieved on [Mar. 16, 2020], Retrieved from [http://phenix.int--evry fr/jvet/] See pp. 77-98.

Written Opinion of International application No. PCT/KR2019/017639. Mar. 20, 2020.
English Translation of Written Opinion of International application No. PCT/KR2019/017639. Dated Mar. 20, 2020.
Examination report under sections 12 & 13 of the Patents Act, 1970 and the Patents Rules, 2003 from Intellectual Property India for Application No. 202127036546 dated Apr. 20, 2022.
"Versatile Video Coding (Draft 4)" Document: JVET-M1001-v7 Joint Video Experts Team (JVET) of ITU-T SG 16 WP 3 and ISO/IEC JTC 1/SC 29/WG 11 13th Meeting: Marrakech, MACN, Jan. 9-18, 2019.
International Search Report of international application No. PCT/KR2020/095004. Dated Jun. 16, 2020.
English Translation of Written Opinion of International application No. PCT/KR2020/095004. Dated Jun. 16, 2020.
"CE8-related: CPR mode signaling and interaction with inter coding tools" Document: JVET-M0483 Joint Video Experts Team (JVET) of ITU-T SG 16 WP 3 and ISO/IEC JTC 1/SC 29/WG 11 13th Meeting: Marrakech, MA, Jan. 9-18, 2019.
JVET-M0483_method1 Reference: VTM-3 Tested: VTM-3 + CPR 2nd-Referece:VTM-3 + CPR Note: BD-rate is computed using piece-wise cubic interpolation.
JVET-M0483_method2 Reference: VTM-3 Tested: VTM-3 + CPR 2nd-Referece:VTM-3 + CPR Note: BD-rate is computed using piece-wise cubic interpolation.
JVET-M0483_method3 Reference: VTM-3 Tested: VTM-3 + CPR 2nd-Referece:VTM-3 + CPR Note: BD-rate is computed using piece-wise cubic interpolation.
"Versatile Video Coding (Draft 4)" Document: JVET-M1001-v6 Joint Video Experts Team (JVET) of ITU-T SG 16 WP 3 and ISO/IEC JTC 1/SC 29/WG 11 13th Meeting: Marrakech, MA, Jan. 9-18, 2019.
"CE3-related: A unified MPM list for intra mode coding" Document: JVET-N0185-r1 Joint Video Experts Team (JVET) of ITU-T SG 16 WP 3 and ISO/IEC JTC 1/SC 29/WG 11 14th Meeting: Geneva, CH, Mar. 19-27, 2019.
JVET-N0185-r1-TestA Reference:VTM-4.0 Tested:Test Note: BD-rate is computed using piece-wise cubic interpolation.
"CE2-related: Disabling bi-prediction or inter-prediction for small blocks" Document: JVET-N0266 Joint Video Experts Team (JVET) of ITU-T SG 16 WP 3 and ISO/IEC JTC 1/SC 29/WG 11 14th Meeting: Geneva, CH, Mar. 19-27, 2019.
JVET-N0266_test#1 Reference:VTM-4.0 Tested: Note: BD-rate is computed using piece-wise cubic interpolation.
JVET-N0266_test#2 Reference: VTM-4.0 Tested: Note: BD-rate is computed using piece-wise cubic interpolation.
JVET-N0266_test#3 Reference: VTM-4.0 Tested: Note: BD-rate is computed using piece-wise cubic interpolation.
Li, Xiang et al.,Description of SDR video coding technology proposal by Tencent, Joint Video Experts Team (JVET) of ITU-T SG 16 WP 3 and ISO/IEC JTC 1/SC 29/WG 11 10th Meeting: San Diego, US, Apr. 10-20, 2018, [JVET-J0029-v1],JVET-J0029 (version 2),ITU-T, Apr. 6, 2018, <URL:http://phenix.it-sudparis.eu/jvet/ doc_end_user/documents/10_San%20Diego/wg11/JVET-J0029-v2. zip>: JVET-J0029.docx: pp. 7-8.
Pang, Chao et al.,Non-CE2: Block vector prediction method for intra block copy,Joint Collaborative Team on Video Coding (JCT-VC) of ITU-TSG 16 WP 3 and ISO/IEC JTC 1/SC 29/WG 11 20th Meeting: Geneva, CH, Feb. 10-18, 2015, [JCTVC-T0097-r1],JCTVC-T0097 (version 2),ITU-T, Feb. 11, 2015, <URL:http://phenix.it-sudparis.eu/jct/doc_end_user/documents/20_Geneva/wg11/JCTVC-T0097-v2.zip><JCTVC-T0097-r1.doc: pp. 1-4.
Pang, Chao et al.,SCCE1: Test 3.1—Block vector prediction method for Intra block copy,Joint Collaborative Team on Video Coding (JCT-VC) of ITU-T SG 16 WP 3 and ISO/IEC JTC 1/SC 29/WG 11 18th Meeting: Sapporo,JP, Jun. 30-Jul. 9, 2014, [JCTVC-R0185],JCTVC-R0185 (version 2),ITU-T, Jul. 2, 2014, <URL:http://phenix.it-sudparis.eu/jct/doc_end_user/documents/18_Sapporo/wg11/JCTVC-R0185-v2.zip>: JCTVC-R0185_r1.doc: pp. 1-8.
Benjamin Bross, et al., Versatile Video Coding (Draft 6) , Joint Video Experts Team (JVET) of ITU-T SG 16 WP 3 and ISO/IEC JTC 1/SC 29/WG 11,JVET-O2001-v9, Jul. 31, 2019.

(56)  References Cited

OTHER PUBLICATIONS

Man-Shu Chiang, et al.,CE3-related: Chroma DM derivation for IBC and PCM, Joint Video Experts Team (JVET) of ITU-T SG 16 WP 3 and ISO/IEC JTC 1/SC 29/WG 11,JVET-O0275-v1, Jun. 25, 2019.

Luong Pham Van Geert Van der Auwera, et al.,Non-CE8: Intra prediction mode derivation for DM chroma block with corresponding IBC/PCM luma,Joint Video Experts Team (JVET) of ITU-T SG 16 WP 3 and ISO/IEC JTC 1/SC 29/WG 11,JVET-O0651-v2, Jul. 5, 2019.

Examination report under sections 12 & 13 of the Patents Act, 1970 and the Patents Rules, 2003 for Application No. 202127024933 from Intellectual Property India dated Jul. 20, 2022.

Notice of Reasons for Refusal for Japanese Patent Application No. 2021-534131 from Japan Patent Office dated Jul. 27, 2022.

Notice of Reasons for Refusal for Japanese Patent Application No. 2021-549112 from Japan Patent Office dated Sep. 30, 2022.

JVET-J0029.xlsm. Reference: HM16.16 Reference2:JEM7.0 Tested: Tencent.

JVET-J0029-r1.xlsm. Reference: HM16.16 Reference2:JEM7.0 Tested: Tencent.

JVET-O0651_Spec. Test 1: 8.4.4 Derivation process for chroma intra prediction mode Test 2: 8.4.4 Derivation process for chroma intra prediction mode.

JVET-O0651.xlsm Reference: VTM-5.0, CTC Tested: Test Note: BD-rate is computed using piece-wise cubic interpolation.

JCTVC-T0097-spec-text. Draft Text Specification. The proposed text changes based on the document JCTVC-S1005.doc for Intra BC deblocking in CE2 Test 4.2.

"Non-CE2: Block vector prediction method for intra block copy" Chao Pang, Vadim Seregin, Marta Karczewicz QUALCOMM (PPT).

BVP_WithTBVP_lossy.xlsm Reference:Anchor (SCM-3.0) Tested: Tested (Tnnnn) Note: BD-rate is computed using piece-wise cubic interpolation.

BVP_WithTBVP_lossless.xlsm Reference:Anchor (SCM-3.0) Tested:Tested (Tnnnn).

BVP_WithTBVP_420_lossy.xlsm Reference:Anchor ( ) Tested: Tested (SCM-3.0) Note: BD-rate is computed using piece-wise cubic interpolation.

BVP_WithTBVP_420_lossless.xlsm Reference:Anchor (SCM-3.0) Tested:Tested (Tnnnn).

BVP_WithoutTBVP_lossy.xlsm Reference:Anchor (SCM-3.0) Tested:Tested (Tnnnn) Note: BD-rate is computed using piece-wise cubic interpolation.

BVP_WithoutTBVP_lossless.xlsm Reference:Anchor (SCM-3.0) Tested:Tested (Tnnnn).

BVP_WithoutTBVP_420_lossy.xlsm Reference:Anchor ( ) Tested:Tested (SCM-3.0) Note: BD-rate is computed using piece-wise cubic interpolation.

BVP_WithoutTBVP_420_lossless.xlsm Reference:Anchor (SCM-3.0) Tested:Tested (Tnnnn).

Draft Text Specification(SCCE1_Test_3_1_IntraBC_BVP_spec_r1) The proposed text changes based on the document JCTVC-P1005 for the Intra BC prediction in SCCE1 Test 3.1.

SCCE1_Test_3_1_IntraBC_BVP_Test1_lossless.xlsm Reference:Anchor (SCM-1.0) Tested:Tested (Rnnnn).

SCCE1_Test_3_1_IntraBC_BVP_Test1_lossy.xlsm Reference:Anchor (SCM-1.0) Tested:Tested (Rnnnn) Note: BD-rate is computed using piece-wise cubic interpolation.

SCCE1_Test_3_1_IntraBC_BVP_Test2_lossless.xlsm Reference:Anchor (SCM-1.0) Tested:Tested (Rnnnn).

SCCE1_Test_3_1_IntraBC_BVP_Test2_lossy.xlsm Reference:Anchor (SCM-1.0) Tested:Tested (Rnnnn) Note: BD-rate is computed using piece-wise cubic interpolation.

SCCE1_Test_3_1_IntraBC_BVP_Test3_lossless.xlsm Reference:Anchor (SCM-1.0) Tested:Tested (Rnnnn).

SCCE1_Test_3_1_IntraBC_BVP_Test3_lossy.xlsm. Reference:Anchor (SCM-1.0) Tested:Tested (Rnnnn) Note: BD-rate is computed using piece-wise cubic interpolation.

Hearing notice from Indian Patent Office for Application 202127036546 dated May 7, 2024.

Notification on the grant of patent right for invention from China National Intellectual Property Administration for Application 201980082678.X dated May 7, 2024.

Joint Video Experts Team (JVET) of ITU-T SG 16 WP 3 and ISO/IEC JTC 1/SC 29/WG 11, 10th Meeting: San Diego, US, Apr. 10-20, 2018. Document: JVET-J0042-v3. Title: Intra block copy for intra-frame coding. Inventor: Xuguang Zuo et al.

Decision to Grant a Patent for Application No. 2023-205323 from Japanese Patent Office dated Sep. 20, 2024.

NOA for U.S. Appl. No. 17/401,849 from USPTO dated Oct. 22, 2024.

Request for the Submission of an Opinion for Application No. 10-2021-7017095 from Korean Intellectual Property Office dated Nov. 6, 2024.

Request for the Submission of an Opinion for Application No. 10-2021-7025556 from Korean Intellectual Property Office dated Nov. 11, 2024.

Extended European Search Report for Appl: 24167363.1-1207 from European Patent Office dated May 14, 2024.

Notification for Patent Registration Formalities for Appl: 202080015505.9 from China National Intellectual Property Administration dated May 29, 2024.

Office Action from USPTO for U.S. Appl. No. 17/401,849 dated Jun. 7, 2024.

Decision to Grant a Patent for Appl: 2021-534131 from Japan Patent Office dated Jun. 7, 2024.

Non-final rejection for U.S. Appl. No. 17/343,258 from USPTO dated Jan. 19, 2023.

Final rejection for U.S. Appl. No. 17/343,258 from USPTO dated Jul. 27, 2023.

Notice of Allowance for U.S. Appl. No. 17/343,258 from USPTO dated Jan. 25, 2024.

Supplemental Notice of Allowance for U.S. Appl. No. 17/343,258 from USPTO dated Mar. 19, 2024.

Notice of Allowance issued by the Japanese Patent Office in counterpart Patent Application No. 2024-191166, on Jul. 22, 2025.

Wei-Jung Chien, et al. , CE8-related: CPR mode signaling and interaction with inter coding tools , Joint Video Experts Team (JVET) of ITU-T SG 16 WP 3 and ISO/IEC JTC 1/SC 29/WG 11 , JVET-M0483-r2 , 13th Meeting: Marrakech, MA , Jan. 2019 , pp. 1-7.

Xiaozhong Xu, Xiang Li, and Shan Liu , Non-CE8: CPR with chroma 4×4 sub-block size when dual-tree is on , Joint Video Experts Team (JVET) of ITU-T SG 16 WP 3 and ISO/IEC JTC 1/SC 29/WG 11 , JVET-M0544-v1 , 13th Meeting: Marrakesh, MA , Jan. 2019 , pp. 1-5.

First Office Action issued by Japanese Patent Office in counterpart Japanese Patent Application No. 2024-045270 on Mar. 25, 2025.

Notice of Allowance issued by U.S. Patent and Trademark Office in Counterpart U.S. Appl. No. 17/401,849 on Mar. 28, 2025.

* cited by examiner

CTU

| mvd_coding( x0, y0, refList, cpIdx ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ] ) | |
|   abs_mvd_greater1_flag[ 0 ] | ae(v) |
| if( abs_mvd_greater0_flag[ 1 ] ) | |
|   abs_mvd_greater1_flag[ 1 ] | ae(v) |
| if( abs_mvd_greater0_flag[ 0 ] ) { | |
|   if( abs_mvd_greater1_flag[ 0 ] ) | |
|     abs_mvd_minus2[ 0 ] | ae(v) |
|   mvd_sign_flag[ 0 ] | ae(v) |
|   } | |
| if( abs_mvd_greater0_flag[ 1 ] ) { | |
|   if( abs_mvd_greater1_flag[ 1 ] ) | |
|     abs_mvd_minus2[ 1 ] | ae(v) |
|   mvd_sign_flag[ 1 ] | ae(v) |
|   } | |
| } | |

*FIG. 11*

Current picture

Available

Not available

*Cur*

CTU mvpCand[0] = spatial candidate
mvpCand[1] = zero MV

B

A

CTU mvpCand[0] = spatial candidate
mvpCand[1] = zero MV

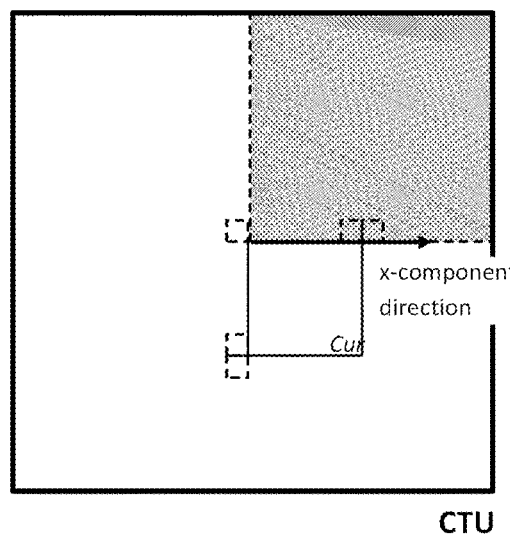

CTU

FIG. 18

| mvd_coding( x0, y0, refList , cpIdx ) { | Descriptor |
|---|---|
| abs_mvd_greater0_flag[ 0 ] | ae(v) |
| if( !(zeroMVP && abs_mvd_greater0_flag[ 0 ] == 0) ) | |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] && !(zeroMVP && abs_mvd_greater0_flag[ 0 ] == 0) ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| if( !( zeroMVP && (mvd_sign_flag[0] == 0 ‖ abs_mvd_greater0_flag[ 0 ] == 0) )) | |
| mvd_sign_flag[ 1 ] | ae(v) |
| } | |
| } | |

FIG. 19

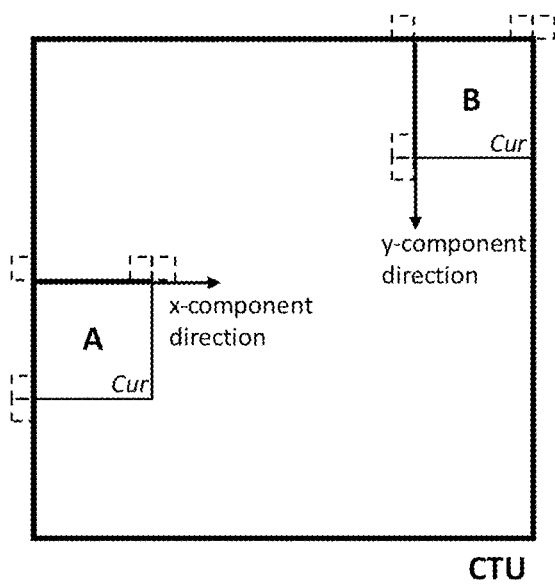

CTU

*FIG. 20*

| mvd_coding( x0, y0, refList , cpIdx ) { | Descriptor |
|---|---|
| abs_mvd_greater0_flag[ 0 ] | ae(v) |
| abs_mvd_greater0_flag[ 1 ] | ae(v) |
| if( abs_mvd_greater0_flag[ 0 ]) | |
| abs_mvd_greater1_flag[ 0 ] | ae(v) |
| if( abs_mvd_greater0_flag[ 1 ]) | |
| abs_mvd_greater1_flag[ 1 ] | ae(v) |
| if( abs_mvd_greater0_flag[ 0 ]) { | |
|    if( abs_mvd_greater1_flag[ 0 ]) | |
|     abs_mvd_minus2[ 0 ] | ae(v) |
|    if( !( zeroMVP && (left_boundary ǁ right_boundary) )) | |
|     mvd_sign_flag[ 0 ] | ae(v) |
| } | |
| if( abs_mvd_greater0_flag[ 1 ]) { | |
|    if( abs_mvd_greater1_flag[ 1 ]) | |
|     abs_mvd_minus2[ 1 ] | ae(v) |
|    if( !(zeroMVP && (top_boundary ǁ bottom_boundary) )) | |
|     mvd_sign_flag[ 1 ] | ae(v) |
| } | |
| } | |

*FIG. 21*

| mvd_coding( x0, y0, refList , epIdx ) { | Descriptor |
|---|---|
| abs_mvd_greater0_flag[ 0 ] | ae(v) |
| if( !(CPR && abs_mvd_greater0_flag[ 0 ] == 0) ) | |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] && !(zeroMVP && abs_mvd_greater0_flag[ 0 ] == 0) ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| if( !( zeroMVP && (left_boundary \|\| right_boundary) )) | |
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| if( !(zeroMVP && (mvd_sign_flag[0] == 0 \|\| abs_mvd_greater0_flag[ 0 ] == 0 \|\| top_boundary \|\| bottom_boundary)) ) | |
| mvd_sign_flag[ 1 ] | ae(v) |
| } | |
| } | |

FIG. 22

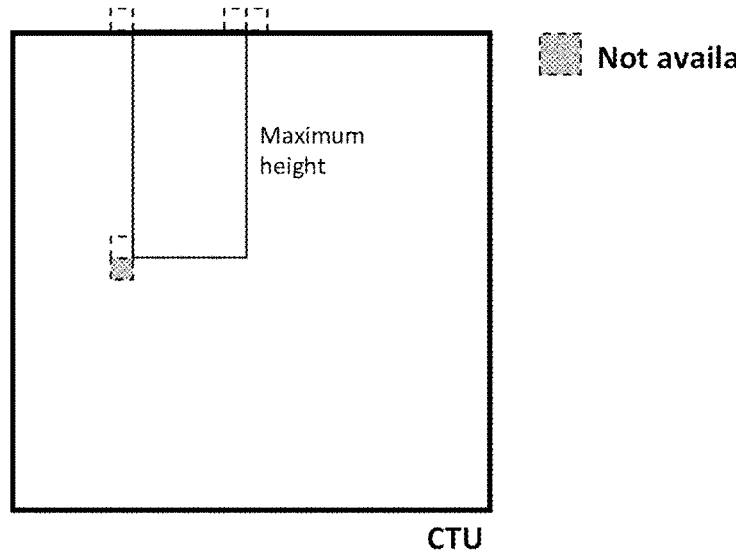

Not available

Maximum height

CTU

FIG. 23 mergeCandList
for current picture
referencing

- Spatial neighboring candidates
- ~~Temporal candidates~~
- HMVP candidates
- Pairwise average candidates
- ~~Zero MV~~

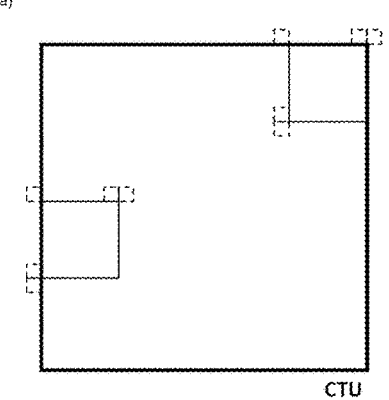

CTU mvpCand[0] = spatial candidate (b)

| coding_unit( x0, y0, cbWidth, cbHeight, treeType ) { | Descriptor |
|---|---|
| ... | |
| if( !(CurrPicIsOnlyRef && (top_boundary \|\| left_boundary)) ) | |
| mvp_l0_flag[ x0 ][ y0 ] | ae(v) |
| ... | |
| if( !(CurrPicIsOnlyRef && (top_boundary \|\| left_boundary)) ) | |
| mvp_l1_flag[ x0 ][ y0 ] | ae(v) |
| ... | |
| } | |

*FIG. 25*

When not using
current picture
referencing

When using current
picture referencing x  HMVP table reset position

*FIG. 26*

| coding_unit( x0, y0, cbWidth, cbHeight, treeType ) { | Descriptor |
|---|---|
| if( tile_group_type != I \|\| sps_ibc_enabled_flag ) { | |
| if( treeType != DUAL_TREE_CHROMA ) | |
| cu_skip_flag[ x0 ][ y0 ] | ae(v) |
| if( cu_skip_flag[ x0 ][ y0 ] == 0 && tile_group_type != I) | |
| pred_mode_flag | ae(v) |
| if( ( tile_group_type == I && cu_skip_flag[ x0 ][ y0 ] == 0 ) \|\| | |
| ( tile_group_type != I && (cu_skip_flag[ x0 ][ y0 ] \|\| CuPredMode[ x0 ][ y0 ] != | |
| MODE_INTRA ) ) && sps_ibc_enabled_flag && cbWidth < 32 && cbHeight < 32 ) | |
| pred_mode_ibc_flag | ae(v) |
| } | |
| if( CuPredMode[ x0 ][ y0 ] == MODE_INTRA ) { | |
| // Intra prediction | |
| } else if( treeType != DUAL_TREE_CHROMA ) { /* MODE_INTER or MODE_IBC */ | |
| if( cu_skip_flag[ x0 ][ y0 ] == 0 ) | |
| merge_flag[ x0 ][ y0 ] | ae(v) |
| if( merge_flag[ x0 ][ y0 ] ) { | |
| merge_data( x0, y0, cbWidth, cbHeight ) | |
| } else if ( CuPredMode[ x0 ][ y0 ] == MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_4pel_flag[ x0 ][ y0 ] | ae(v) |
| } | |
| } else { | |
| // inter_pred_idc, inter_affine_flag, cu_affine_type_flag, ref_idx_l0, mvp_l0_flag, ref_idx_l1, mvp | |
| l1_flag, mvd_coding, amvr_flag, amvr_4pel_flag, gbi_idx, etc. | |
| } | |
| } | |
| if( !pcm_flag[ x0 ][ y0 ] ) { | |
| if( CuPredMode[ x0 ][ y0 ] != MODE_INTRA && merge_flag[ x0 ][ y0 ] == 0 ) | |
| cu_cbf | ae(v) |
| if( cu_cbf ) | |
| transform_tree( x0, y0, cbWidth, cbHeight, treeType ) | |
| } | |
| } | |

*FIG. 27*

| coding_unit( x0, y0, cbWidth, cbHeight, treeType ) { | Descriptor |
|---|---|
| if( tile_group_type != I \|\| sps_ibc_enabled_flag ) { | |
| if( treeType != DUAL_TREE_CHROMA ) | |
| cu_skip_flag[ x0 ][ y0 ] | ae(v) |
| if( cu_skip_flag[ x0 ][ y0 ] == 0 && tile_group_type != I) | |
| pred_mode_flag | ae(v) |
| if( ( tile_group_type == I ) \|\| | |
| ( tile_group_type != I && (cu_skip_flag[ x0 ][ y0 ] \|\| CuPredMode[ x0 ][ y0 ] != | |
| MODE_INTRA ) ) && sps_ibc_enabled_flag && cbWidth < 32 && cbHeight < 32 ) | |
| pred_mode_ibc_flag | ae(v) |
| } | |
| // ... | |
| } | |

*FIG. 28*

| coding_unit( x0, y0, cbWidth, cbHeight, treeType ) { | Descriptor |
|---|---|
| if( tile_group_type != I \|\| sps_ibc_enabled_flag ) { | |
|   if( treeType != DUAL_TREE_CHROMA ) | |
|     cu_skip_flag[ x0 ][ y0 ] | ae(v) |
|   if( cu_skip_flag[ x0 ][ y0 ] == 0 && tile_group_type != I)) | |
|     pred_mode_flag | ae(v) |
|   if( ( tile_group_type == I && cu_skip_flag[ x0 ][ y0 ] == 0 ) \|\| | |
|     ( tile_group_type != I && (cu_skip_flag[ x0 ][ y0 ] \|\| CuPredMode[ x0 ][ y0 ] != | |
|   MODE_INTRA ) ) && sps_ibc_enabled_flag && cbWidth < 32 && cbHeight < 32 | |
|   && treeType != DUAL_TREE_CHROMA) | |
|     pred_mode_ibc_flag | ae(v) |
|   } | |
|   // ... | |
| } | |

FIG. 29

| coding_unit( x0, y0, cbWidth, cbHeight, treeType ) { | Descriptor |
|---|---|
|   // ... | |
|   if( CuPredMode[ x0 ][ y0 ] == MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType == SINGLE_TREE \|\| treeType == DUAL_TREE_LUMA ) { | |
|         if( ( y0 % CtbSizeY ) > 0 ) | |
|           intra_luma_ref_idx[ x0 ][ y0 ] | ae(v) |
|         if(intra_luma_ref_idx[ x0 ][ y0 ] == 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] == 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] == 0 && | |
|           intra_subpartitions_mode_flag[ x0 ][ y0 ] == 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType == SINGLE_TREE \|\| treeType == DUAL_TREE_CHROMA ) | |
|         intra_chroma_pred_mode[ x0 ][ y0 ] | ae(v) |
|     } | |
|   } else if( treeType != DUAL_TREE_CHROMA ) { /* MODE_INTER */ | |
|   } | |
|   // ... | |
| } | |

FIG. 30

| coding_unit( x0, y0, cbWidth, cbHeight, treeType ) { | Descriptor |
|---|---|
| if( tile_group_type != I \|\| sps_ibc_enabled_flag) { | |
| if( treeType != DUAL_TREE_CHROMA ) | |
| cu_skip_flag[ x0 ][ y0 ] | ae(v) |
| if( cu_skip_flag[ x0 ][ y0 ] == 0 && tile_group_type != I)) | |
| pred_mode_flag | ae(v) |
| if( ( tile_group_type == I && cu_skip_flag[ x0 ][ y0 ] == 0 ) \|\| | |
| ( tile_group_type != I && (cu_skip_flag[ x0 ][ y0 ] \|\| CuPredMode[ x0 ][ y0 ] != | |
| MODE_INTRA ) ) && sps_ibc_enabled_flag && cbWidth < 32 && cbHeight < 32 ) | |
| pred_mode_ibc_flag | ae(v) |
| } | |
| if( CuPredMode[ x0 ][ y0 ] == MODE_INTRA ) { | |
| // Intra prediction | |
| } else if( treeType != DUAL_TREE_CHROMA ) { /* MODE_INTER or MODE_IBC */ | |
| if( cu_skip_flag[ x0 ][ y0 ] == 0 ) | |
| merge_flag[ x0 ][ y0 ] | ae(v) |
| if( merge_flag[ x0 ][ y0 ] ) { | |
| merge_data( x0, y0, cbWidth, cbHeight ) | |
| } else if( CuPredMode[ x0 ][ y0 ] == MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_4pel_flag[ x0 ][ y0 ] | ae(v) |
| } | |
| } else { | |
| // inter_pred_idc, inter_affine_flag, cu_affine_type_flag, ref_idx_l0, mvp_l0_flag, ref_idx_l1, mvp | |
| l1_flag, mvd_coding, amvr_flag, amvr_4pel_flag, gbi_idx, etc. | |
| } | |
| } else if( treeType == DUAL_TREE_CHROMA && CuPredMode[ x0 ][ y0 ] == MODE_IBC ) { | |
| if( cu_skip_flag[ x0 ][ y0 ] == 0 ) | |
| merge_flag[ x0 ][ y0 ] | ae(v) |
| if( merge_flag[ x0 ][ y0 ] ) { | |
| merge_data( x0, y0, cbWidth, cbHeight ) | |
| } else { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_4pel_flag[ x0 ][ y0 ] | ae(v) |
| } | |
| } | |
| } | |
| // cu_cbf, transform_tree, etc. | |
| } | |

FIG. 31

| coding_unit( x0, y0, cbWidth, cbHeight, treeType ) { | Descriptor |
|---|---|
| if( tile_group_type != I \|\| sps_ibc_enabled_flag ) { | |
| if( treeType != DUAL_TREE_CHROMA && !( cbWidth = = 4 && cbHeight = = 4 && !sps_ibc_enabled_flag ) ) | |
| cu_skip_flag[ x0 ][ y0 ] | ae(v) |
| if( cu_skip_flag[ x0 ][ y0 ] = = 0 && tile_group_type != I && !( cbWidth = = 4 && cbHeight = = 4 ) ) | |
| pred_mode_flag | ae(v) |
| if( ( ( tile_group_type = = I && cu_skip_flag[ x0 ][ y0 ] = =0 ) \|\| ( tile_group_type != I && ( CuPredMode[ x0 ][ y0 ] != MODE_INTRA \|\| ( cbWidth = = 4 && cbHeight = = 4 ) ) ) ) && sps_ibc_enabled_flag && !( cbWidth = = 4 && cbHeight = = 4 && cu_skip_flag[ x0 ][ y0 ] = = 1 ) ) | |
| pred_mode_ibc_flag | ae(v) |
| } | |
| ... | |
| } | |

FIG. 32

| inter_pred_idc | Name of inter_pred_idc | |
|---|---|---|
| | ( cbWidth + cbHeight ) != 8 | ( cbWidth + cbHeight ) = = 8 \|\| ( cbWidth + cbHeight ) = = 12 |
| 0 | PRED_L0 | PRED_L0 |
| 1 | PRED_L1 | PRED_L1 |
| 2 | PRED_BI | n.a. |

| Value of inter_pred_idc | Name of inter_pred_idc | Bin string | |
|---|---|---|---|
| | | ( cbWidth + cbHeight ) != 8 | ( cbWidth + cbHeight ) = = 8 \|\| ( cbWidth + cbHeight ) = = 12 |
| 0 | PRED_L0 | 00 | 0 |
| 1 | PRED_L1 | 01 | 1 |
| 2 | PRED_BI | 1 | - |

FIG. 33

| inter_pred_idc | Name of inter_pred_idc | |
|---|---|---|
| | ( cbWidth + cbHeight ) != 8 && ( cbWidth + cbHeight ) != 12 | ( cbWidth + cbHeight ) == 8 \|\| ( cbWidth + cbHeight ) == 12 |
| 0 | PRED_L0 | PRED_L0 |
| 1 | PRED_L1 | PRED_L1 |
| 2 | PRED_BI | n.a. |

| Value of inter_pred_idc | Name of inter_pred_idc | Bin string | |
|---|---|---|---|
| | | ( cbWidth + cbHeight ) != 8 && ( cbWidth + cbHeight ) != 12 | ( cbWidth + cbHeight ) == 8 \|\| ( cbWidth + cbHeight ) == 12 |
| 0 | PRED_L0 | 00 | 0 |
| 1 | PRED_L1 | 01 | 1 |
| 2 | PRED_BI | 1 | - |

FIG. 34

| inter_pred_idc | Name of inter_pred_idc | |
|---|---|---|
| | ( cbWidth + cbHeight ) != 12 | ( cbWidth + cbHeight ) == 12 |
| 0 | PRED_L0 | PRED_L0 |
| 1 | PRED_L1 | PRED_L1 |
| 2 | PRED_BI | n.a. |

| Value of inter_pred_idc | Name of inter_pred_idc | Bin string | |
|---|---|---|---|
| | | ( cbWidth + cbHeight ) != 12 | ( cbWidth + cbHeight ) == 12 |
| 0 | PRED_L0 | 00 | 0 |
| 1 | PRED_L1 | 01 | 1 |
| 2 | PRED_BI | 1 | - |

FIG. 35

VIDEO SIGNAL PROCESSING METHOD AND DEVICE USING CURRENT PICTURE REFERENCE

CROSS-REFERENCE TO RELATED APPLICATIONS

This application is a continuation of U.S. application Ser. No. 17/343,258, which was filed on Jun. 9, 2021, and which is a continuation of pending PCT International Application No. PCT/KR2019/017639, which was filed on Dec. 12, 2019, and which claims priority under 35 U.S.C. 119(a) to Korean Patent Application No. 10-2018-0160432 filed with the Korean Intellectual Property Office on Dec. 12, 2018, Korean Patent Application No. 10-2019-0019512 filed with the Korean Intellectual Property Office on Feb. 19, 2019, and Korean Patent Application No. 10-2019-0048097 filed with the Korean Intellectual Property Office on Apr. 24, 2019. The disclosures of the above patent applications are incorporated herein by reference in their entirety.

TECHNICAL FIELD

The present disclosure relates to a method and an apparatus for processing a video signal and, more particularly, to a video signal processing method and apparatus for encoding and decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

An aspect of the present disclosure is to increase coding efficiency of a video signal.

Technical Solution

In order to solve the problem, the present disclosure provides a video signal processing apparatus and a video signal processing method.

According to an embodiment of the present disclosure, a method of processing a video signal is provided. The method includes: determining a prediction mode of a current block; when the prediction mode of the current block is a Block Copy (BC) prediction mode referring to a current picture, decoding the current block, based on the BC prediction mode; and when the prediction mode of the current block is an inter prediction mode referring to at least one picture, decoding the current block, based on the inter prediction mode, wherein sets of spatial neighbor locations referred to for decoding the current block in the BC prediction mode include some of sets of spatial neighbor locations referred to for decoding the current block in the inter prediction mode.

According to an embodiment of the present disclosure, a method of processing a video signal is provided. The method includes: determining a prediction mode of a current block; when the prediction mode of the current block is a Block Copy (BC) prediction mode in which a current picture is referred to, generating a bitstream for encoding the current block, based on the BC prediction mode; and when the prediction mode of the current block is an inter prediction mode in which at least one picture is referred to, generating a bitstream for encoding the current block, based on the inter prediction mode, wherein sets of spatial neighbor locations referred to for encoding the current block in the BC prediction mode include some of sets of spatial neighbor locations referred to for encoding the current block in the inter prediction mode.

According to an embodiment of the present disclosure, an apparatus for processing a video signal is provided. The apparatus includes: a processor, wherein the processor is configured to determine a prediction mode of a current block, decode the current block, based on a Block Copy (BC) prediction mode when the prediction mode of the current block is the BC prediction mode in which the current picture is referred to, and decode the current block, based on an inter prediction mode when the prediction mode of the current block is the inter prediction mode in which at least one picture is referred to, and sets of spatial neighbor locations referred to for decoding the current block in the BC prediction mode include some of sets of spatial neighbor locations referred to for decoding the current block in the inter prediction mode.

According to an embodiment of the present disclosure, an apparatus for processing a video signal is provided. The apparatus includes: a processor, wherein the processor is configured to determine a prediction mode of a current block, generate a bitstream for encoding the current block, based on a Block Copy (BC) prediction mode when the prediction mode of the current block is the BC prediction mode in which a current picture is referred to, and generate a bitstream for encoding the current block, based on an inter prediction mode when the prediction mode of the current block is the inter prediction mode in which at least one picture is referred to, and sets of spatial neighbor locations referred to for encoding the current block in the BC prediction mode include some of sets of spatial neighbor locations referred to for encoding the current block in the inter prediction mode.

According to an embodiment of the present disclosure, a computer-readable recording medium storing a bitstream for processing a video signal is provided. The bitstream contains prediction mode information of a target block, and includes a bitstream for encoding the target block, based on a Block Copy (BC) prediction mode when a prediction mode of the target block is the BC prediction mode in which a target picture is referred to and a bitstream for encoding the target block, based on an inter prediction mode when the prediction mode of the target block is the inter prediction mode in which at least one picture is referred to, wherein sets of spatial neighbor locations referred to for encoding the target block in the BC prediction mode include some of sets of spatial neighbor locations referred to for encoding the target block in the inter prediction mode.

Advantageous Effects

According to an embodiment of the present disclosure, it is possible to increase coding efficiency of a video signal.

BRIEF DESCRIPTION OF THE DRAWINGS

FIG. 11 illustrates inter prediction-related syntax according to an embodiment of the present disclosure.

FIG. 18 illustrates a motion vector according to an embodiment of the present disclosure.

FIG. 19 illustrates syntax of an MVD according to an embodiment of the present disclosure.

FIG. 20 illustrates a motion vector according to an embodiment of the present disclosure.

FIG. 21 illustrates syntax of the MVD according to an embodiment of the present disclosure.

FIG. 22 illustrates syntax of the MVD according to an embodiment of the present disclosure.

FIG. 23 illustrates the block and the size according to an embodiment of the present disclosure.

FIG. 24 illustrates the configuration of a merge candidate list according to an embodiment of the present disclosure.

FIG. 25 illustrates block locations and syntax according to an embodiment of the present disclosure.

FIG. 26 illustrates the resetting of a space for storing a history of an HMVP according to an embodiment of the present disclosure.

FIG. 27 illustrates coding unit syntax according to an embodiment of the present disclosure.

FIG. 28 illustrates coding unit syntax according to an embodiment of the present disclosure.

FIG. 29 illustrates coding unit syntax according to an embodiment of the present disclosure.

FIG. 30 illustrates coding unit syntax according to an embodiment of the present disclosure.

FIG. 31 illustrates coding unit syntax according to an embodiment of the present disclosure.

FIG. 32 illustrates a syntax structure according to an embodiment of the present disclosure.

FIG. 33 illustrates a value of inter_pred_idc and binarization according to an embodiment of the present disclosure.

FIG. 34 illustrates a value of inter_pred_idc and binarization according to an embodiment of the present disclosure.

FIG. 35 illustrates a value of inter_pred_idc and binarization according to an embodiment of the present disclosure.

BEST MODE FOR CARRYING OUT THE INVENTION

Figure 1:
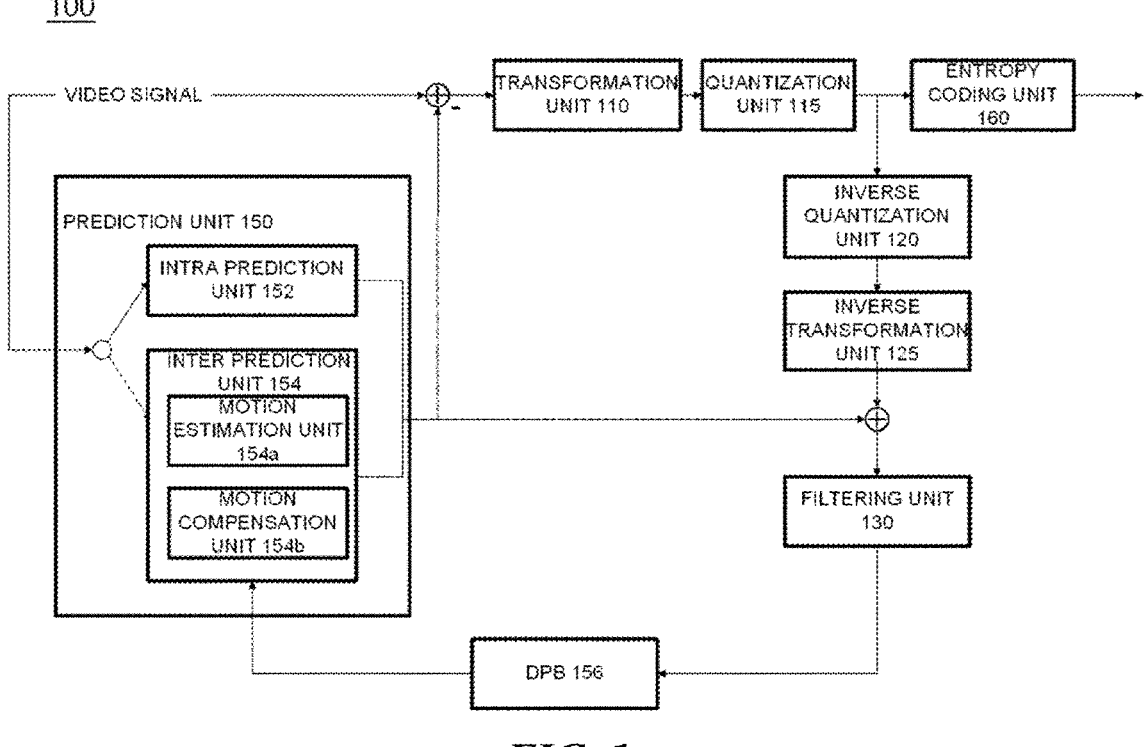
FIG. 1 is a schematic block diagram of a video signal encoding apparatus according to an embodiment of the present invention.

In order to solve the problem, the present disclosure provides a video signal processing apparatus and a video signal processing method.

According to an embodiment of the present disclosure, a method of processing a video signal is provided. The method includes: determining a prediction mode of a current block; when the prediction mode of the current block is a Block Copy (BC) prediction mode referring to a current picture, decoding the current block, based on the BC prediction mode; and when the prediction mode of the current block is an inter prediction mode referring to at least one picture, decoding the current block, based on the inter prediction mode, wherein sets of spatial neighbor locations referred to for decoding the current block in the BC prediction mode includes some of sets of locations of spatial neighbors referred to for decoding the current block in the inter prediction mode. The BC prediction mode may be named an Intra Block Copy (IBC) prediction mode or a Current Picture Referencing (CPR) prediction mode.

Sets of spatial neighbor locations referred to for decoding the current block in the inter prediction mode may include a location of (xCb−1, yCb−1) when an uppermost leftmost location of the current block is (xCb, yCb), and sets of spatial neighbor locations referred to for decoding the current block in the BC prediction mode may not include the location of (xCb−1, yCb−1) when the uppermost leftmost location of the current block is (xCb, yCb).

Sets of spatial neighbor locations referred to for decoding the current block in the BC prediction mode may include at least one of a location of (xCb−1, yCb+cbHeight−1) and a location of (xCb+cbWidth−1, yCb−1) when the uppermost leftmost location of the current block is (xCb, yCb), and cbWidth may be a width of the current block and cbHeight may be a height of the current block.

The operation of determining the prediction mode of the current block may include an operation of acquiring a BC mode parameter (pred_mode_bc_flag) indicating whether the prediction mode of the current block is the BC prediction mode from a bitstream and an operation of determining the prediction mode of the current block as the BC prediction mode, based on the BC mode parameter. The BC mode parameter may be indicated by pred_mode_ibc_flag when the BC mode is named an IBC mode.

When the BC mode parameter is not acquired from the bitstream, if a parallel processing unit to which the current block belongs is a unit which does not refer to a picture other than the current picture as a reference picture and signaling information (sps_bc_enabled_flag) at a higher level than the current block indicates that the BC prediction mode is available, a value of the BC mode parameter may be determined as a value indicating that the BC prediction mode is used. The signaling information (sps_bc_enabled-_flag) at the higher level may be indicated by sps_ibc_en-abled_flag when the BC mode is named the IBC mode.

When the BC mode parameter is not acquired from the bitstream, if a slice to which the current block belongs is a slice which does not refer to a picture other than the current picture as a reference picture, and when signaling informa-tion (sps_bc_enabled_flag) at a higher level than the current block indicates that the BC prediction mode is available, the value of the BC mode parameter may be determined as a value indicating that the BC prediction mode is not used.

When the BC mode parameter is not acquired from the bitstream, if a parallel processing unit to which the current block belongs is a unit which may refer to a picture other than the current picture as a reference picture, the value of the BC mode parameter may be determined as a value indicating that the BC prediction mode is not used.

When the BC mode parameter is not acquired from the bitstream, if a slice to which the current block belongs is a slice which may refer to a picture other than the current picture as a reference picture, the value of the BC mode parameter may be determined as a value indicating that the BC prediction mode is not used.

The operation of determining the prediction mode of the current block may include an operation of acquiring a prediction mode parameter (pred_mode_flag) indicating the prediction mode of the current block from a bitstream before acquiring a BC mode parameter indicating whether the prediction mode of the current block is the BC prediction mode from the bitstream.

When the prediction mode parameter is not acquired from the bitstream, if a parallel processing unit to which the current block belongs is a unit which does not refer to a picture other than the current picture as a reference picture, the prediction mode parameter may be determined as a value indicating an intra prediction mode.

When the prediction mode parameter is not acquired from the bitstream, if a parallel processing unit to which the current block belongs is a unit which may refer to a picture other than the current picture as a reference picture, the prediction mode parameter may be determined as a value indicating the inter prediction mode.

The operation of determining the prediction mode of the current block may include an operation of acquiring a BC mode parameter indicating whether the prediction mode of the current block is the BC prediction mode from a bit-stream. When the BC mode parameter is not acquired from the bitstream, if coding tree type information (treeType) indicating partitioning of the current block is DUAL-_TREE_CHROMA indicating a chroma component, a value of the BC mode parameter may be determined as a value indicating that the BC prediction mode is not used.

The operation of determining the prediction mode of the current block may include an operation of acquiring a prediction mode parameter indicating the prediction mode of the current block from a bitstream, and when the prediction mode parameter is not acquired from the bitstream, if a size of the current block does not correspond to a block size preset as a block size in which inter prediction is limited and a parallel processing unit to which the current block belongs is a unit which may refer to a picture other than the current picture as a reference picture, the prediction mode parameter may be determined as a value indicating inter prediction.

The operation of determining the prediction mode of the current block may include an operation of acquiring a BC mode parameter indicating whether the prediction mode of the current block is the BC prediction mode from a bit-stream, and when the BC mode parameter is not acquired from the bitstream, if a parameter indicating whether a mode of the current block is a skip mode indicates the skip mode and a size of the current block corresponds to a block size preset as a block size in which inter prediction is limited, a value of the BC mode parameter may be determined as a value indicating that the BC prediction mode is used.

When the BC mode parameter is not acquired from the bitstream, if the parameter indicating whether the mode of the current block is the skip mode does not indicate the skip mode, the size of the current block does not correspond to the block size in which inter prediction is limited, and a parallel processing unit to which the current block belongs is a unit which may refer to a picture other than the current picture as a reference picture, the value of the BC mode parameter may be determined as a value indicating that the BC is not used.

The operation of determining the prediction mode of the current block may include an operation of acquiring the prediction mode parameter indicating the prediction mode of the current block from a bitstream before acquiring the BC mode parameter indicating whether the prediction mode of the current block is the BC prediction mode from the bitstream, and when the prediction mode parameter is not acquired from the bitstream, if the size of the current block corresponds to a block size preset as a block size in which inter prediction is limited, the prediction mode parameter may be determined as a value indicating intra prediction.

The operation of decoding the current block, based on the inter prediction mode may include an operation of acquiring an inter prediction type parameter inter_pred_idc indicating an inter prediction type of the current block from a bitstream and an operation of determining a reference list of the current block, based on the size of the current block and the inter prediction type parameter, and the inter prediction type parameter may indicate at least one of reference list L0 and reference list L1 when a sum of the width and the height of the current block is larger than 12, and indicate one of reference list L0 and reference list L1 when a sum of the width and the height of the current block is 12.

When the sum of the width and the height of the current block is larger than 12, bit signaling 00 of the inter predic-tion type parameter may indicate reference list L0, bit signaling 01 may indicate reference list L1, and bit signaling 1 may indicate reference list L0 and reference list L1.

According to an embodiment of the present disclosure, a method of processing a video signal is provided. The method includes: determining a prediction mode of a current block; when the prediction mode of the current block is a Block Copy (BC) prediction mode in which a current picture is referred to, generating a bitstream for encoding the current block, based on the BC prediction mode; and when the prediction mode of the current block is an inter prediction mode in which at least one picture is referred to, generating a bitstream for encoding the current block, based on the inter prediction mode, wherein sets of spatial neighbor locations referred to for encoding the current block in the BC prediction mode include some of sets of spatial neighbor locations referred to for encoding the current block in the inter prediction mode.

According to an embodiment of the present disclosure, an apparatus for processing a video signal is provided. The apparatus includes: a processor, wherein the processor is configured to determine a prediction mode of a current block, decode the current block, based on a Block Copy (BC) prediction mode when the prediction mode of the current block is the BC prediction mode in which the current picture is referred to, and decode the current block, based on an inter prediction mode when the prediction mode of the current block is the inter prediction mode in which at least one picture is referred to, and sets of spatial neighbor locations referred to for decoding the current block in the BC prediction mode include some of sets of spatial neighbor locations referred to for decoding the current block in the inter prediction mode.

Sets of spatial neighbor locations referred to for decoding the current block in the inter prediction mode may include a location of (xCb−1, yCb−1) when an uppermost leftmost location of the current block is (xCb, yCb), and sets of spatial neighbor locations referred to for decoding the current block in the BC prediction mode may not include the location of (xCb−1, yCb−1) when the uppermost leftmost location of the current block is (xCb, yCb).

Sets of spatial neighbor locations referred to for decoding the current block in the BC prediction mode may include at least one of a location of (xCb−1, yCb+cbHeight−1) and a location of (xCb+cbWidth−1, yCb−1) when the uppermost leftmost location of the current block is (xCb, yCb), and cbWidth may be a width of the current block and cbHeight may be a height of the current block.

The processor may be configured to acquire a BC mode parameter indicating whether the prediction mode of the current block is the BC prediction mode from the bitstream and determine the prediction mode of the current block as the BC prediction mode, based on the BC mode parameter.

When the BC mode parameter is not acquired from the bitstream, a parallel processing unit to which the current block belongs is a unit which does not refer to a picture other than the current picture as a reference picture, and signaling information (sps_bc_enabled_flag) at a higher level than the current block indicates that the BC prediction mode is available, a value of the BC mode parameter may be determined as a value indicating that the BC prediction mode is used.

When the BC mode parameter is not acquired from the bitstream, if a slice to which the current block belongs is a slice which does not refer to a picture other than the current picture as a reference picture, the value of the BC mode parameter may be determined as a value indicating that the BC prediction mode is not used.

When the BC mode parameter is not acquired from the bitstream and a parallel processing unit to which the current block belongs is a unit which does not refer to a picture other than the current picture as a reference picture, the value of the BC mode parameter may be determined as a value indicating that the BC prediction mode is not used.

When the BC mode parameter is not acquired from the bitstream, if a slice to which the current block belongs is a slice which may refer to a picture other than the current picture as a reference picture, the value of the BC mode parameter may be determined as a value indicating that the BC prediction mode is not used.

The processor may be configured to acquire a prediction mode parameter indicating the prediction mode of the current block from a bitstream before acquiring a BC mode parameter indicating whether the prediction mode of the current block is the BC prediction mode from the bitstream, and when the prediction mode parameter is not acquired from the bitstream, if a parallel processing unit to which the current block belongs is a unit which docs not refer to a picture other than the current picture as a reference picture, the prediction mode parameter may be determined as a value indicating an intra prediction mode and when the prediction mode parameter is not acquired from the bitstream, if a parallel processing unit to which the current block belongs is a unit which may refer to a picture other than the current picture as a reference picture, the prediction mode parameter may be determined as a value indicating the inter prediction mode The processor may be configured to acquire a BC mode parameter indicating whether the prediction mode of the current block is the BC prediction mode from the bitstream. When the BC mode parameter is not acquired from the bitstream and coding tree type information (treeType) indicating partitioning of the current block is DUAL_TREE_CHROMA indicating a chroma component, a value of the BC mode parameter may be determined as a value indicating that the BC prediction mode is not used.

The processor may be configured to acquire the prediction mode parameter indicating the prediction mode of the current block from the bitstream. When the prediction mode parameter is not acquired from the bitstream, a size of the current block does not correspond to a block size preset as a block size in which inter prediction is limited, and a parallel processing unit to which the current block belongs is a unit which may refer to a picture other than the current picture as a reference picture, the prediction mode parameter may be determined as a value indicating inter prediction.

The processor may be configured to acquire the BC mode parameter indicating whether the prediction mode of the current block is the BC prediction mode from the bitstream, and when the BC mode parameter is not acquired from the bitstream, a parameter indicating whether a mode of the current block is a skip mode indicates the skip mode, and a size of the current block corresponds to a block size preset as a block size in which inter prediction is limited, a value of the BC mode parameter is determined as a value indicating that the BC prediction mode is used.

When the BC mode parameter is not acquired from the bitstream, the parameter indicating whether the mode of the current block is the skip mode does not indicate the skip mode, the size of the current block does not correspond to the block size in which inter prediction is limited, and a parallel processing unit to which the current block belongs is a unit which may refer to a picture other than the current picture as a reference picture, the value of the BC mode parameter may be determined as a value indicating that the BC is not used.

According to an embodiment of the present disclosure, an apparatus for processing a video signal is provided. The apparatus includes: a processor, wherein the processor is configured to determine a prediction mode of a current block, generate a bitstream for encoding the current block, based on a Block Copy (BC) prediction mode when the prediction mode of the current block is the BC prediction mode in which a current picture is referred to, and generate a bitstream for encoding the current block, based on an inter prediction mode when the prediction mode of the current block is the inter prediction mode in which at least one picture is referred to, and sets of spatial neighbor locations referred to for encoding the current block in the BC prediction mode include some of sets of spatial neighbor locations referred to for encoding the current block in the inter prediction mode.

The processor may be configured to acquire a prediction mode parameter indicting the prediction mode of the current block from a bitstream before acquiring a BC mode parameter indicating whether the prediction mode of the current block is the BC prediction mode from the bitstream, and when the prediction mode parameter is not acquired from the bitstream, if a size of the current block corresponds to a block size preset as a block size in which inter prediction is limited, the prediction mode parameter may be determined as a value indicating intra prediction.

The processor may be configured to acquire an inter prediction type parameter indicating an inter prediction type of the current block from the bitstream and determine a reference list of the current block, based on a size of the current block and the inter prediction type parameter, and the inter prediction type parameter may indicate at least one of reference list L0 and reference list L1 when a sum of the width and the height of the current block is larger than 12, and indicate one of reference list L0 and reference list L1 when a sum of the width and the height of the current block is 12.

When the sum of the width and the height of the current block is larger than 12, bit signaling 00 of the inter prediction type parameter may indicate reference list L0, bit signaling 01 may indicate reference list L1, and bit signaling 1 may indicate reference list L0 and reference list L1.

According to an embodiment of the present disclosure, a computer-readable recording medium storing a bitstream for processing a video signal is provided. The bitstream may contain prediction mode information of a target block, and include a bitstream for encoding the target block, based on a Block Copy (BC) prediction mode when a prediction mode of the target block is the BC prediction mode in which a target picture is referred to and a bitstream for encoding the target block, based on an inter prediction mode when the prediction mode of the target block is the inter prediction mode in which at least one picture is referred to, wherein sets of spatial neighbor locations referred to for encoding the target block in the BC prediction mode include some of sets of spatial neighbor locations referred to for encoding the target block in the inter prediction mode.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, the term 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform may be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that may be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DBP 156. The intra prediction unit 152 performs intra prediction from reconstructed samples in the current picture, and transfers intra encoding information to the entropy coding unit 160. The intra encoding information may include at least one of an intra prediction mode, a most probable mode (MPM) flag, and an MPM index. The inter prediction unit 154 may include the motion estimation unit 154a and the motion compensation unit 154b. The motion estimation unit 154a obtains a motion vector value of the current region by referring to a specific region of the reconstructed reference picture. The motion estimation unit 154a transfers a motion information (reference picture index, motion vector information, etc.) for the reference region to the entropy coding unit 160. The motion compensation unit 154b performs motion compensation by using the motion vector value transferred from the motion estimation unit 154a. The inter prediction unit 154 transfers inter encoding information including motion information on the reference region to the entropy coding unit 160.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 obtains a quantized transform coefficient, intra-encoding information, inter-encoding information, and the like to generate a video signal bitstream. In the entropy coding unit 160, a variable length coding (VLC) scheme, an arithmetic coding scheme, etc. may be used. The variable length coding (VLC) scheme includes transforming input symbols into consecutive codewords, and a length of a codeword may be variable. For example, frequently occurring symbols are represented by a short codeword, and infrequently occurring symbols are represented by a long codeword. A context-based adaptive variable length coding (CAVLC) scheme may be used as a variable length coding scheme. Arithmetic coding may transform continuous data symbols into a single prime number, wherein arithmetic coding may obtain an optimal bit required for representing each symbol. A context-based adaptive binary arithmetic code (CABAC) may be used as arithmetic coding.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
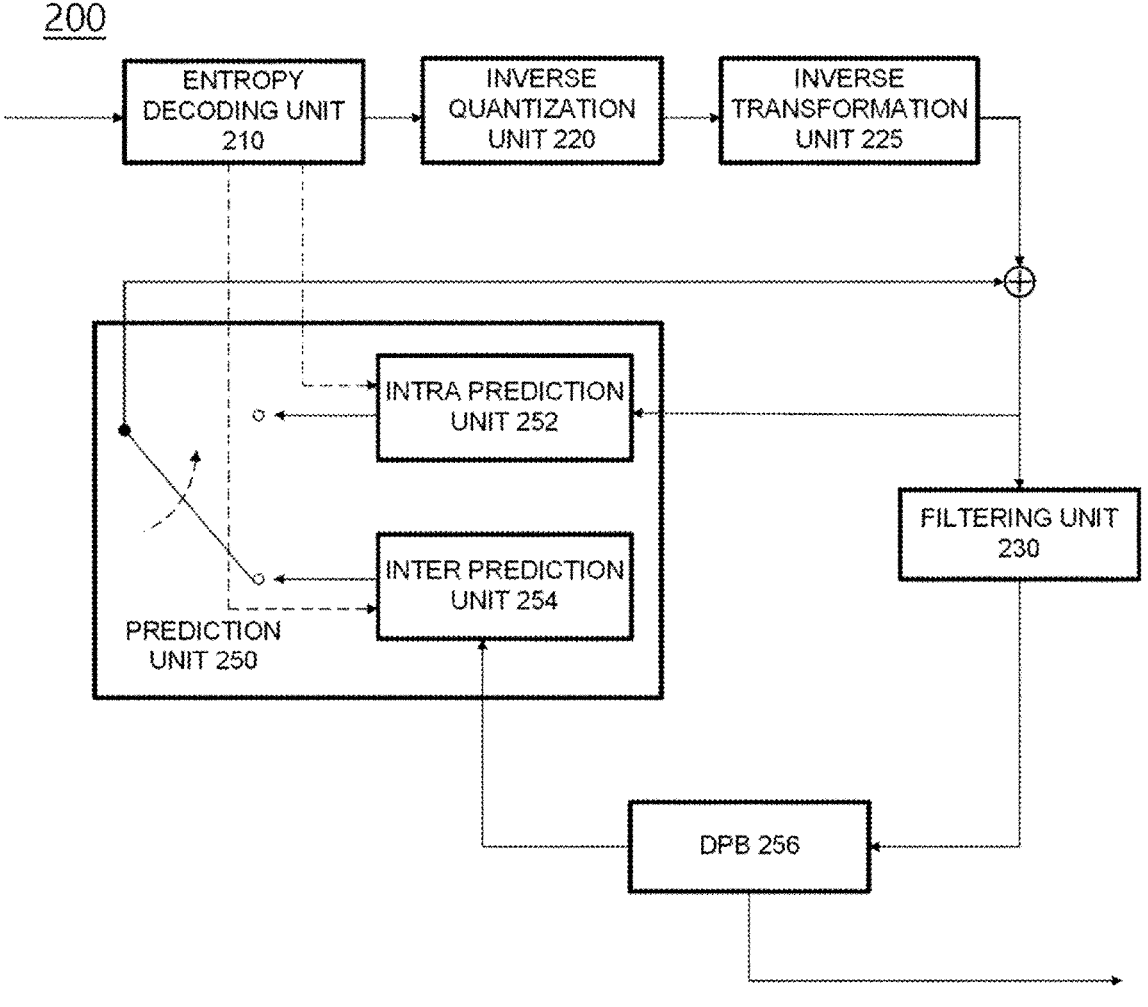
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream to extract transform coefficient information, intra encoding information, inter encoding information, and the like for each region. The entropy decoding unit 210 obtains a quantized transform coefficient by inverse-binarizing a binary code. The inverse quantization unit 220 inverse-quantizes the quantized transform coefficient, and the inverse transformation unit 225 reconstructs a residual value by using the inverse-quantized transform coefficient. The video signal processing device 200 reconstructs an original pixel value by summing the residual value obtained by the inverse transformation unit 225 with a prediction value obtained by the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs intra prediction, is called an intra picture or an I picture (or, tile/slice), and a picture (or, tile/slice) that may perform all of intra prediction, and inter prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the pixel values of the current block by using the reconstructed pixels located on the left and/or upper side of the current block as reference pixels. According to an embodiment, reference pixels may be pixels adjacent to a left boundary and/or an upper boundary of a current block. According to another embodiment, reference pixels may be adjacent pixels within a preset distance from the left boundary of the current block and/or adjacent pixels within a preset distance from the upper boundary of the current block among pixels of neighboring blocks of the current block. In this case, the neighboring blocks of the current block may include at least one of a left (L) block, an above (A) block, a below left (BL)

block, an above right (AR) block, or an above left (AL) block adjacent to the current block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a pixel value of a block specified by a motion vector or an interpolated value thereof may be used as a predictor of the current block. For motion prediction with sub-pel unit pixel accuracy, for example, an 8-tap interpolation filter for a luma signal and a 4-tap interpolation filter for a chroma signal may be used. However, the interpolation filter for motion prediction in sub-pel units is not limited thereto. In this way, the inter prediction unit 254 performs motion compensation to predict the texture of the current unit from motion pictures reconstructed previously.

The reconstructed video picture is generated by adding the predict value outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual value obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
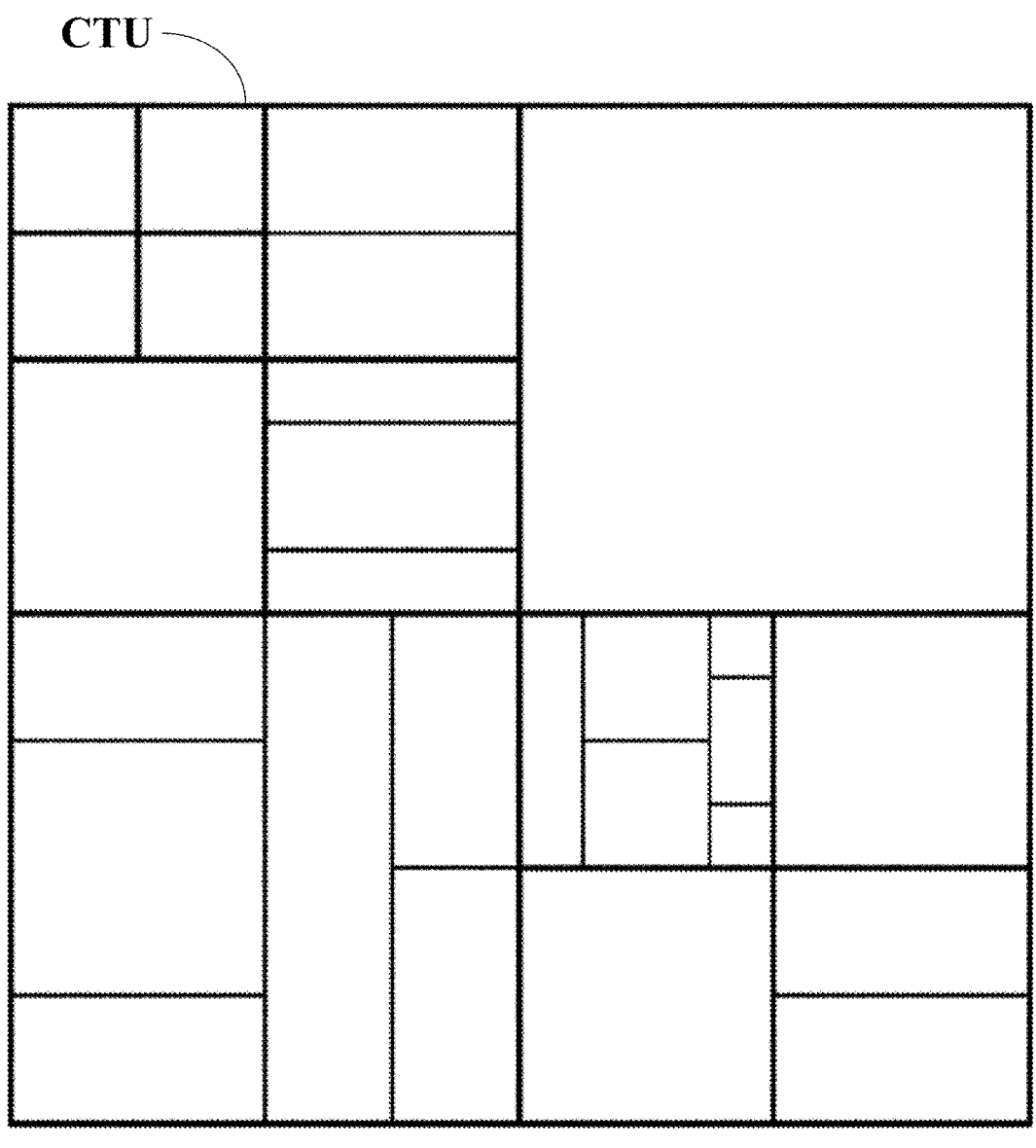
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit may be split into a plurality of coding units. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split may be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)×2N, N×2N, and (N/2)×2N nodes by vertical ternary split, and split into 2N×(N/2), 2N×N, and 2N×(N/2) nodes by horizontal binary split. This multi-type tree split may be performed recursively.

The leaf node of the multi-type tree may be a coding unit. If the coding unit is not large for the maximum transform length, the coding unit is used as a unit of prediction and transform without further division. On the other hand, at least one of the following parameters in the above-described quad tree and multi-type tree may be predefined or transmitted through a high level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTt-Size: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
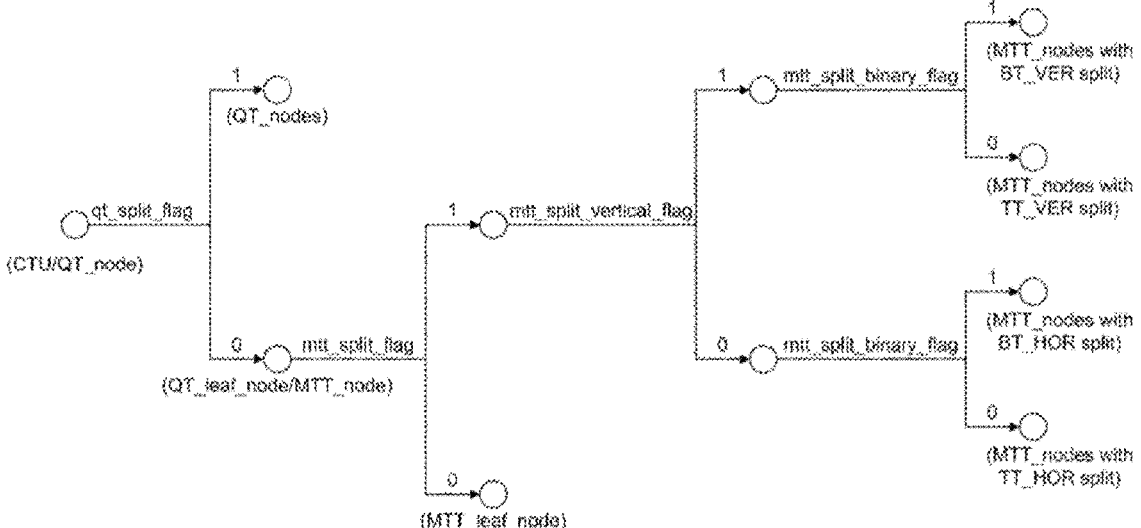
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and may be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Figure 5:
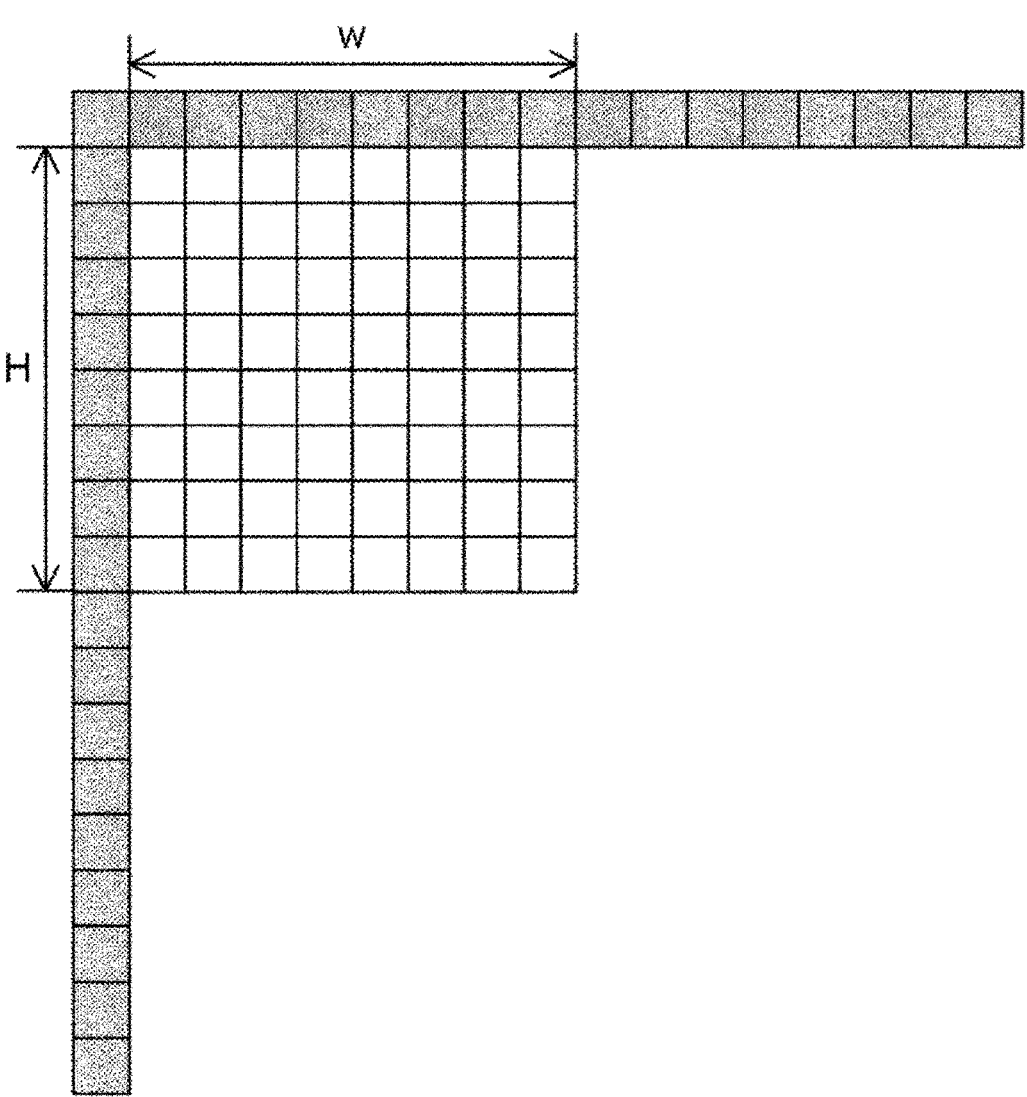
FIG. 5 illustrates an embodiment of reference samples used for predicting a current block in an inter prediction mode.
Figure 6:
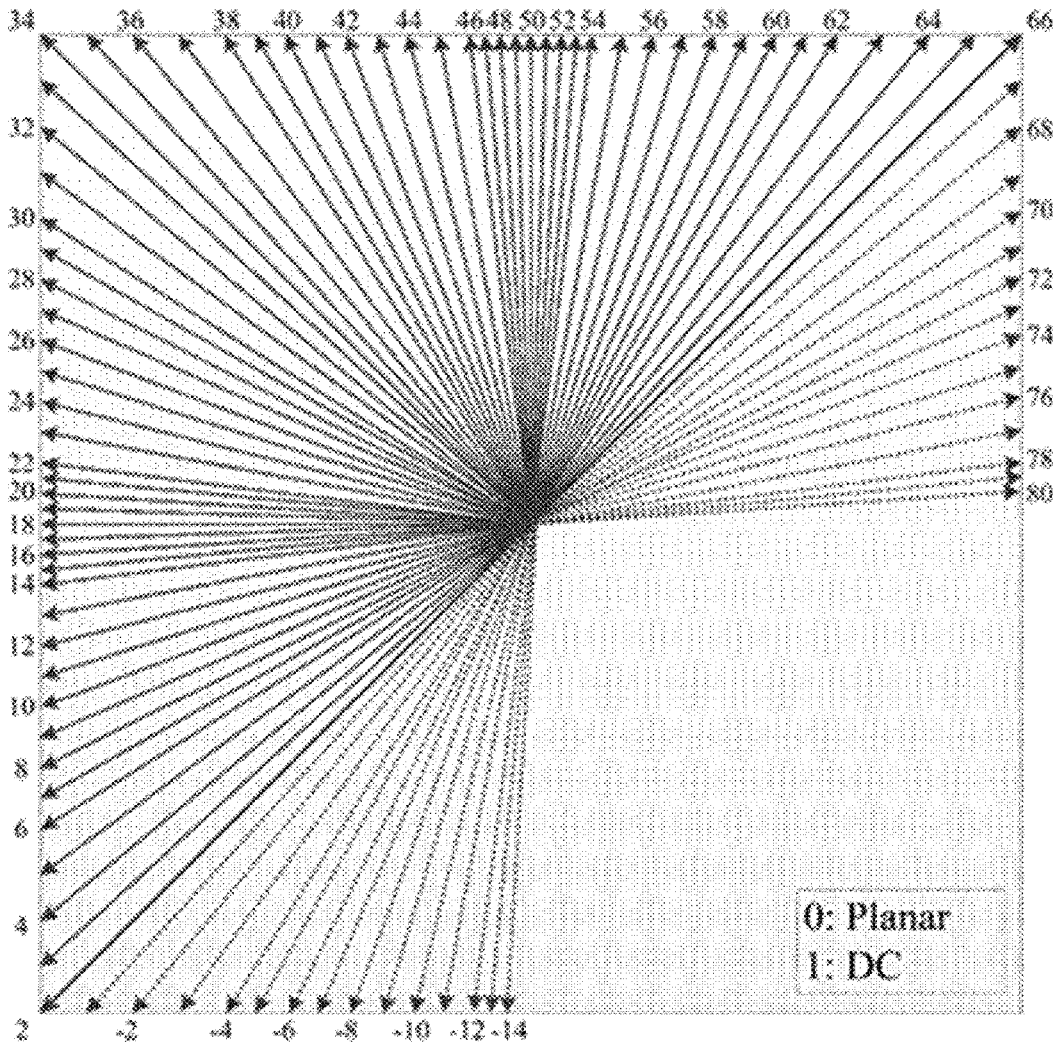
FIG. 6 illustrates an embodiment of prediction modes used in intra prediction.

FIGS. 5 and 6 more specifically illustrate an intra prediction method according to an embodiment of the present invention. As described above, the intra prediction unit predicts the pixel values of the current block by using the reconstructed pixels located on the left and/or upper side of the current block as reference samples.

First, FIG. 5 illustrates an embodiment of reference samples used for predicting the current block in an intra prediction mode. According to an embodiment, reference pixels may be pixels adjacent to a left boundary and/or an upper boundary of a current block. As illustrated in FIG. 5, when the size of the current block is W×H and pixels of a single reference line adjacent to the current block are used for intra prediction, reference pixels may be configured using a maximum of 2 W+2H+1 adjacent pixels located in the left side and/or the upper side of the current block. Meanwhile, according to an additional embodiment of the present disclosure, pixels of multiple reference lines may be used for intra prediction of the current block. The multiple reference lines may include n lines located within a preset range from the current block. According to an embodiment, when pixels of the multiple reference lines are used for intra prediction, separate index information indicating lines to be configured to the reference pixels may be signaled. When at least some of the adjacent pixels to be used as the reference pixels have not yet been reconstructed, an intra predictor may acquire reference pixels through a reference sample padding process according to a preset rule. In addition, the intra predictor may perform a reference sample filtering process to reduce an error in intra prediction. That is, reference pixels may be acquired by filtering adjacent pixels and/or pixels acquired through the reference sample padding process. The intra predictor predicts pixels of the current block using the acquired reference pixels.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a DC mode, and a plurality (e.g., 65) of angle modes (i.e., directional modes). Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. The angle modes respectively indicate angles which are different from each other within a preset angle range. For example, the angle mode may indicate an angle within an angle range (i.e., a first angular range) between 45 degrees and −135 degrees clockwise. The angle mode may be defined based on the 12 o'clock direction. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Meanwhile, a preset angle range may be differently configured according to a shape of the current block. For example, when the current block is a rectangular block, a wide angle mode indicating an angle larger than 45 degrees and smaller than −135 degrees in a clockwise direction may be additionally used. When the current block is a horizontal block, an angle mode may indicate an angle within an angle range (that is, a second angle range) between (45+offset1) degrees and (−135+offset1) degrees in a clockwise direction. In this case, angle modes 67 to 76 out of a first angle range may be additionally used. When the current block is a vertical block, an angle mode may indicate an angle within an angle range (that is, a third angle range) between (45−offset2) degrees and (−135−offset2) degrees in a clockwise direction. In this case, angle modes −10 to −1 out of a first angle range may be additionally used. According to an embodiment of the present disclosure, values of offset1 and offset2 may be determined to be different from each other according to a ratio between the width and the height of the rectangular block. Further, offset1 and offset2 may be positive numbers.

According to an additional embodiment of the present disclosure, a plurality of angle modes included in an intra prediction mode set may include a basic angle mode and an expanded angle mode. In this case, the expanded angle mode may be determined on the basis of the basic angle mode.

According to an embodiment, the basic angle mode may be a mode corresponding to an angle used in intra prediction of the convention High Efficiency Video Coding (HEVC) standard, and the expanded angle mode may be a mode corresponding to an angle newly added to intra prediction of a next-generation video codec standard. More specifically, the basic angle mode may be an angle mode corresponding to one of intra prediction modes {2, 4, 6, . . . , 66}, and the expanded angle mode may be an angle mode corresponding to one of intra prediction modes {3, 5, 7, . . . , 65}. That is, the expanded angle mode may be an angle mode between basic angle modes within the first angle range. Accordingly, an angle indicated by the expanded angle mode may be determined on the basis of an angle indicated by the basic angle mode.

According to another embedment, the basic angle mode may be a mode corresponding to an angle within the preset first angle range, and the expanded angle mode may be a wide angle mode out of the first angle range. That is, the basic angle mode may be an angle mode corresponding to one of intra prediction modes {2, 3, 4, . . . , 66}, and the expanded angle mode may be an angle mode corresponding to one of intra prediction modes {−10, −9, . . . , −1} and {67, 68, . . . , 76}. The angle indicated by the expanded angle mode may be determined as an angle opposite to the angle indicated by the basic angle mode. Accordingly, an angle indicated by the expanded angle mode may be determined on the basis of an angle indicated by the basic angle mode. Meanwhile, the number of expanded angle modes is not limited thereto, and additional expanded angles may be defined according to the size and/or shape of the current block. For example, the expanded angle mode may be defined as an angle mode corresponding to one of intra prediction modes {−14, −13, . . . , −1} and {67, 68, . . . , 80}. Meanwhile, a total number of intra prediction modes included in the intra prediction mode set may vary depending on the configuration of the basic angle mode and the expanded angle mode.

In the embodiments, the interval between the expanded angle modes may be configured on the basis of the interval between the basic angle modes. For example, the interval between the expanded angle modes {3, 5, 7, . . . , 65} may be configured on the basis of the interval between the basic angle modes {2, 4, 6, . . . , 66}. Further, the interval between the expanded angle modes {−10, −9, . . . , −1} may be determined on the basis of the interval between the corresponding basic angle modes {56, 57, . . . , 65} on the opposite side, and the interval between the expanded angle modes {67, 68, . . . , 76} may be determined on the basis of the interval between the corresponding basic angle modes {3, 4, . . . , 12} on the opposite side. The angle interval between the expanded angle modes may be configured to be the same as the angle interval between the basic angle modes. Further, the number of expanded angle modes in the intra prediction mode set may be configured to be equal to or smaller than the number of basic angle modes.

According to an embodiment of the present disclosure, the expanded angle mode may be signaled on the basis of the basic angle mode. For example, the wide angle mode (that is, the expanded angle mode) may replace at least one angle mode (that is, basic angle mode) within the first angle range. The replaced basic angle mode may be an angle mode corresponding to the opposite side of the wide angle mode. That is, the replaced basic angle mode may be an angle mode corresponding to an angle in a direction opposite to the angle indicated by the wide angle mode or corresponding to an angle having a difference by a preset offset index from the angle in the opposite direction. According to an embodiment of the present disclosure, the preset offset index is 1. An intra prediction mode index corresponding to the replaced basic angle mode may be mapped to the wide angle mode again and signal the corresponding wide angle mode. For example, wide angle modes {−10, −9, . . . , −1} may be signaled by intra prediction mode indexes {57, 58, . . . , 66}, and wide angle modes {67, 68, . . . , 76} may be signaled by intra prediction mode indexes {2, 3, . . . , 11}. As the intra prediction mode indexes for the basic angle modes signal the expanded angle modes, the prediction mode indexes in the same set may be used for signaling intra prediction modes even though configurations of the angle modes used for intra prediction of blocks are different from each other. Accordingly, it is possible to minimize signaling overhead according to a change in the configuration of the intra prediction mode.

Meanwhile, whether to use the expanded angle mode may be determined on the basis of at least one of the shape and the size of the current block. According to an embodiment, when the size of the current block is larger than a preset size, the expanded angle mode may be used for intra prediction of the current block. Otherwise, only the basic angle mode may be used for intra prediction of the current block. According to another embodiment, when the current block is not a rectangular block, the expanded angle mode may be used for intra prediction of the current block. When the current block is a rectangular block, only the basic angle mode may be used for intra prediction of the current block.

The intra predictor determines reference pixels and/or interpolated reference pixels to be used for intra prediction of the current block on the basis of intra prediction mode information of the current block. When the intra prediction mode index indicates a specific angle mode, a reference pixel or an interpolated reference pixel corresponding to the specific angle from the current pixel of the current block may be used for prediction of the current pixel. Accordingly, reference pixels and/or interpolated reference pixels in different sets may be used for intra prediction according to the intra prediction mode. When intra prediction of the current block has been performed using reference pixels and intra prediction mode information, a decoder reconstructs pixel values of the current block by adding a residual signal of the current block acquired from an inverse converter to an intra prediction value of the current block.

Figure 7:
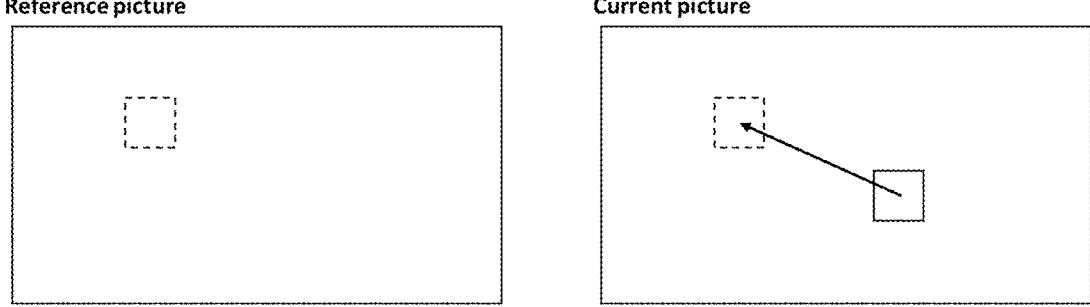
FIG. 7 illustrates inter prediction according to an embodiment of the present disclosure.

FIG. 7 illustrates inter prediction according to an embodiment of the present disclosure.

As described above, when the current picture or block is encoded or decoded, prediction may be performed from another picture or block. That is, encoding or decoding may be performed on the basis of similarity with another picture or block. A part similar to another picture or block may be encoded or decoded through omitted signaling in the current picture or block, which is described below in more detail. Prediction in units of blocks is possible.

Referring to FIG. 7, there is a reference picture on the left side and a current picture on the right side, and the current picture or some of the current picture may be predicted using similarity with the reference picture or some of the reference picture. When a rectangle indicated by solid lines within the current picture of FIG. 7 is a block to be currently encoded or decoded, the current block may be predicted from a rectangle indicated by dotted lines of the reference picture. In this case, there may be information indicating a block (reference block) to which the current block should refer, and the information may be directly signaled or made by appointment to reduce signaling overhead. Information indicating the block to which the current block should refer may include a motion vector. The motion vector may be a vector indicating a relative location between the current block and the reference block within the picture. Referring to FIG. 7, there is a part indicated by dotted lines of the reference picture, and a vector indicating how to move the current block to the block to which the current block should refer may be a motion vector. That is, the block appearing when the current block moves according to the motion vector may be a part indicated by dotted lines in the current picture of FIG. 7, and the location of the part indicated by the dotted lines in the picture may be the same as the location of the reference block of the reference picture.

Information indicating the block to which the current block should refer may include information indicating the reference picture. The information indicating the reference picture may include a reference picture list and a reference picture index. The reference picture list is a list indicating reference pictures, and a reference block may be used in a reference picture included in the reference picture list. That is, the current block may be predicted from the reference picture included in the reference picture list. A reference picture index may be an index indicating a reference picture to be used.

Figures 8, 9:
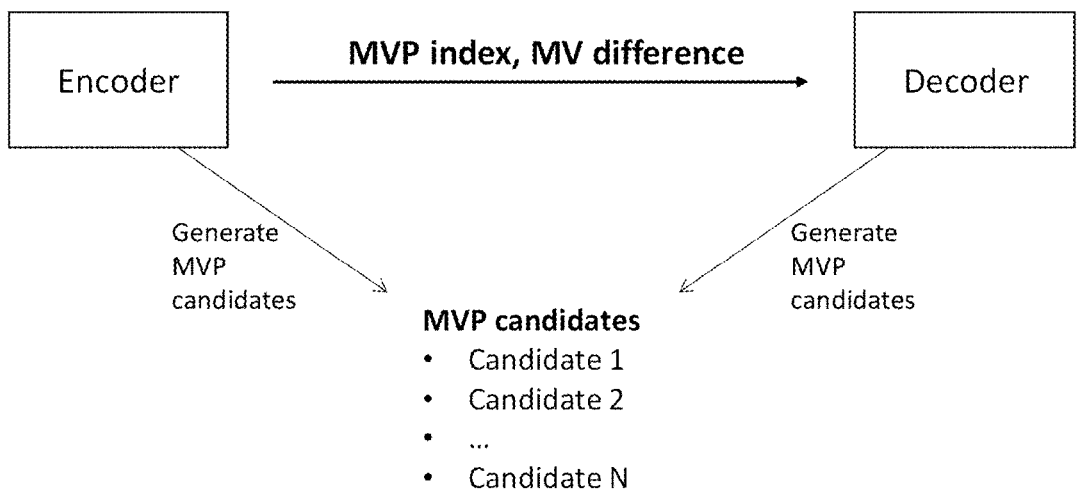
FIG. 8 illustrates a motion vector signaling method according to an embodiment of the present disclosure.
FIG. 9 illustrates syntax of a Motion Vector Difference (MVD) according to an embodiment of the present disclosure.

FIG. 8 illustrates a motion vector signaling method according to an embodiment of the present disclosure.

According to an embodiment of the present disclosure, a Motion Vector (MV) may be generated on the basis of a Motion Vector Predictor (MVP). For example, the MVP may become a motion vector as shown below.

$$MV = MVP$$

In another example, the motion vector may be based on a Motion Vector Difference (MVD) as shown below. The MVD may be added to the MVP in order to indicate an accurate motion vector.

$$MV = MVP + MVD$$

Motion vector information determined by an encoder in video coding may be transmitted to a decoder, and the decoder may generate a motion vector from the received motion vector information and determine a predicted block. For example, the motion vector information may include information on the MVP and the MVD. In this case, elements of the motion vector information may vary depending on a mode. For example in a merge mode, the motion vector information may include information on the MVP but may not include the MVD. In another example, in an Advanced Motion Vector Prediction (AMVP) mode, the motion vector information may include information on the MVP and the MVD.

In order to determine, transmit, and receive the information on the MVP, the encoder and the decoder may generate MVP candidates through the same method. For example, the encoder and the decoder may generate the same MVP candidates in the same order. The encoder may transmit an index indicating a determined MVP among the generated MVP candidates to the decoder, and the decoder may recognize the determined MVP and an MV on the basis of the index.

The MVP candidates and the method of generating the MVP candidates may include spatial candidates, temporal candidates, and the like. The spatial candidate may be a motion vector for a block at a predetermined location from the current block. For example, the spatial candidate may be a motion vector corresponding to a block or a location which is adjacent or is not adjacent to the current block. The temporal candidate may be a motion vector corresponding to a block within a picture different from the current picture. Alternatively, the MVP candidates may include an affine motion vector, an ATMVP, an STMVP, a combination of the above-described motion vectors, an average vector of the above-described motion vectors, a zero motion vector, and the like.

The information indicating the reference picture may also be transmitted from the encoder to the decoder. When the reference picture corresponding to the MVP candidate does not correspond to information indicating the reference picture, motion vector scaling may be performed. Motion vector scaling may be calculation based on a Picture Order Count (POC) of the current picture, a POC of the reference picture of the current block, a POC of the reference picture of the MVP candidate, and the MVP candidate.

FIG. 9 illustrates MVD syntax according to an embodiment of the present disclosure.

The MVD may be coded while a sign and an absolute value of the MVD are separated. That is, the sign and the absolute value of the MVD may be different syntaxes. Further, the absolute value of the MVD may be directly coded, but may be coded while including a flag indicating whether the absolute value is larger than N as illustrated in FIG. 9. When the absolute value is larger than N, a value of (absolutevalue–N) may also be signaled. In the example of FIG. 9, abs_mvd_greater0_flag may be transmitted, and the flag may indicate whether the absolute value is larger than 0. When abs_mvd_greater0_flag indicates that the absolute value is not larger than 0, it may be determined that the absolute value is 0. When abs_mvd_greater0_flag indicates that the absolute value is larger than 0, there may be additional syntax. For example, abs_mvd_greater1_flag may exist, and the flag may indicate whether the absolute value is larger than 1. When abs_mvd_greater1_flag indicates that the absolute value is not larger than 1, it may be determined that the absolute value is 1. If abs_mvd_greater1_flag indicates that the absolute value is larger than 1, additional syntax may exist. For example, abs_mvd_minus2 may exist, and may correspond to a value of (absolute value–2). Since it is determined that the absolute value is larger than 1 (larger than or equal to 2) through abs_mvd_greater0_flag and abs_mvd_greater1_flag, it indicates (absolute value–2). Binarization of abs_mvd_minus2 to a variable length is for signaling with smaller bits. For example, there are variable length binarization methods such as Exp-Golomb, truncated unary, truncated Rice, and the like. Also, mvd_sign_flag may be a flag indicating a sign of the MVD.

Although the coding method has been described through the MVD in this embodiment, information other than the MVD may be separated into a sign and an absolute value, and the absolute value may be coded with a flag indicating whether the absolute value is larger than any value and a value obtained by subtracting any value from the absolute value.

In FIG. 9, [0] and [1] may indicate component indexes. For example, [0] and [1] may indicate an x-component and a y-component.

Further, in FIG. 9, cpIdx may indicate a control point index. The control point index may be an index corresponding to a control motion vector index in affine motion prediction. In prediction methods other than the affine motion prediction, cpIdx may be used as a preset value, for example, 0.

Figure 10:
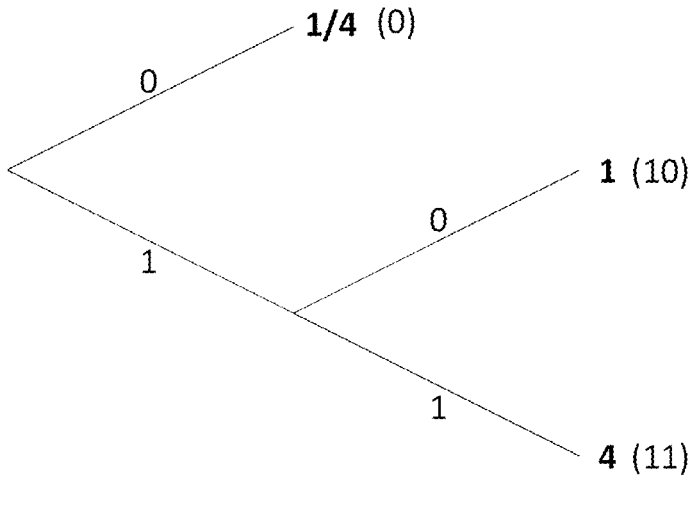
FIG. 10 illustrates Adaptive Motion Vector Resolution (AMVR) signaling according to an embodiment of the present disclosure.

FIG. 10 illustrates Adaptive Motion Vector Resolution (AMVR) signaling according to an embodiment of the present disclosure.

According to an embodiment of the present disclosure, there may be various resolutions indicating a motion vector or an MVD. In other words, there may be various resolutions with which the motion vector or the MVD is coded. For example, the resolution may be indicated on the basis of a pixel (pel). For example, the motion vector or the MVD may be signaled in units of ¼ (quarter), ½ (half), 1 (integer), 2, or 4 pixels. For example, when 16 is desired as the result, coding may be performed by 64 in units of ¼ (¼*64=16), coding may be performed by 16 in units of 1 (1*16=16), and coding may be performed by 4 in units of 4 (4*. 4=16). That is, the value may be determined as shown below.

$$valueDetermined = \text{resolution} * valuePerResolution$$

valueDetermined may be a value, that is, a motion vector or an MVD in the present embodiment. valuePerResolution may be a value indicating valueDetermined in the [/resolution] unit.

In this case, when a value signaled by the motion vector or the MVD is not divisible by a resolution, an inaccurate value, which is not the best performance motion vector or MVD, may be transmitted due to rounding or the like. The use of a high resolution may decrease inaccuracy but increase a value to be coded, and thus more bits may be used. The use of a low resolution may increase inaccuracy but decrease a value to be coded, and thus fewer bits may be used.

Further, it is possible to differently configure the resolution in units of blocks, CUs, slices, and the like. Accordingly, the resolution may be adaptively applied to fit the unit.

The resolution may be signaled from the encoder to the decoder. Signaling of the resolution may be the signaling binarized with the variable length. In this case, when the signaling is performed with an index corresponding to the smallest value (the frontmost value), signaling overhead is reduced.

In an embodiment, signaling indexes may match resolutions in the order from a high resolution (detailed signaling) to a low resolution.

FIG. 10 illustrates signaling of three resolutions. The three signals may be 0, 10, and 11, and correspond to resolution 1, resolution 2, and resolution 3, respectively. Since signaling of resolution 1 needs 1 bit and signaling of the remaining resolutions need 2 bits, the signaling of resolution 1 has smaller signaling overhead. In the example of FIG. 10, resolution 1, resolution 2, and resolution 3 are ¼, 1, and 4 pels, respectively.

Hereinafter, the motion vector resolution may mean the resolution of the MVD in the present disclosure.

Figure 11:
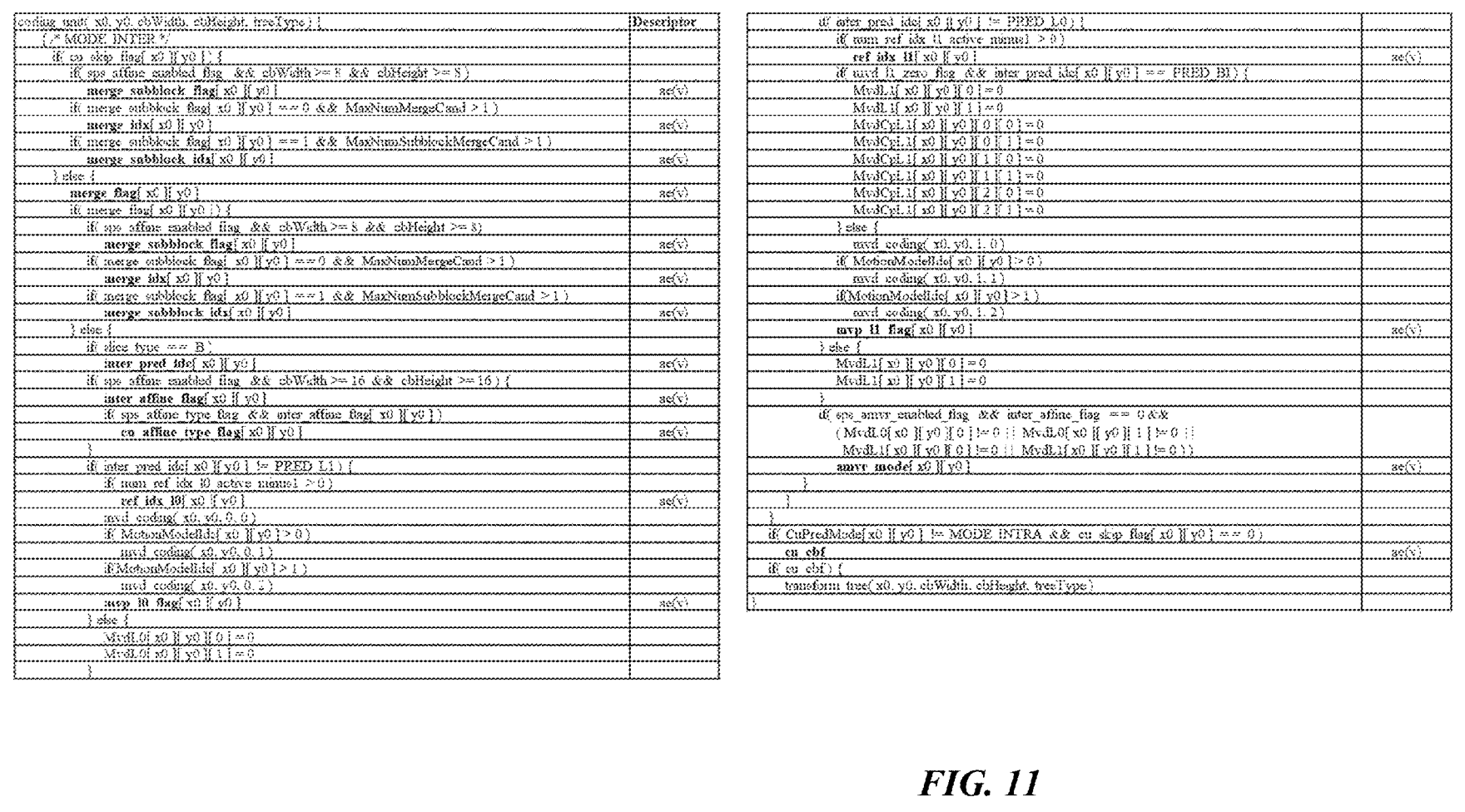

FIG. 11 illustrates inter prediction-related syntax according to an embodiment of the present disclosure.

According to an embodiment of the present disclosure, an inter prediction method may include a skip mode, a merge mode, an inter mode, and the like. According to an embodiment, in the skip mode, a residual signal may not be transmitted. In the skip mode, an MV determination method which is the same as that in the merge mode may be used. Whether to use the skip mode may be determined according to a skip flag. Referring to FIG. 11, whether to use the skip mode may be determined according to a value of cu_skip_flag.

According to an embodiment, no MVD may be used in the merge mode. A motion vector may be determined on the basis of a motion candidate index. Whether to use the merge mode may be determined according to a merge flag. Referring to FIG. 11, whether to use the merge mode may be determined according to a value of the merge_flag. When the skip mode is not used, the merge mode may be used.

One candidate may be selectively used among one or more candidate list types in the skip mode or the merge mode. For example, a merge candidate or a subblock merge candidate may be used. The merge candidate may include a spatial neighboring candidate, a temporal neighboring candidate, and the like. Further, the merge candidate may include a candidate using a motion vector for the entire current block (CU). That is, motion vectors of respective subblocks belonging to the current block may include the same candidate. The subblock merge candidate may include a subblock-based temporal MV, an affine merge candidate, and the like. Further, the subblock merge candidate may include a candidate which may use different motion vector for respective subblocks of the current block (CU). The affine merge candidate may be a method made through a scheme of determining a control point motion vector of affine motion prediction without using the MVD. The subblock merge candidate may include methods of determining a motion vector in units of subblocks in the current block. For example, the subblock merge candidate may include a plane MV, a regression-based MV, an STMVP, and the like as well as the subblock-based temporal MV and the affine merge candidate.

According to an embodiment, the MVD may be used in the inter mode. The MVP may be determined on the basis of a motion candidate index, and the motion vector may be determined on the basis of the MVP and the MVD. Whether to use the inter mode may be determined according to information on whether other modes are used or not. In another embodiment, whether to use the inter mode may be determined by a flag. FIG. 11 illustrates an example of using the inter mode in the case in which other modes, such as the skip mode and the merge mode, are not used.

The inter mode may include an AMVP mode, an affine inter mode, and the like. The inter mode may be a mode of determining a motion vector on the basis of the MVP and the MVD. The affine inter mode may be a method of using the MVD when determining a control point motion vector of affine motion prediction.

Referring to FIG. 11, after the skip mode or the merge mode is determined, it may be determined whether to use the subblock merge candidate or the merge candidate. For example, when a specific condition is satisfied, merge_subblock_flag indicating whether the subblock merge candidate is used may be parsed. The specific condition may be a condition related to the block size. For example, the specific condition may be a condition related to a width, a height, an area, or the like, or may use a combination thereof. Referring to FIG. 11, the specific condition may be, for example, a condition in the case in which the width and the height of the current block (CU) are larger than or equal to a specific value. When merge_subblock_flag is parsed, the value may be inferred as 0. When merge_subblock_flag is 1, the subblock merge candidate may be used. When merge_subblock_flag is 0, the merge candidate may be used. merge_subblock_idx corresponding to a candidate index may be parsed when the subblock merge candidate is used, and merge_idx corresponding to a candidate index may be parsed when the merge candidate is used. When a maximum number of candidate lists is 1, no parsing may be performed. When merge_subblock_idx or merge_idx is not parsed, the value may be inferred as 0.

FIG. 11 illustrates a function of coding_unit, and the content related to intra prediction may be omitted or FIG. 11 may indicate the case in which inter prediction is determined.

Figure 12:
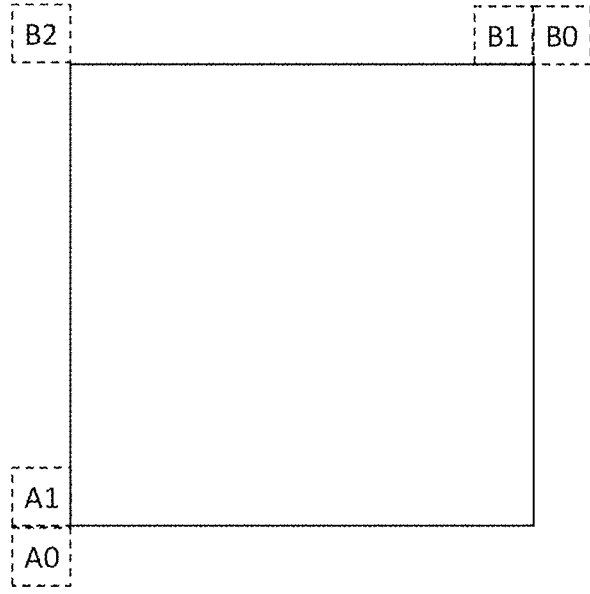
FIG. 12 illustrates spatial neighboring locations according to an embodiment of the present disclosure.

FIG. 12 illustrates locations of spatial neighbors according to an embodiment of the present disclosure.

As described above, locations around the current block may be referred to when prediction is performed. This may mean that motion information corresponding to the locations around the current block is referred to. For example, when the merge mode, the AMVP mode, or the like is used, the MVP or the MV may be configured on the basis of motion information corresponding to locations around the current block. The locations therearound may be preset. When there are a plurality of locations therearound, the order in which the locations are referred to may be preset. The locations therearound may include a spatial neighbor and a temporal neighbor.

Referring to FIG. 12, locations corresponding to A0, A1, B0, B1, and B2 may be preset. The locations may be luma locations. When the uppermost leftmost location of the current block is (xCb, yCb), A0, A1, B0, B1, and B2 may be (xCb−1, yCb+cbHeight), (xCb−1, yCb+cbHeight−1), (xCb+cbWidth, yCb−1), (xCb+cbWidth−1, yCb−1), and (xCb−1, yCb−1), respectively. In this case, cbWidth and cbHeight may be the width and the height of the current block, respectively.

According to an embodiment of the present disclosure, the spatial neighbors may be referred to in the order of A1, B1, B0, A0, and B2 in the merge mode. A spatial candidate corresponding to a location of a spatial neighbor may be added to a candidate list. A temporal candidate may be added as well as the spatial candidate, and may be behind the spatial candidate. A motion vector corresponding to the temporal candidate may be called a collocated motion vector.

When the candidate list is not full, a zero motion vector may be added to the candidate list. The zero motion vector may be a motion vector indicating the current block location.

The merge candidate list may include a history-based motion vector prediction candidate, a pairwise average candidate, and the like. The candidates may be located behind the spatial candidate in the candidate list. The history-based motion vector prediction candidate may be stored motion information. The stored motion information may be motion information corresponding to a block decoded (encoded) before the current block. The pairwise average candidate may be a candidate generated on the basis of candidates already added to the candidate list. For example, the pairwise average candidate may be an average of candidates already added to the candidate list.

The method of adding the candidates to the candidate list with reference to the locations around the current block may include a vector scaling process. Motion vector scaling may be performed on the basis of a Picture Order Count (POC) of the reference picture of the referred motion information, a POC of a picture including the current block, a POC of the reference picture of the current block, referred motion information, and the like.

According to an embodiment of the present disclosure, preset spatial neighbor locations may be grouped. The groups may refer to a preset number of pieces of motion information. For example, group 1 may refer to a preset number of pieces of motion information, and group 2 may refer to a preset number of pieces of motion information. For example, the preset number may be 1. Further, a reference order within the group may be preset. A candidate addition order between groups may be preset.

Referring to FIG. 12, group 1 may include A0 and A1, and group 2 may include B0, B1, and B2. Further, candidates may be generated from motion information available in group 1, and candidates may be generated from motion information available in group 2. Candidates from group 1 may be added to the candidate list and candidates from group 2 may be added to the candidate list sequentially. For example, the candidate list may be made as described above in the AMVP mode.

When the candidate list is not full, a scaled candidate, a temporal candidate, a zero motion vector, and the like may be added.

Figure 13:
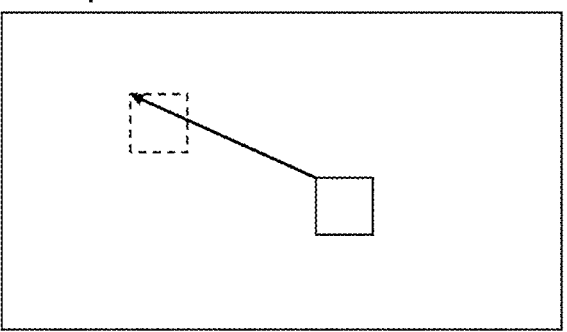
FIG. 13 illustrates referencing of a current picture according to an embodiment of the present disclosure.

FIG. 13 illustrates a current picture reference according to an embodiment of the present disclosure.

As described above, a block within the reference block may be referred to when the current block is predicted. According to an embodiment of the present disclosure, the reference picture may be a picture including the current block, that is, the current picture. Therefore, the block of the current picture may be referred to when the current block is predicted. Such a technology may be called Current Picture Referencing (CPR).

According to an embodiment, when CPR is used, the current block may be the only reference picture. In this case, inference may be performed without signaling indicating the reference picture.

According to an embodiment, when CPR is used, there may be a motion vector indicating a reference block to which the current block refers. According to an embodiment, when CPR is used, the location of the reference block may be limited. For example, the location of the reference block may be limited on the basis of the location of the current block. For example, the location of the reference block may be limited to the inside of a CTU including the current block. Alternatively, the location of the reference block may be limited to a location including at least some of the CTU including the current block. Limiting the location of the reference block may be to reduce memory load.

According to an embodiment of the present disclosure, there may be signaling indicating whether the current block uses CPR. In an embodiment, the signaling may be signaling in the larger unit including the current block. For example, signaling at a slice level or a tile level is possible. For example, signaling at a level at which parallel processing may be performed is possible. In an embodiment, for example, when the reference picture to which the current block refers is the current picture, CPR may be used. Alternatively, when the current picture is the only reference picture, CPR may be used. In addition, when the current block is a block which does not use intra prediction, CPR may be used. That is, for example, when a reference picture corresponding to the current block is the current picture, CPR may be used if intra prediction is not used. In an embodiment, information indicating that the current picture is the only reference picture may be indicated by a parameter of CurrPicIsOnlyRef. Alternatively, using CPR may mean that the reference picture is the current picture. Alternatively, using CPR may mean that the reference picture is the current picture and intra prediction is not used.

According to an embodiment of the present disclosure, when CPR is used, motion information may be indicated using the merge mode, the AMVP mode, and the like.

Further, when CPR is used, the current slice or tile may be configured as a P slice or a P tile. When CPR is used, a flag indicating the use of a dual tree may be configured as a value indicating the use of the dual tree. The dual tree may mean that a tree corresponding to luma and a tree corresponding to chroma are different.

Referring to FIG. 13, the current block indicated by solid lines may be within the current picture. Further, the reference block indicated by dotted lines may exist within the current picture. In this case, there may be motion information indicating the location of the reference block. Referring to FIG. 13, the arrow may be motion information indicating the location of the reference block.

According to an embodiment of the present disclosure, when CPR is used, the configuration of a candidate list may become different. For example, when CPR is used, a temporal candidate may not be added to the candidate list.

According to an embodiment of the present disclosure, when CPR is used, motion information referred to from surroundings may not be scaled.

Figures 14, 15:
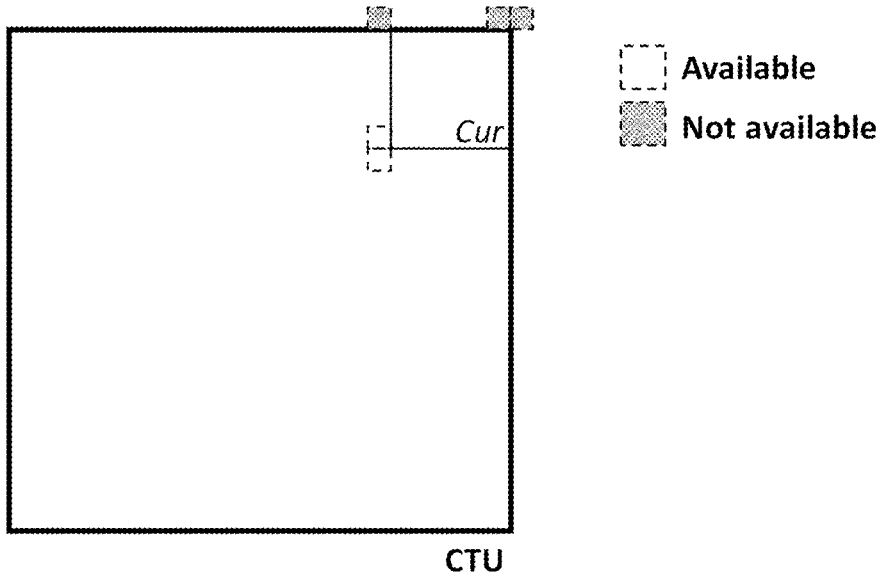
FIG. 14 illustrates a method of referring to a neighboring candidate according to an embodiment of the present disclosure.
FIG. 15 illustrates block locations and the configuration of a motion candidate list according to an embodiment of the present disclosure.

FIG. 14 illustrates a spatial neighboring candidate reference method according to an embodiment of the present disclosure.

According to an embodiment of the present disclosure, when the current block uses CPR, a candidate list configuration method may be different from the case in which no CPR is used. For example, when the current block uses CPR, a spatial neighboring candidate addition method may be different from the case in which no CPR is used. For example, when the current block uses CPR, motion information at a location beyond the range within which the reference block of CPR may be located may not be referred to. Alternatively, when the current block uses CPR, motion information at a location beyond the range based on the range within which the reference block of CPR may be located may not be referred to. The range within which the reference block of CPR may be located may be a CTU range to which the current block belongs. According to an embodiment of the present disclosure, motion information may not be referred to from the location beyond the current CTU. For example, when the current block borders a range boundary on which the reference block may be located, a preset spatial neighbor location may be out of the range within which reference block may be located. Particularly, when the preset spatial neighbor location of FIG. 12 is referred to, if the current block borders a top boundary or a left boundary of the range within which the reference block may be located, a plurality of preset spatial neighbor locations may escape the range within which the reference block may be located.

Referring to FIG. 14, the location of the reference block may be limited to the inside of the CTU. According to an embodiment, motion from the location beyond the range within which the reference block may be located may not be referred to. For example, when the current block is located at the boundary of the range which the reference block may have, the preset spatial neighbor location may escape the range within which the reference block may be located. In FIG. 14, preset spatial neighbors around the current block are marked with small dotted rectangles. In this case, it may be determined that the location out of the CTU is not available.

This is because, if the location beyond the range within which the reference block may be located is referred to, motion information at the location has a narrow range in order to prevent the reference block of the current block or the reference block at the referred location from being beyond the limited range. For example, in the case of FIG. 14, the reference block in the part marked as not available should not be out of the CTU to which the reference block belongs. In order to prevent the location indicated by the motion information in the part marked as not available from escaping the range within which the reference block of the current block may be located, a y component of the motion information in the referred part of FIG. 14 should be 0. When the current block borders the left boundary, an x component of the motion information in the referred part beyond the boundary should be 0. Even in the state in which the x component or the y component is 0 and the remaining component is not 0, if only one sign (for example, negative) of one component is effective in a preset coding order or the component has the other sign, it may be highly likely to make the MVD large.

In an additional description in which the reference block is limited to the inside of the current CTU, only the inside of the CTU is used as the reference block, and thus there is little correlation between MVs. When it is not possible to correct the MVD such as in the merge mode, a reference block of the current block or a neighboring block exceeds the CTU range if there are both x and y components of the MV in the outside of the CTU. For example, when the current block is on a boundary above the CTU, the current block or the neighboring block exceeds the CTU range if there is a y component of the MV of the upper block.

Since the entire slice is current-picture-referenced (CPR), the neighboring block also may have used intra or CPR.

When the current block is on a tile boundary (or in the case of the slice rather than CPR), the surroundings may use inter rather than CPR, in which case the neighboring MV may indicate a remote place and thus escape from the CTU. Since the neighboring MV indicates another picture, there may be little correlation.

According to an embodiment of the present disclosure, only when a spatial neighbor location referred to by the current block using CPR uses CPR, motion information may be referred to. Alternatively, when the spatial neighbor location referred to by the current block using CPT does not use CPR, motion information may not be referred to therefrom.

According to another embodiment, motion information at the spatial neighbor location may be referred to after being clipped to a range which a reference block corresponding to the current block may have.

As illustrated in the embodiment of FIG. 14, when the available spatial neighbor location is reduced, a total number of candidates may be reduced. In this case, it is possible to reduce candidate index signaling. For example, when a spatial neighboring candidate at a preset location and a zero motion vector may be added to a candidate list or when i) a spatial neighboring candidate at a preset location, ii) a limited number of HMVP candidates or a pairwise average candidate, or iii) a zero motion vector may be added to a candidate list, if the available spatial neighbor location is reduced, a total number of candidates may be reduced. In this case, the number of bits may be reduced by binarizing an index through a reduction in a maximum value of a candidate index.

Alternatively, when the available spatial neighbor location is reduced as illustrated in the embodiment of FIG. 14, a candidate, which may be added after the spatial neighbor candidate, may be added to the front of the candidate list, and thus the number of bits corresponding to a candidate index may be reduced when the candidate, which may be added after the spatial neighbor candidate, is used.

FIG. 15 illustrates block locations and the configuration of a motion candidate list according to an embodiment of the present disclosure.

According to an embodiment of the present disclosure, the number of candidates which may refer to motion information at preset locations may be small. For example, according to the situation described with reference to FIG. 14, available spatial neighbor locations may be reduced. For example, when the current block borders the top boundary or the left boundary of the range that the reference block may have, the number of available candidates may be small. In this case, even though availability is not detected with reference to the corresponding spatial neighbor (for example, even though it is not detected whether the corresponding spatial neighbor location has used intra prediction or inter prediction), the decoder and the encoder may determine that there are no candidates corresponding to the corresponding spatial neighbor. In this case, the location of a zero MV may be moved forward in the candidate list.

Accordingly, it may be determined whether a candidate index indicates a zero MV through the candidate index according to an embodiment of the present disclosure. For example, when some of the spatial neighbor locations are excluded according to the current block location and a range in which the spatial neighbor locations may be referred to as neighbors, if the number of indexes is larger than or equal to the number of all of the remaining available candidates, the zero motion vector may be determined. For example, when the zero motion vector is added after the spatial neighbor candidate, if the number of indexes is larger than or equal to the number of available spatial neighbor candidates, the zero motion vector may be determined. For example, when some of the spatial neighbor locations are excluded according to the current block location and a range in which the spatial neighbor locations may be referred to as neighbors, if the number of remaining spatial neighbor locations is M and a value of an index starting from 0 is M, a candidate added after the spatial neighbor candidate may be determined and, if the zero MV comes after the spatial neighbor candidate, the zero MV may be determined.

For example, like the case of a block marked with A in FIG. 15, there may be a case in which the current block borders the left boundary of the range within which the reference block may be located. In this case, as illustrated in FIG. 14, if motion information at the location out of the range within which the reference block may be located is not referred to, the left location of the current block may not be used. Accordingly, only the locations except for the left location may be used. Alternatively, in this case, when motion information at the location out of the range within which the reference block may be located is not referred to as illustrated in FIG. 14, locations A0, A1, and B3 described in FIG. 12 may not be used. Accordingly, only B0 and B1 may be used. In an embodiment, both B0 and B1 may be used in the merge mode, and only one of B0 and B1 may be used in the AMVP mode. Accordingly, when an index is 2, starting from 0 in the merge mode, it may be determined that the candidate is a candidate which comes after the spatial neighbor candidate. Further, when the index is 1, starting from 0 in the AMVP mode, it may be determined that the candidate is a candidate which comes after the spatial neighbor candidate. That is, when the zero MV comes after the spatial neighbor candidate, the zero MV may be determined by the index.

Further, like the case of the block marked with B in FIG. 15, there may be a case in which the current block borders the upper boundary of the range within which the reference block may be located. In this case, when motion information at the location out of the range within which the reference block may be located is not referred to as described in FIG. 14, the upper location of the current block may not be used. Accordingly, only the locations except for the upper location of the current block may be used. Alternatively, in this case, when motion information at the location out of the range within which the reference block may be located is not referred to as described in FIG. 14, locations B0, B1, and B2 described in FIG. 12 may not be used. Accordingly, only A0 and A1 are available. In an embodiment, both A0 and A1 may be used in the merge mode, and only one of A0 and A1 may be used in the AMVP mode. Accordingly, when the index is 2, starting from 0 in the merge mode, it may be determined that the candidate is a candidate which comes after a spatial neighbor candidate. Further, when the index is 1, starting from 0 in the AMVP mode, it may be determined that the candidate is a candidate which comes after the spatial neighbor candidate. That is, when a zero MV comes after the spatial neighbor candidate, the zero MV may be determined by the index.

Referring to FIG. 15, the configuration of an AMVP candidate list is illustrated in the case in which the location of the reference block is limited to the current CTU range and motion information at the location out of the current CTU is not referred to. When the current block borders the CTU left boundary or upper boundary as indicated by A or B in FIG. 15, a maximum number of spatial neighbor candidates may be 1, and the remaining candidates may be filled with zero MVs. For example, in the configuration of the AMVP candidate list, the location of one of A0 and A1 and the location of one of B0, B1, and B2 may be used as spatial neighbor candidates. Accordingly, when the current block borders the left boundary like the block A in FIG. 15, the location of one of B0 and B1 may be used as the spatial neighbor candidate. When the current block borders the upper block like the block B in FIG. 15, the location of one of A0 and A1 may be used as the spatial neighbor candidate. Accordingly, when the candidate index is 1, it may be determined that the MVP is the zero MV.

According to an embodiment of the present disclosure, if a zero MV is indicated through a candidate index, embodiments to be described with reference to FIGS. 18 to 22 may be performed. For example, MVD coding may be changed. For example, in a specific case, a sign of an MVD component may be signaled and determined without any syntax parsing.

Figure 16:
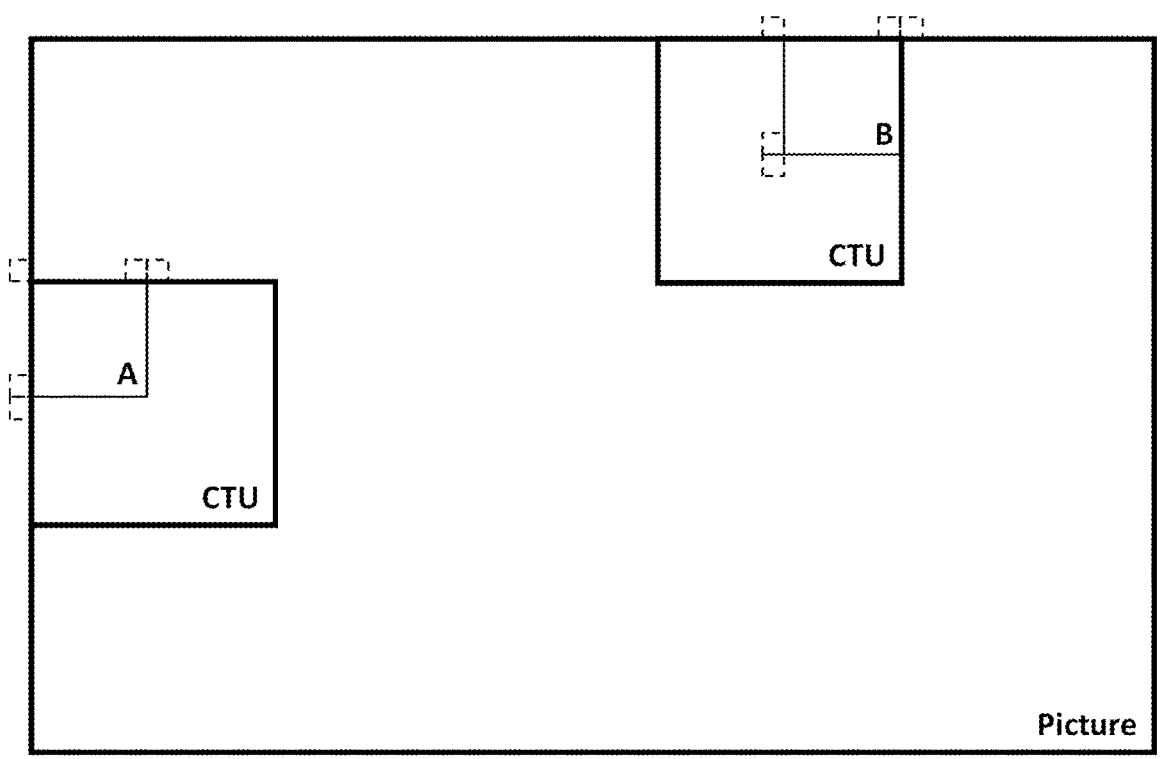
FIG. 16 illustrates block locations and the configuration of a motion candidate list according to an embodiment of the present disclosure.

FIG. 16 illustrates block locations and the configuration of a motion candidate list according to an embodiment of the present disclosure.

According to an embodiment of the present disclosure, motion information at the location out of a picture may not be referred to. This may include both the case in which the CPR is used and the case in which the CPR is not used.

According to an embodiment of the present disclosure, the location which the reference block may have in the CPR may be inside the picture. Alternatively, according to an embodiment of the present disclosure, the location which the reference block may have in the CPR may be an area including the inside of the picture.

Referring to FIG. 16, when the current block borders the picture boundary, spatial neighbor locations may be limited. This is because motion information at the location out of the picture may not be referred to. For example, when the current block borders the left boundary of the picture (in the case of the block marked with A in FIG. 16), the left location of the current block may not be referred to. Further, when the current block borders the upper boundary of the picture (in the case of the block marked with B in FIG. 16), the upper location of the current block may not be referred to.

Accordingly, in this case, it is possible to reduce a maximum value of binarization or determine a zero MV.

When the CPR is used as described above, a temporal candidate, a scaled candidate, or the like may not be used.

In the case in which the CPR is first used and the AMVP mode is used, when the current block is adjacent to the picture boundary according to the present embodiment, available spatial neighbor locations may be limited. Particularly, when the current block borders the left boundary or the upper boundary, motion information at left locations of the current block and upper locations of the current block may not be referred to. Accordingly, a maximum number of spatial candidates available when an AMVP candidate list is configured may be 1. When a value indicated by a candidate index (a flag if a maximum number of candidates is 2) is 1 (when the candidate index starts from 0), a motion vector corresponding to the candidate index may be determined as a zero motion vector.

When the merge mode is used, if the current block is adjacent to the picture boundary according to the present embodiment, available spatial neighbor locations may be limited. Particularly, when the current block borders the left boundary or the upper boundary, motion information at left locations of the current block and upper locations of the current block may not be referred to. Accordingly, in the embodiment of FIG. 12, a maximum number of locations which may be referred to may be 2. Therefore, it may be determined that a motion vector corresponding to the case in which the number of merge candidate indexes is larger than or equal to a maximum number which may be referred to does not come from the spatial neighbor candidates.

When only the spatial neighbor candidate and the zero MV are used in the merge mode using the CPR, the zero MV may be determined through the candidate index in the above case. However, since the zero MV may be meaningless in the CPR merge mode, a maximum value of a candidate index corresponding to a variable length may be configured as (the number of available spatial neighbor candidates−1). Accordingly, the number of bits of any index value may be reduced.

In another embodiment, a spatial neighbor candidate, an HMVP candidate, a pairwise average candidate, and the like may be included in a candidate list in the merge mode using the CPR. In this case, when the maximum number of available spatial neighbor candidates is limited as illustrated in the above-described embodiment, the number of available pairwise average candidates may be reduced. This is because the number of combinations of spatial neighbor candidates may be reduced. If available spatial neighbor candidate locations are 2 in embodiments of FIGS. 12 and 16, the number of pairwise average candidates may be 1. Further, there may be a preset part in which a space for storing a history is reset in the HMVP. For example, a space for storing a history in the HMVP may be reset in every CTU row. This is to facilitate parallel processing. Further, this is because the encoder and the decoder should maintain the same history. Accordingly, an HMVP candidate may not be added to the candidate list in the preset part in which the space for storing the history is reset in the HMVP. When the CPR is used and spatial neighbor locations are limited, if the space for storing the history is reset in the HMVP, the maximum number of available candidates may be further reduced. For example, the maximum number of spatial neighbor locations in the left boundary of the picture may be limited to 2, and the space for storing the history in the HMVP may be reset in a start part of the CTU row. In this case, a maximum of two spatial neighbor candidates may be included in the candidate list, and the HMVP candidate may be included. Even if the pairwise average candidate may be added, there is only one combination when the pairwise average is made. Accordingly, when the pairwise average candidate may be added, there may be a maximum of three candidates and a zero motion vector. In an embodiment in which the pairwise average candidate may not be added, there may be a maximum of two candidates and a zero motion vector. Accordingly, it is possible to reduce the maximum value of the candidate index and reduce the number of bits of the index.

In another embodiment, when the CPR is used, the pairwise average candidate may not be used. This is because useful motion vectors are more limited in the case in which the CPR is used than in the case in which the CPR is not used.

In another embodiment, when the current block is adjacent to the left boundary of the picture, the HMVP candidate may not be used. Alternatively, when the current block is adjacent to the boundary in which the history of the HMVP is reset (for example, when x coordinates of the reset location and the upper left side of the current block are the same), the HMVP candidate may not be used. If the space for storing the history of the HMVP is reset at the beginning of the CTU row, motion information may not be varied in the history when the CTU in the leftmost side of the picture is coded. Accordingly, in the case of a block adjacent to the left boundary of the picture, an x component of a motion vector should be 0 or positive. Further, in this case, a direction of the motion vector stored in the history is limited, and thus a block adjacent to the left boundary may have difficulty in using the same. Accordingly, when the current block is adjacent to the left boundary of the picture, the HMVP candidate may not be used. In this case, through a combination with the above embodiment, in the case of the block adjacent to the left boundary of the picture, a maximum of two spatial neighbor candidates, a maximum of one pairwise average candidate, and a zero MV may be added to the merge candidate list. Accordingly, the maximum value of the index may be binarized to 3 (if the index starts from 0) when the zero MV may be added, and the maximum value of the index may be binarized to 2 (if the index starts from 0) when the zero MV may not be added.

According to an embodiment of the present disclosure, the current block being adjacent to the left, right, upper, and lower boundaries of the picture may be determined on the basis of coordinates of the current block, the width of the current block, the height of the current block, the width of the current picture, the height of the current picture, and the like. Uppermost leftmost coordinates of the current block may be (x0, y0). The width and the height of the current block may be cbWidth and cbHeight, respectively. The width and the height of the current picture may be pic Width and picHeight, respectively. If (x0==0) is true, the current block may be adjacent to the left boundary of the picture. If ((x0+cbWidth)==picWidth) is true, the current block may be adjacent to the right boundary of the picture. If (y0==0) is true, the current block may be adjacent to the upper boundary of the picture. If ((y0+cbHeight)==picHeight) is true, the current block is adjacent to the lower boundary of the picture.

The case in which the CPR is used has been described above, but the operation may be performed if a temporal motion vector may not be used or if a reference picture of a neighboring block and a reference picture of the current block are the same even though the CPR is not used.

Figure 17:
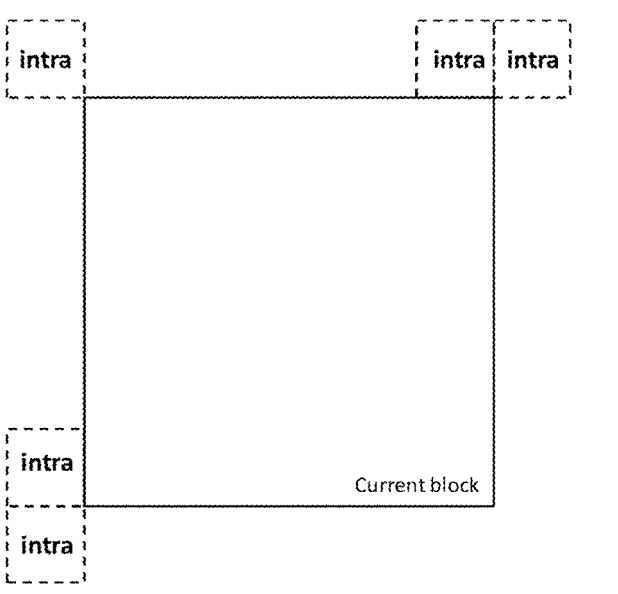
FIG. 17 illustrates the use of spatial neighbor candidates according to an embodiment of the present disclosure.

FIG. 17 illustrates the use of spatial neighbor candidates according to an embodiment of the present disclosure.

According to an embodiment of the present disclosure, there may be a case in which spatial neighbor locations may not be used. If a preset location has passed through intra prediction, motion information may not be referred to from the corresponding location. According to an embodiment of the present disclosure, the number of available spatial neighbor candidates may be reduced according to whether preset spatial neighbor locations use intra prediction. Alternatively, the number of available spatial neighbor candidates may be reduced according to whether preset spatial neighbor locations use inter prediction which may be referred to. For example, the number of available spatial neighbor candidates may be reduced according to whether preset spatial neighbor locations use inter prediction using the CPR.

For example, in the AMVP mode, among the spatial neighbor locations, all of the left locations or all of the upper locations have passed through intra prediction (except for the part beyond the picture or the location which has not been decoded). Alternatively, in the AMVP mode, among the spatial neighbor locations, none of the left locations or none of the upper locations have passed through inter prediction which may be referred to (except for the part beyond the picture or the location which has not been decoded). That is, none of the left locations or none of the upper locations may refer to the motion information. In this case, when only one of the left location or the upper location may be referred to, the number of available spatial neighbor candidates may be 1, and when an index is 1, a zero MV may be determined. Alternatively, when none of the left locations or the upper locations may be referred to (for example, all of the preset locations have performed inter prediction as illustrated in FIG. 17), the number of available spatial neighbor candidates may be 0, and when an index is 0, a zero MV may be determined. Alternatively, when none of the left locations and the upper locations may be referred to (for example, all of the preset locations have performed inter prediction as illustrated in FIG. 17), the number of available spatial neighbor candidates may be 0 and index transmission and parsing may be omitted. Further, the index may be 0 and the zero MV may be inferred.

In another example, when motion information may not be referred to in the preset spatial neighbor locations, the locations may be excluded in the syntax parsing step and it is possible to change a maximum number of candidates. The case in which the motion information may not be referred to may include the case in which the corresponding location uses intra prediction. Alternatively, the case in which the motion information may not be referred to may include the case in which the corresponding location escapes the picture or has not been decoded in a coding order.

If it is assumed that the motion information may not be referred to in all of the preset locations in the merge mode, no spatial neighbor candidate may be added to the candidate list. Accordingly, it is possible to use the HMVP candidate, the pairwise average candidate, and the like as candidates. In this case, when the current block is positioned at the location at which the space for storing the history of the HMVP is reset as described before, the HMVP candidate also may not be added. Further, when the pairwise average candidate is ahead of the HMVP candidate or the HMVP candidate may not be added, the pairwise average candidate also may not appear. Accordingly, only the zero MV may remain as the available candidate. However, in the CPR, the zero MV may be meaningless. In this case, signaling indicating the merge mode may be omitted (transmission and parsing may be omitted). Further, it may be inferred that the merge mode is not used. For example, signaling indicating the merge mode may be merge_flag. According to an embodiment of the present disclosure, when the CPR is used, none of the preset spatial neighbor locations around the current block may be used (including the case in which the corresponding locations escape the picture, the case in which the corresponding locations have passed through intra prediction, and the case in which the corresponding locations do not use the CPR), and when the current block is positioned at the location at which the space for storing the history of the HMVP is reset, signaling indicating the merge mode may be omitted and it may be inferred that the merge mode is not used. The location at which the space for storing the history of the HMVP is reset may be the same as a location at which the CTU row starts or a preset location at which the HMVP candidate is not used.

In another example, the motion information may not be referred to except for one preset spatial neighbor location. The case in which the motion information may not be referred to may include the case in which the corresponding location escapes the picture, the case in which the corresponding location has passed through intra prediction, and the case in which the corresponding location does not use the CPR. In this case, if another candidate is not added except for one spatial neighbor candidate as described in the above embodiment, pairwise average candidates may not be made. Since the space for storing the history of the HMVP is a reset part, the HMVP candidate may not be included. Accordingly, at such a location, a maximum value of the candidate index may be changed and binarized. For example, the motion information may not be referred to at any of the remaining locations other than one preset spatial neighbor location, and a maximum of one spatial neighbor candidate, a maximum of 0 HMVP candidates, and a maximum of 0 pairwise average candidates may be made in the part in which the space for storing the history of the HMVP is reset. Accordingly, in an embodiment in which the zero MV may be added to the candidate, a candidate index may be signaled by a 1-bit flag. However, in this case, transmission and parsing of the candidate index may be omitted, and the index may be inferred as 0. This is because the zero MV is meaningless in the CPR. In an embodiment in which the zero MV may not be added to the candidate, the number of available candidates may be only one, in which case transmission and parsing of the candidate index may be omitted and the index may be inferred as 0.

FIG. 18 illustrates a motion vector according to an embodiment of the present disclosure.

According to an embodiment of the present disclosure, a value which the motion vector may have may be limited according to a coding order. Further, this may correspond to the case in which the CPR is used. For example, the motion vector may not indicate a lower right direction according to the coding order. This is because a block on the right side or the lower side of the current block has not been decoded according to the coding order. According to an embodiment of the present disclosure, when the CPR is used, an x component of the motion vector may be larger than or equal to 0 and a y component may not be larger than or equal to 0. That is, when the CPR is used, the motion vector may not correspond to (x component>=0 && y component>=0).

According to the embodiments illustrated in FIGS. 14 to 17, the MVP may be the zero MV. Particularly, the fact that the MVP is the zero MV may be known during the syntax parsing step. In this case, the MVD (MVD) may not indicate a lower right direction. That is, the MVD may not correspond to (x component>=0 && y component>=0). In another embodiment, the MV may not correspond to (x component>−(current block width) && y component>(−current block height)). That is, when the zero MV is used as the MVP, the MVD may not correspond to (x component>−(current block width) && y component>(−current block height)). According to an embodiment of the present disclosure, a range of the y component may be restricted according to the x component of the MV or the MVD.

According to an embodiment, the component of the MVD may be separated and coded. For example, the MVD may be coded as illustrated in FIG. 9. For example, component 1 and component 2 may be separately coded. For example, component 1 and component 2 may be sequentially coded. In an embodiment, component 1 and component 2 may be an x component and a y component, respectively. The following embodiments may be a case in which the MVP is the zero MV.

According to an embodiment of the present disclosure, when component 1 is larger than 0, component 2 may be smaller than 0. More specifically, when component 1 is larger than 0, an absolute value of component 2 may be larger than or equal to a minimum block size. When component 1 is larger than 0, the absolute value of component 2 may be larger than or equal to a current block height.

According to an embodiment of the present disclosure, when component 1 is 0, component 2 may not be 0. When component 1 is 0, component 2 may be smaller than 0. More specifically, when component 1 is 0, the absolute value of component 2 may be larger than or equal to the minimum block size. When component 1 is 0, the absolute value of component 2 may be larger than or equal to the current block height.

According to an embodiment of the present disclosure, when component 1 is smaller than 0 and the absolute value thereof is smaller than the minimum block size, component 2 may not be 0. Further, in this case, component 2 may be smaller than 0. More specifically, in this case, the absolute value of component 2 may be larger than or equal to the minimum block size. In this case, the absolute value of component 2 may be larger than or equal to the current block height.

According to an embodiment of the present disclosure, when component 1 is smaller than 0 and the absolute value thereof is smaller than the current block width, component 2 may not be 0. Further, in this case, component 2 may be smaller than 0. More specifically, in this case, the absolute value of component 2 may be larger than or equal to the minimum block size. In this case, the absolute value of component 2 may be larger than or equal to the current block height.

Referring to FIG. 18, the x-component value of the MV in the current block may be as illustrated in the drawing. In this case, the reference block of the CPR may be within a shaded area in FIG. 18. Accordingly, a value which the y component may have may be limited. That is, the y-component value may be limited according to the x-component value.

FIG. 19 illustrates MVD syntax according to an embodiment of the present disclosure.

As illustrated in FIG. 9, the MVD may be coded while being separated into the x component and the y component. Referring to FIG. 19, values corresponding to [0] and [1] may be the x component and the y component, respectively. Further, abs_mvd_greater0_flag may be a flag indicating whether an absolute value of the corresponding component is larger than 0. abs_mvd_greater1_flag may be a flag indicating whether an absolute value of the corresponding component is larger than 1. abs_mvd_minus2 may be a value obtained by subtracting 2 from the absolute value of the corresponding component. mvd_sign_flag may be a flag indicating a sign of the corresponding component. The value of 0 of mvd_sign_flag may indicate positive and the value of 1 of mvd_sign_flag may indicate negative.

The embodiments illustrated in FIG. 18 may be reflected in MVD coding syntax of FIG. 19.

In FIG. 19, the condition "zeroMVP" may indicate the case in which the MVP is the zero MV and the CPR is used. That is, in the case in which the MVP is the zero MV and the CPR is used, the zero MVP may be true. The condition indicating that the MVP is the zero MV may follow the embodiments illustrated in FIGS. 14 to 17. According to the aforementioned embodiments, whether the MVP is the zero MV may be known on the basis of the location of the current block or the candidate index.

According to an embodiment of the present disclosure, in the case of the zero MVP, if the x component is 0, the y component may not be 0. Accordingly, in this case, abs_mvd_greater0_flag[1] may not be parsed. Further, in this case, abs_mvd_greater0_flag[1] may be inferred as a value indicating non zero. In this case, abs_mvd_greater0_flag[1] may be inferred as 1.

According to an embodiment of the present disclosure, in the case of the zero MVP, if the x component is 0, the absolute value of the y component may be larger than 1. This is because the current block height is larger than 1. Accordingly, in this case, abs_mvd_greater1_flag[1] may not be parsed. Further, in this case, abs_mvd_greater1_flag[1] may be inferred as a value indicating that the absolute value is larger than 1. In this case, abs_mvd_greater1_flag[1] may be inferred as 1. In the conventional MVD coding before the CPR, 0 was inferred when abs_mvd_greater1_flag does not exist. Through a combination with the present embodiment, when abs_mvd_greater1_flag does not exist, an inferred value may vary depending on a condition. For example, when abs_mvd_greater1_flag[compIdx] does not exist, if abs_mvd_greater0_flag[compIdx] is 0, 0 may be inferred. When abs_mvd_greater1_flag[compIdx] is 1, 1 may be inferred. Alternatively, for example, when abs_mvd_greater1_flag[compIdx] does not exist, if abs_mvd_greater0_flag[compIdx] is 0, 0 may be inferred. Alternatively, when abs_mvd_greater1_flag[compIdx] does not exist, in the case of the zero MVP and the case in which abs_mvd_greater0_flag[!compIdx] is 0, 1 may be inferred.

According to an embodiment of the present disclosure, in the case of the zero MVP, if the x component is a positive value or 0, the y component may be a negative value. Accordingly, in this case, mvd_sign_flag of the y component may not be parsed. Further in this case, mvd_sign_flag may be inferred as a value indicating a negative value. In this case, mvd_sign_flag may be inferred as 1. Accordingly, in the case of the zero MVP and the case in which mvd_sign_flag[0] is 0, mvd_sign_flag[1] may not be parsed and may be inferred as 1. Accordingly, in the case of the zero MVP and the case in which mvd_sign_flag[0] is 0, mvd_sign_flag[1] may not be parsed and may be inferred as 1.

When mvd_sign_flag does not exist before the CPR, 0 may be inferred. However, the case in which mvd_sign_flag does not exist (see the embodiment of FIG. 9) may correspond to only the case in which the corresponding component absolute value is 0. Accordingly, through a combination with the embodiment of the present disclosure, 1 may be inferred in all cases when mvd_sign_flag does not exist. In another embodiment, an inferred value of mvd_sign_flag may vary depending on a condition. For example, in the case of zero MVP && (mvd_sign_flag[0]==0||abs_mvd_greater0_flag[0]==0), 1 may be inferred. Otherwise, 0 may be inferred.

FIG. 20 illustrates a motion vector according to an embodiment of the present disclosure.

According to an embodiment of the present disclosure, a value which the motion vector may have may be limited according to a range within which a reference block may be located. Further, this may correspond to the case in which the CPR is used. For example, the motion vector may be configured to not escape the range within which the reference block may be located.

For example, when the current block is adjacent to the boundary of the range within which the reference block may be located, the motion vector may be a direction opposite to the adjacent boundary. That is, when the current block is adjacent to the left boundary or the right boundary of the range within which the reference block may be located, the x component may be larger than or equal to 0 or equal to or smaller than 0. When the current block is adjacent to the upper boundary or the lower boundary of the range within which the reference block may be located, the y component may be larger than or equal to 0 or smaller than or equal to 0. In an embodiment, the range within which the reference block may be located may be a CTU range to which the current block belongs.

According to the embodiments illustrated in FIGS. 14 to 17, the MVP may be the zero MV. Particularly, the fact that the MVP is the zero MV may be known during the syntax parsing step. In this case, the above description about the motion vector may be applied to the MVD.

Referring to FIG. 20, the location which the reference block of the CPR may have may be limited within the CTU to which the current block belongs. In this case, when the current block is adjacent to the left boundary as indicated by A, the x component of the motion vector may be larger than or equal to 0. When the current block is adjacent to the upper boundary as indicated by B, the y component of the motion vector may be larger than or equal to 0.

FIG. 21 illustrates MVD syntax according to an embodiment of the present disclosure.

As illustrated in FIG. 9, the MVD may be coded while being separated into the x component and the y component. Referring to FIG. 21, values corresponding to [0] and [1] may be the x component and the y component, respectively. Further, abs_mvd_greater0_flag may be a flag indicating whether an absolute value of the corresponding component is larger than 0. abs_mvd_greater1_flag may be a flag indicating whether an absolute value of the corresponding component is larger than 1. abs_mvd_minus2 may be a value obtained by subtracting 2 from the absolute value of the corresponding component. mvd_sign_flag may be a flag indicating a sign of the corresponding component. The value of 0 of mvd_sign_flag may indicate positive and the value of 1 of mvd_sign_flag may indicate negative.

The embodiments illustrated in FIG. 20 may be reflected in MVD coding syntax of FIG. 21.

In FIG. 21, the condition "zeroMVP" may indicate the case in which the MVP is the zero MV and the CPR is used. That is, in the case in which the MVP is the zero MV and the CPR is used, the zero MVP may be true. The condition indicating that the MVP is the zero MV may follow the embodiments illustrated in FIGS. 14 to 17. According to the aforementioned embodiments, the fact that the MVP is the zero MV may be known on the basis of the location of the current block or the candidate index.

Referring to FIG. 21, the conditions indicating that the current block is adjacent to the left, right, upper, and lower boundaries are expressed as left_boundary, right_boundary, upper_boundary, and lower_boundary, respectively. Further, the fact that the current block is adjacent to the boundary may be determined on the basis of the coordinates of the current block, the width of the current block, the height of the current block, the width of a range available as the location of the reference block, the height of the range available as the location of the reference block, and the like. For example, upper left coordinates of the current block may be (x0, y0). The width and the height of the current block may be cbWidth and cbHeight, respectively. The width and the height of the range available as the location of the reference block may be rWidth and rHeight, respectively. For example, when (x0% rWidth==0) is true, the current block may be adjacent to the left boundary. When ((x0+ cbWidth) % rWidth==0) is true, the current block may be adjacent to the right boundary. When (y0% rHeight==0) is true, the current block may be adjacent to the upper boundary. When ((y0+cbHeight) % rHeight==0) is true, the current block may be adjacent to the lower boundary. According to an embodiment, rWidth and rHeight may be the width and the height of the CTU(CTB).

As illustrated in FIG. 20, in the case of the zero MVP and the case in which the current block is adjacent to the boundary, the sign of the MVD may be determined. For example, in the case of the zero MVP and the left_boundary, mvd_sign_flag[0] may not be parsed and a value (for example, 0) indicating positive may be inferred.

For example, in the case of the zero MVP and the right_boundary, mvd_sign_flag[0] may not be parsed and a value (for example, 1) indicating negative may be inferred.

In the case of the zero MVP and the upper_boundary, mvd_sign_flag[1] may not be parsed and a value (for example, 0) indicating positive may be inferred.

For example, in the case of the zero MVP and the lower_boundary, mvd_sign_flag[1] may not be parsed and a value (for example, 1) indicating negative may be inferred.

In FIGS. 9, 19, and 21, abs_mvd_greater0_flag, abs_mvd_greater1_flag, abs_mvd_minus2, and mvd_sign_flag may be sequentially coded, but if the order is changed, different embodiments may be performed. No syntax may be parsed but may be inferred on the basis of the location of the current block, the zero MVP, the range within which the reference block may be located, another syntax value which is already known, and the like.

FIG. 22 illustrates MVD syntax according to an embodiment of the present disclosure.

Referring to FIG. 22, a combination of the embodiments illustrated in FIGS. 18 to 21 may be implemented. Accordingly, the number of bits required for mvd coding may be reduced.

According to an embodiment of the present disclosure, in the case of the zero MVP, if an absolute value of an MVD of any component is determined, a sign of the MVD may be determined without parsing such that the MVD does not indicate a reference block beyond an available range. For example, the absolute value may be determined before the signal of the MVD is determined as illustrated in the embodiments of FIGS. 9, 19, and 21. If |MVD| of any component is beyond the available range, the sign may be determined as negative. If −|MVD| of any component is beyond the available range, the signal may be determined as positive.

FIG. 23 illustrates the block and the size according to an embodiment of the present disclosure.

According to an embodiment of the present disclosure, the width or the height of the current block may be the maximum width or the maximum height. In this case, motion information may not be referred to at a preset spatial neighbor location. This may follow the coding order. For example, when the width of the current block is the maximum width, motion information may not be referred to from the right location of the current block. In the embodiment of FIG. 12, motion information may not be referred to from B0.

In another example, when the height of the current block is the maximum height, motion information may not be referred to from the lower location of the current block. In the embodiment of FIG. 12, the motion information may not be referred to from A0.

If the embodiment of FIG. 23 is combined with the embodiment of FIG. 14, the number of spatial neighbor locations at which the motion information may be referred to may be reduced to 1. For example, when the current block is adjacent to the left boundary and the width thereof is the maximum width, the motion information may not be referred to from A0, A1, B0, and B2 of FIG. 12. When the current block is adjacent to the upper boundary and the height thereof is the maximum height, the motion information may not be referred to from A0, B0, B1, and B2. Accordingly, in this case, the number of available spatial neighbor locations is reduced, and thus embodiments in which the zero MV is determined, parsing of the candidate index is omitted, or the maximum value of the candidate index is binarized to be small may be implemented like the above embodiments.

FIG. 24 illustrates the configuration of a merge candidate list according to an embodiment of the present disclosure.

According to an embodiment of the present disclosure, a method of configuring the merge candidate list when the CPR is used may be different from that when the CPR is not used. For example, when the CPR is not used, some of candidates which may be added to the merge candidate list may not be added to the merge candidate list if the CPR is used.

In an embodiment, when the CPR is used, the zero MV may not be used. This is because a reference block indicated by the zero MV within the current picture may be the current block.

In an embodiment, when the CPR is used, a temporal MV (collocated MV) may not be used. This is because a picture other than the current picture may not be referred to when the CPR is used, In an embodiment, when the CPR is used, the HMVP candidate or the pairwise average candidate may not be used. In this case, it is possible to change index signaling as described in the embodiments of the drawings above.

In an embodiment, when the CPR is used, a candidate based on the HMVP candidate or the pairwise average candidate may be used.

In an embodiment, when the CPR is used, a subblock merge mode may not be used. The subblock merge mode may be the same as described above. Accordingly, when the CPR is used, a flag indicating the subblock merge mode may not be parsed and may be inferred.

According to an embodiment of the present disclosure, a set of preset spatial neighbor locations when the CPR is used may be different from a set of preset spatial neighbor locations when the CPR is not used. According to an embodiment of the present disclosure, when the CPR is used, one of B0 and B1 may not be used at the preset location of FIG. 12. For example, when the CPR is used, the motion information may not be referred to from the location B0. Alternatively, according to an embodiment of the present disclosure, when the CPR is used, one of A0 and A1 may not be used at the preset location of FIG. 12. For example, when the CPR is used, the motion information may not be referred to from the location A0. This is because the motion information when the CPR is used may not be required to be relatively complex and various. Alternatively, this is because motion information from the close location may be similar when the CPR is used.

FIG. 25 illustrates the block location and syntax according to an embodiment of the present disclosure.

According to an embodiment of the present disclosure, when the CPR is used, the zero MV may not be used as the MVP in the AMVP mode. In this case, through a combination with the embodiment of FIG. 15, only one spatial candidate may be added to the candidate list according to the location of the current block. When the zero MV is not used as the MVP, only one candidate may exist in the MVP candidate list. In this case, the candidate index may not be parsed. Further, in this case, the candidate index may be inferred as 0.

Referring to FIG. 25(*a*), the current block is adjacent to the left boundary or the upper boundary of the range which the reference block may have. In this case, motion information from the location beyond the range which the reference block may have may not be referred to. When the AMVP mode is used, if the zero MV is not used as the MVP, a maximum number of available MVP candidates may be 1. Accordingly, as illustrated in FIG. 25(*b*), mvp_10_flag and mvp_11_flag indicating the candidate index may not be parsed. In this case, 0 may be inferred. The case in which the CPR is used is indicated by CurrPicIsOnlyRef. 10 and 11 may indicate reference lists 0 and 1, respectively. When the CPR is used, the current picture may be the only reference picture, and thus there may be the MV only for one reference list. In this case, MV-related syntax also may be parsed for only one reference list.

FIG. 26 illustrates the resetting of the space for storing the history of the HMVP according to an embodiment of the present disclosure.

As described above, the space for storing the history of the HMVP at the preset location may be reset. The space for storing the history of the HMVP may be called an HMVP table.

According to an embodiment of the present disclosure, the preset location may be different in the case in which the CPR is used and the case in which the CPR is not used. For example, when the CPR is not used, the HMVP table may be reset at the beginning of the CTU row. For example, when the CPR is used, the HMVP table may be reset at the beginning of a range in which the reference block may exist. Alternatively, when the CPR is used, the HMVP table may be reset at the beginning of each CTU. Alternatively, when the CPR is used, more preset locations at which the HMVP table is reset may exist (more frequently) than the case in which the CPR is not used.

When the CPR is used, motion information corresponding to the location spaced far from the current block may have little correlation with the present. When the CPR is used, it is possible to facilitate parallel processing by more frequently resetting the HMVP table.

Each small rectangle in FIG. 26 may indicate a range in which a reference block may exist or a CTU range. Further, a part marked with an X may be a part in which the HMVP table is reset. When the CPR is not used as illustrated in the top side of FIG. 26, the HMVP table may be reset at the beginning of the CTU row. When the CPR is used as illustrated in the bottom side of FIG. 26, the HMVP table may be reset at the beginning of the CTU.

According to an embodiment of the present disclosure, a method of coding the MVD when the CPR is used may be different from a method of coding the MVD when the CPR is not used. For example, when the CPR is not used, the coding method as illustrated in FIG. 9 may be used. This is because a range of the available MV according to the coding order when the CPR is used may be different from that when the CPR is not used.

In an embodiment, when the CPR is used, a scheme of separately coding the x component and the y component may not be used. For example, a coding scheme based on an absolute value and a direction of a vector may be used.

In an embodiment, when the CPR is used, a reference point indicated by the MV when the MVP is the zero MV may be different from the conventional vector (vector from the upper left side of the current block).

In an embodiment, when the CPR is used, syntax different from that described in FIGS. 9, 19, and 21 may be used. For example, in a flag indicating whether an absolute value is larger than any value, the value may be different in the case in which CPR is used and the case in which CPR is not used. Accordingly, a value obtained by subtracting any value from the absolute value may be signaled. For example, in the above embodiments, there is the flag indicating whether the absolute value is larger than 1. For example, when the CPR is used, there may be a flag indicating whether the absolute value is larger than the minimum block size. Alternatively, when the CPR is used, a flag indicating whether the absolute value is larger than the width or the height of the current block may be used. For example, when the CPR is used, a flag indicating whether the absolute value is larger than the width of the current block may be used for the x component, and a flag indicating whether the absolute value is larger than the height of the current block may be used for the y component.

According to an embodiment of the present disclosure, when the CPR is used, a shared merge list may not be used. The shared merge list may correspond to a technology by which a plurality of blocks (for example, coding units) use the same merge list. The shared merge list may be used to facilitate parallel processing. However, when the CPR is used, the current picture is used as the reference block, and thus the corresponding part of the current picture should be reconstructed and facilitation of parallel processing may not be worth much. Further, when the CPR is used, if the shared merge list is used, the accuracy may be reduced or the number of available candidates may be too small.

According to another embodiment, when the CPR is used, a reference of grouping blocks using the same merge list in the shared merge list may be different from that when the CPR is not used.

According to an embodiment of the present disclosure, when the CPR is used, some of the methods used when the CPR is not used may not be used. Alternatively, according to an embodiment of the present disclosure, when the CPR is used, some of the methods used when the CPR is not used may be differently used. The method used when the CPR is not used may include a prediction mode and the like.

FIG. 27 illustrates coding unit syntax according to an embodiment of the present disclosure.

The CPR may also be called an Intra Block Copy (IBC) or a Block Copy (BC). Accordingly, a CPR mode may be named an IBC mode or a BC mode.

According to an embodiment of the present disclosure, the IBC may exist as an independent prediction mode. That is, the intra prediction and the inter prediction may be MODE_INTRA and MODE_INTER, respectively, and there may be MODE_IBC different from MODE_INTRA and MODE_INTER. Further, as illustrated in the prior figures, MODE_INTRA, MODE_INTER, and MODE_IBC may be indicated by CuPredMode values.

A tile group may be a unit higher than a CU, a CTU, a PU, and the like. Further, the tile group may be a unit in which parallel processing is possible.

A Bi-predictive (B) tile group may use intra prediction or inter prediction, the IBC, and the like. The B tile group may use a maximum of two motion vectors and a maximum of two reference indexes in the block. Alternatively, the B tile group may use a maximum of one or more motion vectors and a maximum of one or more reference indexes in the block.

Intra prediction may be the concept including the IBC scheme. Intra prediction may be a prediction method referring to only the current picture. Inter prediction may be a method of referring to a picture other than the current picture as the reference picture.

A Predictive (P) tile group may use intra prediction or inter prediction, the IBC, and the like. The P tile group may use a maximum of one motion vector and a maximum of one reference index in the block. Alternatively, the B tile group may use motion vectors are not larger than two and reference indexes which are not larger than two in the block.

An Intra (I) tile group may use intra prediction and the IBC. The I tile group may not refer to a picture other than the current picture as the reference picture.

According to an embodiment of the present disclosure, in the case of (tile_group_type !=I∥ ∣sps_ibc_enabled_flag), there may be a possibility of parsing cu_skip_flag, pred_mode_flag, and pred_mode_ibc_flag. That is, in the case that does not correspond to tile_group_type !=I∣ ∣ sps_ibc_enabled_flag), it is possible to not parse all of cu_skip_flag, pred_mode_flag, and pred_mode_ibc_flag.

Further, sps_ibc_enabled_flag may be signaling at a higher level indicating whether the IBC is used. For example, sps_ibc_enabled_flag may be signaling in a sequence parameter set indicating whether the IBC is used. The IBC may not be used when sps_ibc_enabled_flag is configured as 0, and may not be used when sps_ibc_enabled_flag is configured as 1. When an IBC mode is called a BC mode, sps_ibc_enabled_flag may be expressed as sps_bc_enabled_flag.

It may be determined whether a skip mode is used on the basis of a value of cu_skip_flag. When cu_skip_flag is 1, the skip mode may be used.

It is possible to determine a prediction mode on the basis of pred_mode_flag or pred_mode_ibc_flag. That is, it is possible to determine whether the current mode is MODE_INTRA, MODE_INTER, or MODE_IBC on the basis of pred_mode_flag or pred_mode_ibc_flag. Alternatively, it is possible to determine a value of CuPredMode on the basis of pred_mode_flag or pred_mode_ibc_flag. pred_mode_flag may be named a prediction mode flag, and pred_mode_ibc_flag may be named a BC mode flag. When the IBC mode is named a BC mode, pred_mode_ibc_flag may be expressed as pred_mode_bc_flag.

tile_group_type may indicate a tile group type. The tile group type may include the I tile group, the P tile group, and the B tile group as described above. Further, I, P, and B of values of tile_group_type may indicate the I tile group, the P tile group, and the B tile group, respectively.

According to an embodiment of the present disclosure, in the case of (cu_skip_flag[x0][y0]==0 &&tile_group_type !=I)), it is possible to parse pred_mode_flag. When cu_skip_flag is 1, pred_mode_flag may not be parsed. When tile_group_type is 1, pred_mode_flag may not be parsed.

According to an embodiment, in the case of ((tile_group_type==I &&cu_skip_flag[x0][y0]==0) ∥ (tile_group_type !=I && (cu_skip_flag[x0][y0] ∣ ∣CuPred- Mode[x0][y0]                                      !=MODE_INTRA))
&&sps_ibc_enabled_flag&&blockSizeCondition), it is pos-
sible to parse pred_mode_ibc_flag. For example, in the case
of (tile_group_type==I &&cu_skip_flag[x0][y0]==0), it is
possible to parse pred_mode_ibc_flag. Alternatively, in the
case of ((tile_group_type !=I && (cu_skip_flag[x0][y0] | |
CuPredMode[x0][y0] !=MODE_INTRA)), it is possible to
parse pred_mode_ibc_flag. Alternatively, in the case that
neither correspond to (tile_group_type==I &&cu_skip_flag
[x0][y0]==0) nor (tile_group_type !=I && (cu_skip_flag
[x0][y0]  |  |CuPredMode[x0][y0]  !=MODE_INTRA)),
pred_mode_ibc_flag may not be parsed. Further, it is pos-
sible to parse pred_mode_ibc_flag when sps_ibc_enabled-luma component and a chroma component may share a
syntax element value. When the tree type is
SINGLE_TREE, a luma block and a chroma block may be
partitioned through the same method. When the tree type is
DUAL_TREE, a luma block and a chroma block may be
partitioned through different methods. The tree type of
DUAL_TREE may include DUAL_TREE_LUMA and
DUAL_TREE_CHROMA. It is possible to determine
whether to process the luma component or the chroma
component according to whether the tree type is
DUAL_TREE_LUMA or DUAL_TREE_CHROMA.

TABLE 1

| |
|---|
| pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:<br>- If pred_mode_flag is equal to 0, CuPredMode[ x ][ y ] is set equal to MODE_INTER.<br>- Otherwise (pred_mode_flag is equal to 1), CuPredMode[ x ][ y ] is set equal to MODE_INTRA.<br>When pred_mode_flag is not present, the variable CuPredMode[ x ][ y ] is inferred to be equal to MODE_INTRA when decoding a I tile group, and MODE_INTER when decoding a P or B tile group for x = x0..x0 + cbWidth − 1 and y = y0..y0 + cbHeight − 1.<br>pred_mode_ibc_flag equal to 0 specifies that the current coding unit is not coded in ibc prediction mode pred_mode_ibc_flag equal to 1 specifies that the current coding unit is coded in ibc prediction mode.<br>The variable CuPredMode[ x ][ y ] is derived as follows for x = x0..x0 + cbWidth − 1 and y = y0..y0 + cbHeight − 1:<br>- If pred_mode_ibc_flag is equal to 0, CuPredMode[ x ][ y ] is set equal to MODE_INTER.<br>- Otherwise (pred_mode_ibc_flag is equal to 1), CuPredMode[ x ][ y ] is set equal to MODE_IBC.<br>When pred_mode_ibc_flag is not present, the variable CuPredMode[ x ][ y ] is inferred to be equal to MODE_INTRA when decoding a I tile group, and MODE_INTER when decoding a P or B tile group, for x = x0..x0 + cbWidth − 1 and y = y0..y0 + cbHeight − 1 |

_flag is 1, and it is possible to not parse pred_mode_ibc_flag
when sps_ibc_enabled_flag is 0. There may be a condition
based on a block size which may parse pred_mode_ibc_flag.
Referring to FIG. 27, the block size condition corresponds to
the case in which both cbWidth and cbHeight are smaller
than 32.

Further, referring to FIG. 27, when CuPredMode is MOD-
E_INTRA, it is possible to parse an intra prediction-related
syntax element. When CuPredMode is MODE_INTRA, it is
possible to not parse a motion vector-related syntax element.

When CuPredMode is not MODE_INTRA, it is possible
to parse an inter prediction-related syntax element. When
CuPredMode is not MODE_INTRA, it is possible to parse
an IBC-related syntax element. The IBC-related syntax
element may include a motion vector-related syntax ele-
ment. That is, when CuPredMode is not MODE_IBC, it is
possible to parse the IBC-related syntax element. The IBC-
related syntax element may include a merge mode-related
syntax element and an AMVP-related syntax element. The
IBC may have more limited prediction modes and less
syntax elements to be parsed than MODE_INTER. For
example, in the case of MODE_IBC, it is possible to parse
only a syntax element for a reference list L0. In another
example, in the case of MODE_IBC, some of flags indicat-
ing whether modes are used in merge_data may not be
parsed. When CuPredMode is not MODE_INTRA, the inter
prediction-related syntax element may be parsed. Parsing
the IBC-related syntax element may be a case in which
syntax for a chroma component is not parsed. When CuPred-
Mode is not MODE_INTRA, the inter prediction-related
syntax element may be parsed. Parsing the IBC-related
syntax element may be a case in which a tree type (treeType)
is not DUAL_TREE_CHROMA.

In an embodiment, it is possible to determine a component
for which syntax is parsed by the tree type and a component
to be processed. When the tree type is SINGLE_TREE, a Table 1 illustrates prediction mode signaling according to
an embodiment of the present disclosure.

According to an embodiment of the present disclosure, a
prediction mode may be indicated on the basis of pred_mo-
de_flag. CuPredMode may be determined on the basis of
pred_mode_flag. Further, it is possible to indicate inter
prediction or intra prediction on the basis of pred_mode_f-
lag.

According to an embodiment of the present disclosure,
when pred_mode_flag is 0, CuPredMode may be configured
as MODE_INTER. When pred_mode_flag is 1, CuPred-
Mode may be configured as MODE_INTRA. According to
an embodiment, pred_mode_flag may indicate whether the
current CU is an inter prediction mode or an intra prediction
mode.

When pred_mode_flag does not exist, it is possible to
infer pred_mode_flag or CuPredMode. When pred_mode_f-
lag does not exist, it is possible to infer pred_mode_flag or
CuPredMode on the basis of a tile group thereof. For
example, in the case of the I tile group, CuPredMode may be
inferred as MODE_INTRA. In the case of the P tile group
or the B tile group, CuPredMode may be inferred as MOD-
E_INTER.

According to an embodiment of the present disclosure, a
prediction mode may be indicated on the basis of pred_mo-
de_ibc_flag. CuPredMode may be determined on the basis
of pred_mode_ibc_flag. Further, it is possible to indicate the
IBC mode on the basis of pred_mode_ibc_flag.

According to an embodiment of the present disclosure,
when pred_mode_ibc_flag is 0, CuPredMode may be con-
figured as MODE_INTER. When pred_mode_ibc_flag is 1,
CuPredMode may be configured as MODE_IBC. When
pred_mode_ibc_flag is 0, CuPredMode may be configured
as a value other than MODE_IBC.

When pred_mode_ibc_flag does not exist, it is possible to
infer pred_mode_ibc_flag or CuPredMode. When pred_mode_ibc_flag does not exist, it is possible to infer pred_mode_ibc_flag or CuPredMode on the basis of a tile group thereof. For example, in the case of the I tile group, CuPredMode may be inferred as MODE_INTRA. In the case of the P tile group or the B tile group, CuPredMode may be inferred as MODE_INTER.

In the present disclosure, the tile group may be replaced with a slice or a unit in which other parallel processing is possible as well as the tile group.

According to an embodiment of the present disclosure, when the IBC is used, the skip mode may be used. For example, when the IBC is used for the I tile group, the skip mode may be used. For example, the skip mode may be used for the CU using the IBC for the I tile group. However, the syntax and the signaling method described with reference to FIG. 27 and table 1 may not support the same. For example, the IBC mode and the skip mode may be assumed in the I tile group. In this case, sps_ibc_enabled_flag may be 1. Further, cu_skip_flag may be parsed. In this case, a value of cu_skip_flag may be 1 (a value indicating the use of the skip mode). For the value of 1 of cu_skip_flag or the I tile group, pred_mode_flag may not be parsed. In this case, CuPredMode may be inferred as MODE_INTRA for the I tile group. For the I tile group and the value of 1 of cu_skip_flag, pred_mode_ibc_flag may not be parsed. In this case, CuPredMode may be inferred as MODE_INTRA for the I tile group. Accordingly, there may be a situation in which CuPredMode may not be indicated by MODE_IBC even though the IBC is used.

indicate that the skip mode is not used and is used, respectively. The embodiments may be performed when pred_mode_flag or pred_mode_ibc_flag does not exist.

Further, CuPredMode may be configured on the basis of cu_skip_flag without any process of configuring CuPredMode as another value. Further, CuPredMode may be configured as MODE_IBC or MODE_INTRA on the basis of cu_skip_flag without any process of configuring CuPredMode as another value. For example, in the case of the I tile group and the value of 1 of cu_skip_flag, CuPredMode may be configured as MODE_IBC. Further, in the case of the I tile group and the value of 0 of cu_skip_flag, CuPredMode may be configured as MODE_INTRA. Similarly, the embodiments may be performed when pred_mode_flag or pred_mode_ibc_flag does not exist.

There may be a CuPredMode-inferred value configured on the basis of the tile group type and cu_skip_flag, and there may be a CuPredMode-inferred value configured on the basis of the tile group type and not on the basis of cu_skip_flag. For example, CuPredMode may be inferred as MODE_INTRA and MODE_IBC on the basis of the tile group type and cu_skip_flag. Further, CuPredMode may be inferred as MODE_INTER on the basis of the tile group type.

The conventional intra prediction which is not the IBC may not use the skip mode. Accordingly, when signaling indicating the use of the skip mode is performed, the IBC or inter prediction may be determined. In the case of a tile

TABLE 2 pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:
- If pred_mode_flag is equal to 0, CuPredMode[ x ][ y ] is set equal to MODE_INTER.
- Otherwise (pred_mode_flag is equal to 1), CuPredMode[ x ][ y ] is set equal to MODE_INTRA.
When pred_mode_flag is not present, the variable CuPredMode[ x ][ y ] is inferred to be equal to
• MODE_INTRA when decoding a I tile group and cu_skip_flag[ x ][ y ] is equal to 0,
• MODE_IBC when decoding a I tile group and cu_skip_flag[ x ][ y ] is equal to 1,
• and MODE_INTER when decoding a P or B tile group
for x = x0..x0 + cbWidth − 1 and y = y0..y0 + cbHeight − 1.
pred_mode_ibc_flag equal to 0 specifies that the current coding unit is not coded in ibc prediction mode
pred_mode_ibc_flag equal to 1 specifies that the current coding unit is coded in ibc prediction mode.
The variable CuPredMode[ x ][ y ] is derived as follows for x − x0..x0 + cbWidth − 1 and y = y0..y0 + cbHeight − 1:
- If pred_mode_ibc_flag is equal to 0, CuPredMode[ x ][ y ] is set equal to MODE_INTER.
- Otherwise (pred_mode_ibc_flag is equal to 1), CuPredMode[ x ][ y ] is set equal to MODE_IBC.
When pred_mode_ibc_flag is not present, the variable CuPredMode[ x ][ y ] is inferred to be equal to
• MODE_INTRA when decoding a I tile group and cu_skip_flag[ x ][ y ] is equal to 0,
• MODE_IBC when decoding a I tile group and cu_skip_flag[ x ][ y ] is equal to 1,
• and MODE_INTER when decoding a P or B tile group,
for x = x0..x0 + cbWidth − 1 and y = y0..y0 + cbHeight − 1

50

Table 2 illustrates prediction mode signaling according to an embodiment of the present disclosure.

Description of pred_mode_flag and pred_mode_ibc_flag of table 2 may refer to FIG. 27 to table 2. An embodiment of table 2 may be to solve the problem described with reference to table 1.

According to an embodiment of the present disclosure, CuPredMode may be inferred on the basis of cu_skip_flag. Further, CuPredMode may be inferred on the basis of a tile group thereof. For example, in the case of the I tile group, CuPredMode may be inferred on the basis of cu_skip_flag. For example, in the case of the I tile group and the value of 0 of cu_skip_flag, CuPredMode may be inferred as MODE_INTRA. For example, in the case of the I tile group and the value of 1 of cu_skip_flag, CuPredMode may be inferred as MODE_IBC. The values of 0 and 1 of cu_skip_flag may group in which the use of the skip mode is signaled and only intra prediction (including IBC) is used, the IBC may be determined.

Referring to table 2, when pred_mode_flag does not exist, CuPredMode may be inferred. In the case of the I tile group and the case in which cu_skip_flag is 0, MODE_INTRA may be inferred. In the case of the I tile group and the case in which cu_skip_flag is 1, MODE_IBC may be inferred. In the case of the P tile group or the B tile group, MODE_INTER may be inferred.

Referring to table 2, when pred_mode_ibc_flag does not exist, CuPredMode may be inferred. In the case of the I tile group and the case in which cu_skip_flag is 0, MODE_INTRA may be inferred. In the case of the I tile group and the case in which cu_skip_flag is 1, MODE_IBC may be inferred. In the case of the P tile group or the B tile group, MODE_INTER may be inferred.

TABLE 3

| |
| --- |
| When pred_mode_flag/pred_mode_ibc_flag is not present, the variable CuPredMode[ x ][ y ] is inferred as follows:<br>• If sps_ibc_enabled_flag is equal to 1, CuPredMode[ x ][ y ] is inferred to<br>  • MODE_INTRA when decoding a I tile group and cu_skip_flag[ x ][ y ] is equal to 0,<br>  • MODE_IBC when decoding a I tile group and cu_skip_flag[ x ][ y ] is equal to 1,<br>  • and MODE_INTER when decoding a P or B tile group<br>• Otherwise (If sps_ibc_enabled_flag is equal to 0), CuPredMode[ x ][ y ] is inferred to<br>  • MODE_INTRA when decoding a I tile group,<br>  • and MODE_INTER when decoding a P or B tile group<br>for x = x0..x0 + cbWidth − 1 and y = y0..y0 + cbHeight − 1. |

Table 3 illustrates prediction mode signaling according to an embodiment of the present disclosure.

Description of pred_mode_flag and pred_mode_ibc_flag of table 3 may refer to FIGS. 27, table 1, and table 2. An embodiment of table 3 may be to solve the problem described with reference to table 1.

In an embodiment, a method of inferring CuPredMode, pred_mode_flag, or pred_mode_ibc_flag may vary depending on sps_ibc_enabled_flag.

In an embodiment, when sps_ibc_enabled_flag is 1, the inference method illustrated in table 2 may be used. When sps_ibc_enabled_flag is 0, the inference method illustrated in table 1 may be used.

Referring to table 3, CuPredMode may be inferred. For example, when pred_mode_flag or pred_mode_ibc_flag does not exist, CuPredMode may be inferred. According to an embodiment of the present disclosure, in the case in which sps_ibc_enabled_flag is 1 and the case of the I tile group, CuPredMode may be inferred on the basis of cu_skip_flag. For example, in the case in which sps_ibc_e-nabled_flag is 1 and the case of the I tile group, if cu_skip_flag is 0, CuPredMode may be configured as MODE_INTRA. In the case in which sps_ibc_enabled_flag is 1 and the case of the I tile group, if cu_skip_flag is 1, CuPredMode may be configured as MODE_IBC. In the case in which sps_ibc_enabled_flag is 1 and the case of the P tile group or the B tile group, CuPredMode may be configured as MODE_INTER. In the case in which sps_ibc_enabled_flag is 0 and the case of the I tile group, CuPred-Mode may be configured as MODE_INTRA. In the case in which sps_ibc_enabled_flag is 0 and the case of the P tile group or the B tile group, CuPredMode may be configured as MODE_INTER.

FIG. 28 illustrates coding unit syntax according to an embodiment of the present disclosure.

According to an embodiment of the present disclosure, in the case of the I tile group, pred_mode_ibc_flag may be parsed. In this case, the problem described in table 1 may be solved. In the case of the I tile group and the case in which sps_ibc_enabled_flag is 1, pred_mode_ibc_flag may be parsed. That is, even when the I tile group uses the IBC mode and the skip mode, pred_mode_ibc_flag may be configured and MODE_IBC may be indicated.

Referring to FIG. 28, in the case of (tile_group_type==I), sps_ibc_enabled_flag may be 1, and when a condition related to the block size is satisfied, pred_mode_ibc_flag is parsed.

TABLE 4

| |
| --- |
| pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:<br>-   If pred_mode_flag is equal to 0, CuPredMode[ x ][ y ] is set equal to MODE_INTER.<br>-   Otherwise (pred_mode_flag is equal to 1), CuPredMode[ x ][ y ] is set equal to MODE_INTRA.<br>When pred_mode_flag is not present, it is inferred to be equal to<br>• 1 when decoding a I tile group,<br>• and 0 when decoding a P or B tile group<br>for x = x0..x0 + cbWidth − 1 and y = y0..y0 + cbHeight − 1.<br>pred_mode_ibc_flag equal to 0 specifies that the current coding unit is not coded in ibc prediction mode pred_mode_ibc_flag equal to 1 specifies that the current coding unit is coded in ibc prediction mode.<br>The variable CuPredMode[ x ][ y ] is derived as follows for x = x0..x0 + cbWidth − 1 and y = y0..y0 + cbHeight − 1:<br>-   If pred_mode_ibc_flag is equal to 0 and pred_mode_flag is equal to 0, CuPredMode[ x ]<br>[ y ] is set equal to<br>    MODE_INTER.<br>-   Else if pred_mode_ibc_flag is equal to 0 and pred_mode_flag is equal to 1, CuPredMode[ x ][ y ] is set equal<br>    to MODE_INTRA.<br>-   Otherwise (pred_mode_ibc_flag is equal to 1), CuPredMode[ x ][ y ] is set equal to MODE_IBC.<br>When pred_mode_ibc_flag is not present, it is inferred to be equal to<br>• 1 when decoding a I tile group, sps_ibc_enabled_flag is equal to 1 and block size condition is true<br>• 0 when 1) decoding a I tile group, and 2a) sps_ibc_enabled_flag is equal to 0 or 2b) block size condition is false<br>• and 0 when decoding a P or B tile group,<br>for x = x0..x0 + cbWidth − 1 and y = y0..y0 + cbHeight − 1 |

Table 4 illustrates prediction mode signaling according to an embodiment of the present disclosure.

According to an embodiment of the present disclosure, when pred_mode_flag does not exist, pred_mode_flag may be inferred. The encoder may infer pred_mode_flag of the current block according to the type of a higher level group of the current block and thus omit statement of pred_mode_flag of the current block in a bitstream, thereby increasing compression efficiency. For example, when a tile group to which the current block belongs is the I tile group and a prediction mode of the current block is an intra prediction mode, the encoder may omit statement of pred_mode_flag of the current block indicating a value of 1 in the bitstream. For example, when a tile group to which the current block belongs is the B or P tile group and a prediction mode of the current block is an inter prediction mode, the encoder may omit statement of pred_mode_flag of the current block indicating a value of 0 in the bitstream. More specifically, when a tile group to which the current block belongs is the B or P tile group and a prediction mode of the current block is a skip mode (e.g., when a value of cu_skip_flag is 1), the encoder may omit statement of pred_mode_flag of the current block indicating a value of 0 in the bitstream.

Accordingly, the decoder may infer pred_mode_flag on the basis of the tile group type according to an embodiment. For example, in the case of the I tile group, pred_mode_flag may be inferred as 1. In the case of the P tile group, pred_mode_flag may be inferred as 0. In the case of the B tile group, pred_mode_flag may be inferred as 0.

CuPredMode may be configured as MODE_INTER or MODE_INTRA on the basis of pred_mode_flag. For example, when pred_mode_flag is 0, CuPredMode may be configured as MODE_INTER. Further, when pred_mode_flag is 1, CuPredMode may be configured as MODE_INTRA.

According to an embodiment of the present disclosure, CuPredMode may be configured on the basis of pred_mode_flag or pred_mode_ibc_flag. For example, when pred_mode_ibc_flag is 0, CuPredMode may be configured on the basis of pred_mode_flag. For example, when pred_mode_ibc_flag is 0, CuPredMode may be configured as MODE_INTER or MODE_INTRA on the basis of pred_mode_flag. Alternatively, when pred_mode_ibc_flag is 0, CuPredMode may be configured as a value other than MODE_IBC on the basis of pred_mode_flag. Referring to table 4, when pred_mode_ibc_flag is 0 and pred_mode_flag is 0, CuPredMode may be configured as MODE_INTER. Further, when pred_mode_ibc_flag is 0 and pred_mode_flag is 1, CuPredMode may be configured as MODE_INTRA.

According to an embodiment of the present disclosure, CuPredMode may be configured on the basis of only pred_mode_ibc_flag. For example, when pred_mode_ibc_flag is 1, CuPredMode may be configured without any other flag. For example, when pred_mode_ibc_flag is 1, CuPredMode may be configured as MODE_IBC.

According to an embodiment of the present disclosure, when pred_mode_ibc_flag does not exist, pred_mode_ibc_flag may be inferred. For example, the value of pred_mode_ibc_flag may be inferred on the basis of the tile group type. Further, the value of pred_mode_ibc_flag may be inferred on the basis of the tile group type and an IBC mode availability condition. More specifically, in the case of the I tile group, the value of pred_mode_ibc_flag may be inferred on the basis of the IBC mode availability condition. For example, in the case of the I tile group and the case in which the IBC mode availability condition is satisfied, the value of pred_mode_ibc_flag may be inferred as 1. When 1 is inferred, CuPredMode may be configured as the value of MODE_IBC. Further, in the case of the I tile group and the case in which the IBC mode availability condition is not satisfied, the value of pred_mode_ibc_flag may be inferred as 0. Alternatively, in the case of the I tile group and the case in which at least one of the IBC mode availability conditions is not satisfied, the value of pred_mode_ibc_flag may be inferred as 0. When 0 is inferred, CuPredMode may be configured as a value other than MODE_IBC. The IBC mode availability condition may include the value of sps_ibc_enabled_flag. Further, the IBC mode availability condition may include a condition related to the block size. Referring to table 4, in the case of the I tile group and the case in which sps_ibc_enabled_flag is 1, the value of pred_mode_ibc_flag may be inferred as 1. In this case, when the IBC mode availability condition is added and is satisfied, the value of pred_mode_ibc_flag may be inferred as 1. In table 4, the additional IBC mode availability condition is indicated as a block size condition.

Even in the case of the I tile group (condition 1 of table 4) and the case in which sps_ibc_enabled_flag is 0 (condition 2a of table 4), the value of pred_mode_ibc_flag may be inferred as 0. In the case of the I tile group (condition 1 of table 4) and the case in which another IBC mode availability condition is not satisfied (condition 2b of table 4), the value of pred_mode_ibc_flag may be inferred as 0.

In another embodiment, in the case of the P or B tile group, the value of pred_mode_ibc_flag may be inferred as 0. In the case of the P or B tile group, the value of pred_mode_ibc_flag may be inferred as a preset value without any other condition except for the tile group type.

When the above condition is satisfied during the encoding process of the video signal, the encoder may not state pred_mode_ibc_flag in the bitstream. Accordingly, the encoder may increase the video compression efficiency by not stating the value of pred_mode_ibc_flag in the bitstream.

The term "inference (infer)" in a plurality of embodiments of the present disclosure may mean configuration (configure), derivation (derive), or the like.

According to an embodiment of the present disclosure, a tree type may be induced as follows.

When tile_group_type is I and qtbtt_dual_tree_intra_flag is 1, the tree type may be configured as DUAL_TREE_LUMA. When tile_group_type is I, qtbtt_dual_tree_intra_flag is 1, and a luma component is processed, the tree type may be configured as DUAL_TREE_LUMA.

When tile_group_type is I and qtbtt_dual_tree_intra_flag is 1, the tree type may be configured as DUAL_TREE_CHROMA. Alternatively, when tile_group_type is I, qtbtt_dual_tree_intra_flag is 1, and a chroma component is processed, the tree type may be configured as DUAL_TREE_CHROMA.

When tile_group_type is not I or qtbtt_dual_tree_intra_flag is 0, the tree type may be configured as SINGLE_TREE.

According to an embodiment, qtbtt_dual_tree_intra_flag may be signaling indicating whether a dual tree is allowed. Allowing the dual tree may mean there are separate coding quad tree syntax structures for the luma and chroma components. More specifically, when the current picture is the only reference picture, qtbtt_dual_tree_intra_flag may be signaling indicating whether the dual tree is allowed.

FIG. 29 illustrates coding unit syntax according to an embodiment of the present disclosure.

According to an embodiment of the present disclosure, in the case of the chroma component, the IBC mode may not be used. More specifically, in the case of DUAL_TREE_CHROMA, the IBC mode may not be used.

Referring to FIG. 29, when the tree type is not DUAL_TREE_CHROMA, pred_mode_ibc_flag may be parsed. When the tree type is DUAL_TREE_CHROMA, pred_mode_ibc_flag may not be parsed. According to an embodiment, when the tree type is DUAL_TREE_CHROMA, CuPredMode may be inferred as MODE_INTRA.

FIG. 30 illustrates coding unit syntax according to an embodiment of the present disclosure.

The coding unit syntax of FIG. 30 may indicate syntax related to intra prediction. According to an embodiment of the present disclosure, there may be intra_chroma_pred_mode signaling. An intra prediction mode of a chroma component may be determined on the basis of intra_chroma_pred_mode.

Referring to FIG. 30, when the tree type is SINGLE_TREE or DUAL_TREE_CHROMA, intra_chroma_pred_mode may be parsed. When the tree type is DUAL_TREE_LUMA, intra_chroma_pred_mode may not be parsed.

location may be a luma block location corresponding to the center of the current chroma block. For example, when IntraPredModeC at the location of (xCb, yCb) is derived, IntraPredModeY at the location of (xCb+cbWidth/2, yCb+cbHeight/2) may be referred to. Alternatively, when

TABLE 5

8.3.3  Derivation process for chroma intra prediction mode

Input to this process are:
- a luma location ( xCb, yCb ) specifying the top-left sample of the current chroma coding block relative
  to the top-left luma sample of the current picture,
- a variable cbWidth specifying the width of the current coding block in luma samples,
- a variable cbHeight specifying the height of the current coding block in luma samples.
In this process, the chroma intra prediction mode IntraPredModeC[ xCb ][ yCb ] is derived.
The chroma intra prediction mode IntraPredModeC[ xCb ][ yCb ] is derived using intra_chroma_pred_mode[ xCb ][ yCb ]
and IntraPredModeY[ xCb + cbWidth / 2 ][ yCb + cbHeight / 2 ] as specified in Table 8-2 and Table 8-3.

TABLE 8-2

Specification of IntraPredModeC[ xCb ][ yCb ] depending on intra_chroma_
pred_mode[ xCb ][ yCb ] and IntraPredModeY [ xCb + cb Width / 2 ]
[ yCb + cbHeight / 2 ] when sps_cclm_enabled_flag is equal to 0

| intra_chroma_pred_mode | IntraPredMode Y[ xCb + cbWidth / 2 ][ yCb + cbHeight / 2 ] | | | | |
|---|---|---|---|---|---|
| [ xCb ][ yCb ] | 0 | 50 | 18 | 1 | X(0 < = X < = 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

TABLE 8-3

Specification of IntraPredModeC[ xCb ][ yCb ] depending on intra_chroma_
pred_mode[ xCb ][ yCb ] and IntraPredModeY[ xCb + cb Width / 2 ]
[ yCb + cbHeight / 2 ] when sps_cclm_enabled_flag is equal to 1

| intra_chroma_pred_mode | IntraPredModeY[ xCb + cbWidth / 2 ][ yCb + cbHeight / 2 ] | | | | |
|---|---|---|---|---|---|
| [ xCb ][ yCb ] | 0 | 50 | 18 | 1 | X (0 < = X < = 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 5 illustrates inducement of an intra prediction mode of a chroma component according to an embodiment of the present disclosure.

Referring to table 5, IntraPredModeC may be an intra prediction mode for a chroma component. xCb and yCb may indicate uppermost leftmost samples of a chroma coding block on the basis of the luma location. IntraPredModeY may be an intra prediction mode for a luma component.

According to an embodiment of the present disclosure, IntraPredModeC may be determined on the basis of IntraPredModeY. IntraPredModeC may be determined on the basis of IntraPredModeY and intra_chroma_pred_mode. IntraPredModeY may be a mode corresponding to a luma block corresponding to the current chroma block. According to an embodiment, the location at which IntraPredModeY corresponding to IntraPredModeC for any location is used may be preset. According to an embodiment, the preset IntraPredModeC at the location of (xCb, yCb) is derived, the preset location may be a location based on xCb or yCb.

The value of IntraPredModeC for the value of any IntraPredModeY may refer to Table 8-2 or Table 8-3 of table 5. Table 8-2 may correspond to the case in which the CCML may not be used (or sps_cclm_enabled_flag is 0), and Table 8-3 may correspond to the case in which the CCLM may be used (or sps_cclm_enabled_flag is 1). When IntraPredModeY is any value, a column corresponding to the value may be referred to in table 5, and a value corresponding to intra_chroma_pred_mode in the column may be IntraPredModeC. For example, when IntraPredModeY is 1 and intra_chroma_pred_mode is 1, IntraPredModeC may be 50.

According to an embodiment, sps_cclm_enabled_flag may be signaling of a higher level indicating whether CCLM may be applied. For example, when sps_cclm_enabled_flag is 1, the CCLM may be applied. When sps_cclm_enabled_flag is 0, the CCLM may not be applied.

The value of IntraPredModeC of table 5 which is 81, 82, or 83 may correspond to a CCLM mode. When sps_ccl-m_enabled_flag of table 5 is 0, 4 of the value of IntraPred-ModeC may correspond to a DM mode. When sps_cclm_e-nabled_flag of table 5 is 1, 7 of the value of IntraPredModeC may correspond to a DM mode.

There may be a definition of a bin string for signaling intra_chroma_pred_mode. For example, the DM mode may be indicated using the smallest number of intra_chro-ma_pred_mode. For example, the DM mode may be indicated using a 1-bit intra_chroma_pred_mode.

According to an embodiment, when sps_cclm_enabled_flag is 0, the number of bits indicating 4, 0, 1, 2, or 3 corresponding to the value of intra_chroma_pred_mode may increase or be the same. According to an embodiment, when sps_cclm_enabled_flag is 0, the bin string indicating 4, 0, 1, 2, or 3 corresponding to the value of intra_chro-ma_pred_mode may be 0, 100, 101, 110, or 111.

According to an embodiment, when sps_cclm_enabled_flag is 1, the number of bits indicating 7, 4, 5, 6, 0, 1, 2, or 3 corresponding to the value of intra_chroma_pred_mode may increase or be the same. According to an embodiment, when sps_cclm_enabled_flag is 1, the bin string indicating 7, 4, 5, 6, 0, 1, 2, or 3 corresponding to the value of intra_chroma_pred_mode may be 0, 10, 1110, 1111, 11000, 11001, 11010, or 11011.

However, according to the above-described embodiments, intra prediction for the chroma block may not be easy. Particularly, inducement of the intra prediction mode for the chroma block may not be easy. As described above, when the chroma block is intra prediction, an intra predic-tion mode for the corresponding luma block should be referred to in order to determine the intra prediction mode. However, the corresponding luma location may not perform intra prediction or may not be MODE_INTRA. For example, when the corresponding luma location is MOD-E_IBC, the corresponding luma intra prediction mode may not exist. According to an embodiment, in the case of SINGLE_TREE, the corresponding luma block and chroma block may use the same prediction mode. Further, in the case of DUAL_TREE, the corresponding luma block and chroma block may use different prediction modes. Further, in the case of the I tile group, DUAL_TREE may be used. Further, in the case of the I tile group, MODE_INTRA or MOD-E_IBC may be used. Accordingly, at the same location, DUAL_TREE_LUMA may use MODE_IBC and DUAL_TREE_CHROMA may use MODE_INTRA.

More specifically, when IntraPredModeY does not exist, IntraPredModeY may be configured as a planar mode (value of 0). In this case, signaling the planar mode using smaller bits is possible in the signaling method described in table 5.

Alternatively, when IntraPredModeY does not exist, IntraPredModeY may be configured as a DC mode (value of 1). In this case, signaling the DC mode using smaller bits is possible in the signaling method described in table 5.

Alternatively, when IntraPredModeY does not exist, IntraPredModeY may be configured as a vertical mode (value of 50). In this case, signaling the vertical mode using smaller bits is possible in the signaling method described in table 5.

Alternatively, when IntraPredModeY does not exist, IntraPredModeY may be configured as a horizontal mode (value of 18). In this case, signaling the horizontal mode using smaller bits is possible in the signaling method described in table 5.

In another embodiment, when IntraPredModeY does not exist, values of IntraPredModeC corresponding to values of intra_chroma_pred_mode may be determined as values which are not shown in table 5. That is, a column in the case in which the value of IntraPredModeY does not exist may separately exist in table 5. For example, IntraPredModeC corresponding to intra_chroma_pred_modes 4, 0, 1, 2, and 3 may be 0, 1, 50, and 18, respectively. Alternatively, IntraPredModeC corresponding to intra_chroma_pred_modes 4, 0, 1, 2, and 3 may be 0, 50, 18, and 1, respectively. This may be applied to both the cases in which sps_cclm_enabled_flag is 0 and 1.

In another embodiment, when IntraPredModeY does not exist, IntraPredModeC may be configured as a preset value. For example, when IntraPredModeY does not exist, IntraPredModeC may be configured as a preset value regard-less of intra_chroma_pred_mode. Further, when IntraPred-ModeY does not exist, the value of intra_chroma_pred_mode may be signaled always with the value of 0. For example, when IntraPredModeY does not exist, IntraPred-ModeC may be configured as the planar mode. Alternatively, when IntraPredModeY does not exist, IntraPredModeC may be configured as the CCLM. Alternatively, when IntraPred-ModeY does not exist, IntraPredModeC may be configured as the DM mode. Further, when IntraPredModeY does not exist, intra_chroma_pred_mode described in FIG. 30 may not be parsed.

TABLE 6

- If IntraPredMode Y[ xCb + cbWidth / 2 ][ yCb + cbHeight / 2 ] is not present, it is set to the predefined value.
The chroma intra prediction mode IntraPredModeC[ xCb ][ yCb ] is derived using intra_chroma_pred_mode[ xCb ][ yCb ] and IntraPredModeY[ xCb + cbWidth / 2 ][ yCb + cbHeight / 2 ] as specified in Table 8-2 and Table 8-3.

Table 6 illustrates derivation of an intra prediction mode of a chroma component according to an embodiment of the present disclosure.

The embodiment of table 6 may be a method of solving the problem described in table 5.

According to an embodiment of the present disclosure, when IntraPredModeY does not exist, IntraPredModeY may be configured as a preset mode (or value). Accordingly, even when the luma location corresponding to the chroma block does not use intra prediction or uses the IBC mode, IntraPredModeC may be induced.

In another embodiment, when IntraPredModeY does not exist, the location at which IntraPredModeC is referred to may be changed.

In the above embodiments, the case in which IntraPred-ModeY does not exist may mean the case in which the corresponding luma location referred to when the chroma intra prediction mode is induced is not MODE_INTRA. Alternatively, the case may mean the case in which CuPred-Mode[xCb+cbWidth/2][yCb+cbHeight/2] corresponding to the luma component when the chroma intra prediction mode at the location of (xCb, yCb) is induced is not MODE_IN-TRA or is MODE_IBC.

Alternatively, the case may mean the case in which IntraPredModeY[xCb+cbWidth/2][yCb+cbHeight/2] corresponding to the luma component when the chroma intra prediction mode at the location of (xCb, yCb) is induced does not exist.

Referring to table 6, if IntraPredModeY[xCb+cbWidth/2][yCb+cbHeight/2] does not exist when IntraPredModeC[xCb][yCb] is induced, IntraPredModeY[xCb+cbWidth/2][yCh+cbHeight/2] may be configured as a preset value. IntraPredModeC may be induced with reference to IntraPredModeY[xCb+cbWidth/2][yCb+cbHeight/2] and the table described in table 5.

If IntraPredModeY[xCb+cbWidth/2][yCh+cbHeight/2] exists when IntraPredModeC[xCb][yCb] is induced, IntraPredModeC may be induced with reference to IntraPredModeY[xCb+cbWidth/2][yCb+cbHeight/2] and the table described in table 5.

According to an embodiment of the present disclosure, if the corresponding luma lock uses the IBC mode when the chroma block is predicted, a prediction mode may be limited. More specifically, if the corresponding luma block uses the IBC mode when the chroma block is intra-predicted, an intra prediction mode may be limited. For example, in this case, the DM mode may not be used. This is because, when the corresponding luma block and chroma block use different modes, similarity therebetween may be reduced.

FIG. 31 illustrates coding unit syntax according to an embodiment of the present disclosure.

According to an embodiment of the present disclosure, motion information for the chroma block may exist separately from motion information for the luma block. For example, when the chroma block uses the IBC mode, motion information for the chroma block may exist separately from motion information for the luma block.

Referring to FIG. 31, when the tree type is DUAL_TREE_CHROMA, a motion information-related syntax element may be parsed. For example, when the tree type is DUAL_TREE_CHROMA and CuPredMode is MODE_IBC, a motion information-related syntax element may be parsed. The motion information-related syntax element may include merge_flag, a syntax element within merge_data, mvp_10_flag, amvr_4 pel_flag, and the like.

FIG. 32 illustrates a syntax element according to an embodiment of the present disclosure.

According to an embodiment of the present disclosure, a prediction mode may be limited on the basis of the block size. That is, CuPredMode may be limited on the basis of the block size. For example, inter prediction may be limited. This is to reduce a memory bandwidth or computational complexity. For example, the prediction mode may be limited in a block having the small size. For example, the prediction mode may be limited in a block having the size equal to or smaller than a threshold. For example, the threshold may be the size of 4×4. That is, in a detailed embodiment, inter prediction may not be used in a block having the size equal to or smaller than 4×4.

The limited prediction mode described in another embodiment may be bi-predicted inter prediction. For example, bi-prediction may not be used in the block size equal to or smaller than the threshold. In this case, the threshold may indicate the size equal to or smaller than 4×8 or 8×4. For example, the threshold may be 12 (width+height). When bi-prediction is limited, there may be a process of switching bi-prediction to uni-prediction. Alternatively, when bi-prediction is limited, a value indicating a prediction direction or a reference list may be limited.

The prediction mode may be limited as described above, and thus syntax structures different from that described in the above drawings may be used for efficient signaling.

According to an embodiment of the present disclosure, in the case of MODE_INTRA, a skip mode may not be used. Accordingly, in the case of MODE_INTRA, cu_skip_flag may be 0. Therefore, if cu_skip_flag is 1, non MODE_IN-TRA may be determined.

Referring to FIG. 32, when the tile group type is not I or sps_ibc_enabled_flag is 1, cu_skip_flag, pred_mode_flag, and pred_mode_ibc_flag may be parsed. In this case, parsing may be performed in consideration of additional conditions. That is, when the tile group type is I and sps_ibc_enabled_flag is 0, cu_skip_flag, pred_mode_flag, and pred_mode_ibc_flag may not be parsed. According to an embodiment, CuPredMode may be a value of one of MOD-E_INTRA, MODE_INTER, and MODE_IBC. An available CuPredMode value when the tile group type is I may be MODE_INTRA or MODE_IBC. However, an available CuPredMode value when MODE_IBC is limited, for example, when sps_ibc_enabled_flag is 0, may be only MODE_INTRA. Accordingly, when the tile group type is I and sps_ibc_enabled_flag is 0, pred_mode_flag, and pred_mode_ibc_flag may not be parsed and CuPred-Mode may be determined as MODE_INTRA. Further, as described above, it may be determined that cu_skip_flag is 0.

According to an embodiment of the present disclosure, cu_skip_flag, pred_mode_flag, and pred_mode_ibc_flag may be parsed on the basis of the block size.

For example, in the case of the block size in which inter prediction is limited and the case in which the IBC may not be used, cu_skip_flag may not be parsed. That is, in the case of the block size in which inter prediction may be used or the case in which the IBC may be used, cu_skip_flag may be parsed. In the case of the block size in which inter prediction is limited and the case in which the IBC may not be used, CuPredMode may be determined as MODE_INTRA. In this case, the value of cu_skip_flag may be determined and inferred as 0. In an embodiment, the block size in which the inter prediction is limited may be a block of 4×4. Further, the case in which the IBC may not be used may be a case in which sps_ibc_enabled_flag is 0.

According to an embodiment of the present disclosure, in the case of the block size in which inter prediction is limited, pred_mode_flag may not be parsed. According to an embodiment of the present disclosure, it may be determined whether CuPredMode is MODE_INTRA or MODE_INTER on the basis of the value of pred_mode_flag. In the case of the block size in which inter prediction is limited, it may be determined that pred_mode_flag is a value indicating that CuPredMode is MODE_INTRA. CuPredMode may be changed on the basis of pred_mode_ibc_flag. That is, CuPredMode may be determined on the basis of pred_mode_flag and pred_mode_ibc_flag, and CuPredMode determined on the basis of only pred_mode_flag may be changed on the basis of pred_mode_ibc_flag. According to an embodiment, it may be determined whether CuPredMode is MODE_IBC and whether CuPredMode is determined on the basis of only pred_mode_flag according to the value of pred_mode_ibc_flag.

In the case of the block size in which inter prediction is not limited, pred_mode_flag may be parsed. In this case, an additional condition may be considered. For example, whether to parse pred_mode_flag may be determined on the basis of cu_skip_flag or a tile group type. As described above, pred_mode_flag may be the value for determining whether CuPredMode is MODE_INTRA or MOD-E_INTER, which is because CuPredMode may be limited on the basis of cu_skip_flag or the tile group type. For example, when the tile group type is I, CuPredMode may be only the value of MODE_INTRA. When the tile group type is not I, that is, the tile group type is P or B, CuPredMode may be both MODE_INTRA and MODE_INTER. However, when the tile group type is not I and cu_skip_flag is 1, CuPredMode may be only the value of MODE_INTER. According to an embodiment of the present disclosure, when cu_skip_flag is 1 or the tile group type is I, pred_mode_flag may not be parsed. According to an embodiment of the present disclosure, when the tile group type is I, pred_mode_flag or CuPredMode may be inferred as a value indicating MODE_INTRA. When the tile group type is P or B, pred_mode_flag or CuPredMode may be inferred as a value indicating MODE_INTER.

In an embodiment, the block size in which the inter prediction is limited may be a block of 4×4. Alternatively, the block size in which inter prediction is limited may be a block having the size equal to or smaller than 4×4.

pred_mode_ibc_flag may be parsed on the basis of the block size in which inter prediction is limited. Further, pred_mode_ibc_flag may be parsed on the basis of cu_skip_flag. According to an embodiment, in the case of the block size in which inter prediction is limited and the case in which cu_skip_flag is 1, pred_mode_ibc_flag may not be When the tile group type is I and cu_skip_flag is 1, pred_mode_ibc_flag may not be parsed. Further, in this case, pred_mode_ibc_flag or CuPredMode may be determined and inferred as a value indicating MODE_IBC. A value of CuPredMode available in the I tile group is MODE_INTRA or MODE_IBC. This is because the skip mode is not used in MODE_INTRA. Accordingly, when the tile group type is I and cu_skip_flag is 0, pred_mode_ibc_flag may be parsed.

When the tile group type is not I, CuPredMode is MODE_INTRA, and in the case that does not correspond to the block size in which inter prediction is limited, pred_mode_ibc_flag may not be parsed. In this case, the prediction mode may be determined without pred_mode_ibc_flag. When the tile group type is not I, CuPredMode is not MODE_INTRA, and in the case of the block size in which inter prediction is limited, pred_mode_ibc_flag may be parsed. In this case, pred_mode_ibc_flag may be parsed in consideration of an additional condition. For example, when the tile group type is not I, when CuPredMode is MODE_INTRA, and in the case of the block in which inter prediction is limited, pred_mode_ibc_flag may be parsed. This is because the final prediction mode is determined as MODE_INTRA or MODE_IBC even though inter prediction is limited. In addition, when cu_skip_flag is 0, pred_mode_ibc_flag may be parsed.

In an embodiment, the block size in which the inter prediction is limited may be a block of 4×4. Alternatively, the block size in which inter prediction is limited may be a block having the size equal to or smaller than 4×4.

TABLE 7 pred_mode_flag equal to 0 specifies that the current coding unit is coded in inter prediction mode. pred_mode_flag equal to 1 specifies that the current coding unit is coded in intra prediction mode. The variable CuPredMode[ x ][ y ] is derived as follows for x = x0..x0 + cbWidth − 1 and y = y0..y0 + cbHeight − 1:
- If pred_mode_flag is equal to 0, CuPredMode[ x ][ y ] is set equal to MODE_INTER.
- Otherwise (pred_mode_flag is equal to 1), CuPredMode[ x ][ y ] is set equal to MODE_INTRA.
When pred_mode_flag is not present, it is inferred to be equal to 1 when decoding an I tile group or when decoding a coding unit with cbWidth is equal to 4 and cbHeight is equal to 4, and equal to 0 when decoding a P or B tile group, respectively.
pred_mode_ibc_flag equal to 1 specifies that the current coding unit is coded in IBC prediction mode. pred_mode_ibc_flag equal to 0 specifies that the current coding unit is not coded in IBC prediction mode.
When pred_mode_ibc_flag is not present, it is inferred to be equal to the value of sps_ibc_enabled_flag when decoding an I tile group group or when decoding a coding unit coded in skip mode and cbWidth is equal to 4 and cbHeight is equal to 4, and 0 when decoding a P or B tile group, respectively.
When pred_mode_ibc_flag is equal to 1, the variable CuPredMode[ x ][ y ] is set to be equal to MODE_IBC for x = x0..x0 + cbWidth − 1 and y = y0..y0 + cbHeight − 1.

parsed. As described above, in the block size in which inter prediction is limited, CuPredMode may not be MODE_INTER. When cu_skip_flag is 1, CuPredMode may not be MODE_IBC. Accordingly, in the case of the block size in which inter prediction is limited and the case in which cu_skip_flag is 1, pred_mode_ibc_flag or CuPredMode may be determined and inferred as MODE_IBC. Further, it may be a case in which the configuration as MODE_IBC is possible. For example, when sps_ibc_enabled_flag is 1, the configuration as MODE_IBC may be possible. Accordingly, in the case of the block size in which inter prediction is limited and the case in which cu_skip_flag is 1, pred_mode_ibc_flag or CuPredMode may be determined and inferred according to sps_ibc_enabled_flag. More specifically, in the case of the block size in which inter prediction is limited and the case in which cu_skip_flag is 1, pred_mode_ibc_flag may be inferred as sps_ibc_enabled_flag. In the case of the block size in which inter prediction is not limited and the case in which cu_skip_flag is 0, pred_mode_ibc_flag may be parsed.

Table 7 illustrates a method of inferring a signaling value according to an embodiment of the present disclosure.

Referring to Table 7, pred_mode_flag or pred_mode_ibc_flag may be inferred as described in FIG. 32. Alternatively, CuPredMode may be determined as described in FIG. 32. pred_mode_flag and pred_mode_ibc_flag of table 7 may be the same signaling as pred_mode_flag and pred_mode_ibc_flag of FIG. 32.

According to an embodiment of the present disclosure, CuPredMode may be determined as MODE_INTER or MODE_INTRA on the basis of the value of pred_mode_flag. When the value is MODE_TEMP, CuPredMode may be determined as MODE_TEMP or MODE_IBC on the basis of the value of pred_mode_ibc_flag.

As illustrated in FIG. 32, in the case of the block size in which inter prediction is limited, pred_mode_flag may be inferred as a value indicating MODE_INTRA. That is, in the case of the block size in which inter prediction is limited, pred_mode_flag may be inferred as 1. Referring to table 7, when the block size is 4×4, the value of pred_mode_flag may be inferred as 1.

As illustrated in FIG. 32, in the case of the block size in which inter prediction is limited and the case of the skip mode, pred_mode_ibc_flag may be inferred as a value indicating MODE_IBC. This may be a case in which MODE_IBC may be used. For example, the case in which MODE_IBC may be used may be a case in which sps_ibc_enabled_flag is 1. For example, in the case of the block size in which inter prediction is limited and the case of the skip mode, pred_mode_ibc_flag may be inferred as the value of sps_ibc_enabled_flag. Referring to table 7, in the case of the block size of 4×4 and the case of the skip mode, pred_mode_ibc_flag may be inferred as the value of sps_ibc_enabled_flag.

de_flag may be inferred as a value indicating MODE_INTRA. Further, 1) in the case in which the tile group type is P or B and 2) the case that does not correspond to the block size in which inter prediction is limited, pred_mode_flag may be inferred as a value indicating MODE_INTER.

A prediction mode available when the tile group type is P or B may be MODE_INTRA, MODE_INTER, or MODE_IBC. In the case of the block size in which inter prediction is limited, MODE_INTER may not be used among MODE_INTRA, MODE_INTER, and MODE_IBC. In the case of the skip mode, MODE_INTRA may not be used among MODE_INTRA, MODE_INTER, and MODE_IBC. Accordingly, in the case in which the tile group type is P or B, the case of the block size in which inter prediction is limited, and the case of the skip mode, only MODE_IBC

TABLE 8 pred_mode_flag equal to 0 specifies that the current coding unit is coded in inter prediction mode.
pred_mode_flag equal to 1 specifies that the current coding unit is coded in intra prediction mode. The variable CuPredMode[ x ][ y ] is derived as follows for x = x0..x0 + cbWidth − 1 and
y = y0..y0 − cbHeight − 1:
- If pred_mode_flag is equal to 0, CuPredMode[ x ][ y ] is set equal to MODE_INTER.
- Otherwise (pred_mode_flag is equal to 1), CuPredMode[ x ][ y ] is set equal to MODE_INTRA.
When pred_mode_flag is not present, it is inferred to be equal to I when decoding an I tile group or when decoding a coding unit with both cbWidth and cbHeight equal to 4, and equal to 0 when decoding a P or B tile group and decoding a coding unit with cbWidth or cbHeight not equal to 4, respectively.
pred_mode_ibc_flag equal to 1 specifies that the current coding unit is coded in IBC prediction mode.
pred_mode_ibc_flag equal to 0 specifies that the current coding unit is not coded in IBC prediction mode.
When pred_mode_ibc_flag is not present, it is inferred to be equal to the value of sps_ibc_enabled_flag 1) when decoding an I tile group group or 2) when decoding a coding unit coded in skip mode and cbWidth is equal to 4 and cbHeight is equal to 4, and 0 when i) decoding a P or B tile group and ii) decoding a coding unit coded not in skip mode or with cbWidth or cbHeight not equal to 4, respectively.
When pred_mode_ibc_flag is equal to 1, the variable CuPredMode[ x ][ y ] is set to be equal to MODE_IBC for x = x0..x0 + cbWidth − 1 and y = y0..y0 − cbIleight − 1.

Table 8 illustrates a method of inferring a signaling value according to an embodiment of the present disclosure.

FIG. 32 and table 7 have described the method of parsing, inferring, or determining cu_skip_flag, pred_mode_flag, pred_mode_ibc_flag, and CuPredMode. However, in the inference method illustrated in table 7, there may be certain conflicts.

For example, in the case of the block size in which inter prediction is limited and the case in which the tile group type is P or B, it may be difficult to infer the value of pred_mode_flag. In table 7, the value of pred_mode_flag may be inferred as one of the two values, and all of the two cases may be satisfied.

In the case of the block size in which inter prediction is limited, the case of the skip mode, and the case in which the tile group type is P or B, it may be difficult to infer the value of pred_mode_ibc_flag. In table 7, the value of pred_mode_ibc_flag may be inferred as one of the two values, and all of the two cases may be satisfied.

Table 8 may be an embodiment for solving the problem.

A prediction mode available when the tile group type is P or B may be MODE_INTRA, MODE_INTER, or MODE_IBC. In the case of the block size in which inter prediction is limited, MODE_INTER may not be used among MODE_INTRA, MODE_INTER, and MODE_IBC. According to an embodiment of the present disclosure, in this case, pred_mode_flag may be inferred as a value indicating MODE_INTRA. This is because MODE_IBC may be determined through pred_mode_ibc_flag. Accordingly, the above description may be summarized as follows.

In the case in which the tile group type is I or the case of the block size in which inter prediction is limited, pred_momay be used. Accordingly, in this case, pred_mode_ibc_flag may be inferred as 1. Therefore, the above description may be summarized as follows.

1) when the tile group type is I or 2) in the case of the block size in which inter prediction is limited and the case of the skip mode, pred_mode_ibc_flag may be inferred as a value indicating MODE_IBC, for example, 1. Further, i) when the tile group type is P or B and ii) in the case that does not correspond to the block size in which inter prediction is limited or the case that does not correspond to the skip mode, pred_mode_ibc_flag may be inferred as a value that does not indicate MODE_IBC, for example, 0.

In an embodiment, the block size in which the inter prediction is limited may be a block of 4×4. Alternatively, the block size in which inter prediction is limited may be a block having the size equal to or smaller than 4×4.

Table 8 illustrates that the method of inferring pred_mode_flag and pred_mode_ibc_flag is an example of the case in which the block size in which inter prediction is limited is 4×4.

In the described present disclosure, the tile group type may be a slice type. Whether the mode is the skip mode may be determined through cu_skip_flag.

FIG. 33 illustrates a value of inter_pred_idc and binarization according to an embodiment of the present disclosure. inter_pred_idc is a parameter indicating the type of inter prediction and may be called an inter prediction type parameter.

As illustrated in FIG. 32, bi-prediction may not be used on the basis of the block size. According to an embodiment of the present disclosure, inter prediction available in any block size may be L0 uni-prediction, L1 uni-prediction, or bi-prediction, and inter prediction available in any block size may be L0 uni-prediction or L1 uni-prediction. Further, the type of inter prediction may be indicated through inter_prod_idc. L0 uni-prediction may be inter prediction using only reference list 0. L1 uni-prediction may be inter prediction using only reference list 1. bi-prediction may be inter prediction using both reference list 0 and reference list 1. Further, the inter prediction type may be determined for each CU. Values of inter_pred_idc indicating L0 uni-prediction, L1 uni-prediction, and bi-prediction may be PRED_L0, PRED_L1, and PRED_B1, respectively. Values of inter_pred_idc indicating L0 uni-prediction, L1 uni-prediction, and bi-prediction may be 0, 1, and 2, respectively.

According to an embodiment of the present disclosure, in the case of the block size in which bi-prediction is not used, a value of inter_pred_idc corresponding to bi-prediction may not exist.

Further, a binarization method indicating inter_pre_idc may exist. The method may be different in a block in which bi-prediction is allowed and a block in which bi-prediction is not allowed. In addition, this may be a bin string used in the case in which inter_pre_idc is parsed. When bi-prediction is allowed, the value corresponding to L0 uni-prediction, L1 uni-prediction, or bi-prediction may be used as inter_pre_idc. In order to express this, inter_pred_idc may be indicated through a variable length binarization method. For example, values corresponding to L0 uni-prediction, L1 uni-prediction, and bi-prediction may be indicated as 00, 01, and 1, respectively. Alternatively, values corresponding to L0 uni-prediction, L1 uni-prediction, and bi-prediction may be indicated as 10, 11, and 0, respectively. When bi-prediction is not allowed, the value corresponding to L0 uni-prediction or L1 uni-prediction may be used as inter_pre_idc. Accordingly, inter_pre_idc may be indicated by 1 bit. For example, the values corresponding to L0 uni-prediction and L1 uni-prediction may be indicated as 0 and 1, respectively. Alternatively, the values corresponding to L0 uni-prediction and L1 uni-prediction may be indicated as 1 and 0, respectively.

According to an embodiment, the block size in which bi-prediction is not used may be a block size equal to or smaller than a threshold. For example, the threshold may be a block of 4×8 or a block of 8×4. When 4×4 inter prediction is not allowed, the block size in which bi-prediction is not used may be a block of 4×8 or 8×4. The block of 4×4 may be indicated by (width+height==8). The block of 4×8 or 8×4 may be indicated by (width+height==12).

Referring to FIG. 33, in the case of the block of 4×8 or 8×4, inter_pred_idc may have only a value corresponding to PRED_L0, PRED_L1. In this case, inter_pred_idc may be indicated by 0 or 1.

FIG. 34 illustrates a value of inter_pred_idc and binarization according to an embodiment of the present disclosure.

As illustrated in FIG. 33, there may be a plurality of sets of values which inter_pred_idc may indicate and signaling methods thereof. For example, the number of types of values which inter_pred_idc may indicate is three in any block, in which case signaling may be performed using 1 or 2 bits. Further, the number of types of values which inter_pred_idc may indicate is two in any block, in which signaling may be performed using b bits. The type of values which inter_pred_idc may indicate and signaling may vary depending on the block size. For example, according to the block size in which bi-prediction is allowed, the type of values which inter_prod_idc may indicate and signaling may be different.

However, in the method illustrated in FIG. 33, there may be ambiguity in the type of values which inter_pred_idc may indicate and signaling in the case of any block size. For example, when the block size is 4×8 or 8×4, all of the condition (width+height) !=8 and the condition ((width+height==8)||(width+height==12) may be satisfied. Accordingly, signaling and a bitstream between the encoder and the decoder may mismatch.

The embodiment of FIG. 34 may be a method of solving the problem. According to an embodiment of the present disclosure, in the case in which condition 1 is satisfied and the case in which !condition 1 is satisfied, types of values which inter_pred_idc may indicate and signaling methods may be different. For example, condition 1 may be a block size condition in which bi-prediction is not allowed. For example, condition 1 may be a condition of the block of 4×8 or 8×4. When bi-prediction is not allowed, if inter_pred_idc is signaled using 2 bits, the signaling is considered inefficient. This is because PRED_B1 is not indicated by the value of inter_pred_idc when bi-prediction is not allowed. In an embodiment, the block size condition in which bi-prediction is not allowed may be a size of the block of 4×8 or 8×4. Accordingly, the block size in which bi-prediction is not allowed may be 4×8, 8×4, or 4×4.

Referring to FIG. 34, when width+height corresponds to 8 or 12, a value which inter_pred_idc may have may be PRED_L0, PRED_L1. Further, inter_pred_idc may be indicated through 1 bit. Signaling may be 0 or 1. When width+height is neither 8 or 12, values which inter_pred_idc may have may be PRED_L0, PRED_L1, or PRED_B1. Further, inter_pred_idc may be indicated through 1 bit or 2 bits. Signaling may be 00, 01, or 1.

FIG. 35 illustrates a value of inter_pred_idc and binarization according to an embodiment of the present disclosure.

FIG. 35 may be an embodiment for solving the problem illustrated in FIGS. 33 to 34. Further, FIG. 35 may be a method of increasing efficiency of the embodiment of FIG. 34. As described above, there may be a block size in which inter prediction is not allowed. In the embodiment of FIG. 34, if the block size in which inter prediction is not allowed is not considered, an unnecessary condition check may be needed. For example, when inter prediction is not allowed, the value of inter_pred_idc is meaningless. If a condition of the case in which inter prediction is not allowed is checked in inter_pred_idc signaling, it may be meaningless. According to an embodiment of the present disclosure, inter_pred_idc signaling and a set of values may be determined by checking a condition of the case in which bi-prediction is not allowed without checking the condition of the case in which inter prediction is not allowed. For example, the case in which inter prediction is not allowed may be the block size of 4×4, and the case in which bi-prediction is not allowed may be the block size of 4×8 or 8×4.

Referring to FIG. 35, when width+height corresponds to 12, a value which inter_pred_idc may have may be PRED_L0 or PRED_L1. Further, inter_pred_idc may be indicated through 1 bit. Signaling may be 0 or 1. When width+height does not correspond to 12, values which inter_pred_idc may have may be PRED_L0, PRED_L1, or PRED_B1. Further, inter_pred_idc may be indicated through 1 bit or 2 bits. Signaling may be 00, 01, or 1.

Accordingly, in the embodiment of FIG. 35, in fact, a set of values of inter_pred_idc and signaling may correspond to the left side (a third column among all columns) among two columns of FIG. 35 in the case of the 4×4 block, which may be different from the embodiment of FIG. 34.

According to an embodiment of the present disclosure, when the tree type is DUAL_TREE_CHROMA, cu_skip_flag may be parsed. In the tree type corresponding to DUAL_TREE_CHROMA, partitioning of the luma block and the chroma block may be different, and it may indicate processing corresponding to chroma. Further, when the tree type is DUAL_TREE_CHROMA, if MODE_IBC is available, cu_skip_flag may be parsed. The case in which MODE_IBC may be used may be a case in which sps_ibc_enabled_flag is 1. This is to allow the skip mode to be used when the prediction mode of the chroma block is MODE_IBC.

The above-described embodiments of the present invention may be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code may be stored in memory and driven by a processor. The memory may be located inside or outside the processor, and may exchange data with the processor by various means already known.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

What is claimed is:

1. A video signal decoding device, the device comprising a processor, wherein the processor is configured to:

determine whether a prediction mode of a current block is an inter prediction mode or an intra prediction mode based on a value of a prediction mode parameter, determine whether the prediction mode of the current block is an Intra Block Copy (IBC) prediction mode based on a value of an IBC mode parameter, when the prediction mode of the current block is the IBC prediction mode, decode the current block based on the IBC prediction mode and motion information for at least one location among a first set of spatial neighboring locations of the current block, when the prediction mode of the current block is the inter prediction mode, decode the current block based on the inter prediction mode and motion information for at least one location among a second set of spatial neighboring locations of the current block, wherein the first set of spatial neighboring locations of the current block is a part of the second set of spatial neighboring locations of the current block, wherein whether the IBC mode parameter is parsed or not is determined based on a tree type of the current block, when the prediction mode parameter is not parsed:

when a slice to which the current block belongs is an I slice, the value of the prediction mode parameter is inferred as a value indicating that the prediction mode of the current block is the intra prediction mode, when the slice to which the current block belongs is a P slice of a B slice, the value of the prediction mode parameter is inferred as a value indicating that the prediction mode of the current block is the inter prediction mode, and wherein the I slice is a slice that refers to a current picture as a reference picture, and the P slice or the B slice is a slice capable of referring to a picture other than the current picture as a reference picture.

2. The video signal decoding device of claim 1, wherein the first set of spatial neighboring locations of the current block does not include locations (xCb−1, yCb+cbHeight), and (xCb+cbWidth, yCb−1), wherein the second set of spatial neighboring locations of the current block includes the locations (xCb−1, yCb+cbHeight), and (xCb+cbWidth, yCb−1), wherein the cbWidth is a width of the current block and the cbHeight is a height of the current block, wherein a top-left location of the current block is (xCb, yCb).

3. The video signal decoding device of claim 2, wherein the first set of spatial neighboring locations of the current block includes locations of (xCb−1, yCb+cbHeight−1) and (xCb+cbWidth−1, yCb−1), wherein the second set of spatial neighboring locations of the current block further includes the locations (xCb−1, yCb+cbHeight−1), and (xCb+cbWidth−1, yCb−1).

4. The video signal decoding device of claim 1, when the IBC mode parameter is not parsed:

when the slice to which the current block belongs is the I slice, and signaling information of a higher level than the current block indicates that the IBC prediction mode is available, the value of the IBC mode parameter is inferred as a value indicating that the prediction mode of the current block is the IBC prediction mode, when the slice to which the current block belongs is the P slice or the B slice, the value of the IBC mode parameter is inferred as a value indicating that the prediction mode of the current block is not the IBC prediction mode.

5. The video signal decoding device of claim 4, wherein the value of the IBC mode parameter is inferred based on a size of the current block and whether a skip mode is applied to the current block.

6. The video signal decoding device of claim 5, when the skip mode is applied to the current block and the size of the current block is a pre-configured size, the value of the IBC mode parameter is inferred as a value indicating that the prediction mode is the IBC prediction mode, when i) the skip mode is not applied to the current block or the size of the current block is not the pre-configured size and ii) the slice to which the current block belongs is the P slice or the B slice, the value of the IBC mode parameter is inferred as a value indicating that the prediction mode is not the IBC prediction mode.

7. The video signal decoding device of claim 6, wherein the pre-configured size is 4×4.

8. The video signal decoding device of claim 1, when the tree type of the current block is a DUAL-_TREE_CHROMA:

the IBC mode parameter is not parsed and the prediction mode of the current block is not the IBC prediction mode, wherein the DUAL_TREE_CHROMA indicates processing of a chroma component block for which partitioning in a different method from a luma component block is available.

9. The video signal decoding device of claim 1, wherein when the prediction mode parameter is not parsed, the value of the prediction mode parameter is inferred based on a size of the current block.

10. A video signal encoding device comprising a processor, wherein the processor is configured to obtain a bitstream to be decoded by a decoder using a decoding method, the decoding method comprising:

determining whether a prediction mode of a current block is an inter prediction mode or an intra prediction mode based on a value of a prediction mode parameter;

determining whether the prediction mode of the current block is an Intra Block Copy (IBC) prediction mode based on a value of an IBC mode parameter;

when the prediction mode of the current block is the IBC prediction mode, decoding the current block based on the IBC prediction mode and motion information for at least one location among a first set of spatial neighboring locations of the current block;

when the prediction mode of the current block is the inter prediction mode, decoding the current block based on the inter prediction mode and motion information for at least one location among a second set of spatial neighboring locations of the current block, wherein the first set of spatial neighboring locations of the current block is a part of the second set of spatial neighboring locations of the current block, wherein whether the IBC mode parameter is parsed or not is determined based on a tree type of the current block, when the prediction mode parameter is not parsed:

when a slice to which the current block belongs is an I slice, the value of the prediction mode parameter is inferred as a value indicating that the prediction mode of the current block is the intra prediction mode, when the slice to which the current block belongs is a P slice of a B slice, the value of the prediction mode parameter is inferred as a value indicating that the prediction mode of the current block is the inter prediction mode, and wherein the I slice is a slice that refers to a current picture as a reference picture, and the P slice or the B slice is a slice capable of referring to a picture other than the current picture as a reference picture.

11. The video signal encoding device of claim 10, wherein the first set of spatial neighboring locations of the current block does not include locations (xCb−1, yCb+cbHeight), and (xCb+cbWidth, yCb−1), wherein the second set of spatial neighboring locations of the current block includes the locations (xCb−1, yCb+cbHeight), and (xCb+cbWidth, yCb−1), wherein the cbWidth is a width of the current block and the cbHeight is a height of the current block, wherein a top-left location of the current block is (xCb, yCb).

12. The video signal encoding device of claim 11, wherein the first set of spatial neighboring locations of the current block includes locations (xCb−1, yCb+cbHeight−1) and (xCb+cbWidth−1, yCb−1), wherein the second set of spatial neighboring locations of the current block further includes the locations (xCb−1, yCb+cbHeight−1), and (xCb+cbWidth−1, yCb−1).

13. The video signal encoding device of claim 10, when the IBC mode parameter is not parsed:

when the slice to which the current block belongs is the I slice, and signaling information of a higher level than the current block indicates that the IBC prediction mode is available, the value of the IBC mode parameter is inferred as a value indicating that the prediction mode of the current block is the IBC prediction mode, when the slice to which the current block belongs is the P slice or the B slice, the value of the IBC mode parameter is inferred as a value indicating that the prediction mode of the current block is not the IBC prediction mode.

14. The video signal encoding device of claim 13, wherein the value of the IBC mode parameter is inferred based on a size of the current block and whether a skip mode is applied to the current block.

15. The video signal encoding device of claim 14, when the skip mode is applied to the current block and the size of the current block is a pre-configured size, the value of the IBC mode parameter is inferred as a value indicating that the prediction mode is the IBC prediction mode, when i) the skip mode is not applied to the current block or the size of the current block is not the pre-configured size and ii) the slice to which the current block belongs is the P slice or the B slice, the value of the IBC mode parameter is inferred as a value indicating that the prediction mode is not the IBC prediction mode.

16. The video signal encoding device of claim 15, wherein the pre-configured size is 4×4.

17. The video signal encoding device of claim 10, when the tree type of the current block is a DUAL-_TREE_CHROMA:

the IBC mode parameter is not parsed and the prediction mode of the current block is not the IBC prediction mode, wherein the DUAL_TREE_CHROMA indicates processing of a chroma component block for which partitioning in a different method from a luma component block is available.

18. The video signal encoding device of claim 10, wherein when the prediction mode parameter is not parsed, the value of the prediction mode parameter is inferred based on a size of the current block.

19. A method of obtaining a bitstream, the method comprising:

determining whether to include a prediction mode parameter indicating a prediction mode of a current block is an inter prediction mode or an intra prediction mode in the bitstream;

determining whether to include an Intra Block Copy (IBC) mode parameter indicating the prediction mode of the current block is an IBC prediction mode in the bitstream;

when the prediction mode of the current block is the IBC prediction mode, encoding the current block based on the IBC prediction mode and motion information for at least one location among a first set of spatial neighboring locations of the current block;

when the prediction mode of the current block is the inter prediction mode, encoding the current block based on the inter prediction mode and motion information for at least one location among a second set of spatial neighboring locations of the current block, wherein the first set of spatial neighboring locations of the current block is a part of the second set of spatial neighboring locations of the current block;

obtaining the bitstream including information for decoding the current block, wherein whether the IBC mode parameter is included in the bitstream is determined based on a tree type of the current block, when the prediction mode parameter is not included in the bitstream:

when a slice to which the current block belongs is an I slice, the prediction mode of the current block is the intra prediction mode, when the slice to which the current block belongs is a P slice of a B slice, the prediction mode of the current block is the inter prediction mode, and wherein the I slice is a slice that refers to a current picture as a reference picture, and the P slice or the B slice is a slice capable of referring to a picture other than the current picture as a reference picture.

20. The method of claim 19, wherein the first set of spatial neighboring locations of the current block does not include locations (xCb−1, yCb+cbHeight), and (xCb+cbWidth, yCb−1), wherein the second set of spatial neighboring locations of the current block includes the locations (xCb−1, yCb+cbHeight), and (xCb+cbWidth, yCb−1), wherein the cbWidth is a width of the current block and the cbHeight is a height of the current block, wherein a top-left location of the current block is (xCb, yCb).

21. A video signal decoding method, the video signal decoding method comprising:

determining whether a prediction mode of a current block is an inter prediction mode or an intra prediction mode based on a value of a prediction mode parameter;

determining whether the prediction mode of the current block is an Intra Block Copy (IBC) prediction mode based on a value of an IBC mode parameter;

when the prediction mode of the current block is the IBC prediction mode, decoding the current block based on the IBC prediction mode and motion information for at least one location among a first set of spatial neighboring locations of the current block;

when the prediction mode of the current block is the inter prediction mode, decoding the current block based on the inter prediction mode and motion information for at least one location among a second set of spatial neighboring locations of the current block, wherein the first set of spatial neighboring locations of the current block is a part of the second set of spatial neighboring locations of the current block, wherein whether the IBC mode parameter is parsed or not is determined based on a tree type of the current block, when the prediction mode parameter is not parsed:

when a slice to which the current block belongs is an I slice, the value of the prediction mode parameter is inferred as a value indicating that the prediction mode of the current block is the intra prediction mode, when the slice to which the current block belongs is a P slice of a B slice, the value of the prediction mode parameter is inferred as a value indicating that the prediction mode of the current block is the inter prediction mode, and wherein the I slice is a slice that refers to a current picture as a reference picture, and the P slice or the B slice is a slice capable of referring to a picture other than the current picture as a reference picture.

* * * * *